(12) United States Patent
Ruan et al.

(10) Patent No.: US 12,400,612 B2
(45) Date of Patent: Aug. 26, 2025

(54) LIQUID APERTURE, ELECTRONIC DEVICE, AND DRIVING METHOD AND APPARATUS FOR LIQUID APERTURE

(71) Applicant: HUAWEI TECHNOLOGIES CO., LTD., Shenzhen (CN)

(72) Inventors: Wangchao Ruan, Dongguan (CN); Qingping Wang, Shenzhen (CN); Tingai Chen, Shenzhen (CN); Guofu Zhou, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 450 days.

(21) Appl. No.: 18/071,372

(22) Filed: Nov. 29, 2022

(65) Prior Publication Data

US 2023/0105130 A1    Apr. 6, 2023

Related U.S. Application Data

(63) Continuation of application No. PCT/CN2021/090763, filed on Apr. 28, 2021.

(30) Foreign Application Priority Data

May 29, 2020 (CN) .......................... 202010477421.9
Aug. 26, 2020 (CN) .......................... 202010872933.5

(51) Int. Cl.
*G09G 3/34* (2006.01)
*G02B 3/12* (2006.01)
*G02B 26/00* (2006.01)

(52) U.S. Cl.
CPC .............. *G09G 3/348* (2013.01); *G02B 3/12* (2013.01); *G02B 26/005* (2013.01)

(58) Field of Classification Search
CPC ........ G09G 3/348; G02B 3/12; G02B 26/005; G02B 2207/115; G02B 5/005; G03B 30/00; G03B 9/02
See application file for complete search history.

(56) References Cited

U.S. PATENT DOCUMENTS 9,128,350 B1   9/2015  Lee
9,188,774 B2  11/2015  Jung et al.
(Continued)

FOREIGN PATENT DOCUMENTS

CN    102879899 A    1/2013
CN    104865776 B   12/2017
WO    2019177220 A1  9/2019

OTHER PUBLICATIONS

Yu et al., "Tunable Liquid Iris Actuated Using Electrowetting Effect," Optical Engineering 53(5), 057106, total 5 pages (May 2014).

(Continued)

*Primary Examiner* — Charles S Chang
(74) *Attorney, Agent, or Firm* — Leydig, Voit & Mayer, Ltd.

(57) ABSTRACT

A liquid aperture, an electronic device, and a driving method and apparatus for a liquid aperture are provided. The liquid aperture includes a first substrate, a first electrode plate, an insulation layer, a hydrophobic layer, a hydrophilic layer, a sidewall, a second electrode plate, and a second substrate that are disposed adjacent to each other in sequence in a direction of an optical axis of the liquid aperture. A first hollow structure is formed in a middle of the sidewall. The hydrophilic layer includes a first hydrophilic part and a second hydrophilic part. There are N second hollow structures between the first hydrophilic part and the second hydrophilic part. The first hollow structure communicates with the N second hollow structures to form a closed cavity.

(Continued)

The closed cavity is filled with a transparent electrolyte and dyed oil. The dyed oil is incompatible with the transparent electrolyte.

20 Claims, 34 Drawing Sheets

(56) References Cited

U.S. PATENT DOCUMENTS

| | | |
|---|---|---|
| 9,207,448 B2 | 12/2015 | Jung et al. |
| 2015/0368413 A1* | 12/2015 | Tatemichi .............. H01G 4/206 |
| | | 359/290 |

OTHER PUBLICATIONS

Li et al., "Electrowetting-Based Liquid Iris," IEEE Photonics Technology Letters, vol. 25, No. 10, pp. 989-991, Institute of Electrical and Electronics Engineers, New York, New York (May 15, 2013).
Li et al., "Adaptive Liquid Iris for Optical Switch," Optical Engineering 53(4), 047105, total 5 pages (Apr. 2014).
Chang et al., "Variable Aperture Controlled by Microelectrofluidic Iris," Optics Letters, vol. 38, No. 15, pp. 2919-2922 (Aug. 1, 2013).

* cited by examiner

1

8

2

201                                    21

3

4

LIQUID APERTURE, ELECTRONIC DEVICE, AND DRIVING METHOD AND APPARATUS FOR LIQUID APERTURE

CROSS-REFERENCE TO RELATED APPLICATIONS

This application is a continuation of International Application No. PCT/CN2021/090763, filed on Apr. 28, 2021, which claims priorities to Chinese Patent Application No. 202010872933.5, filed on Aug. 26, 2020 and Chinese Patent Application No. 202010477421.9, filed on May 29, 2020. All of the aforementioned patent applications are hereby incorporated by reference in their entireties.

TECHNICAL FIELD

Embodiments of this application relate to the field of terminal devices, and in particular, to a liquid aperture, an electronic device, and a driving method and apparatus for a liquid aperture.

BACKGROUND

An aperture is a component that controls the amount of light entering a camera. A conventional aperture includes mechanical blades. A larger quantity of blades indicates a more approximately circular shape of a hole, but also indicates a larger thickness and poorer reliability. FIG. 1a and FIG. 1b each show a schematic diagram of a structure of a conventional aperture 1'. The conventional aperture 1' has a plurality of mechanical blades 11', and a light inlet hole J is formed among the plurality of mechanical blades 11'. During use, the plurality of mechanical blades 11' may be controlled to rotate by using a center of the light inlet hole J as a rotation center to change a size of the light inlet hole J (the light inlet hole J in FIG. 1a is smaller, the light inlet hole J in FIG. 1b is larger, a process in which the aperture 1' switches from a state shown in FIG. 1a to a state shown in FIG. 1b is a process of increasing the amount of incoming light, and a process in which the aperture 1' switches from the state shown in FIG. 1b to the state shown in FIG. 1a is a process of decreasing the amount of incoming light). A liquid aperture is a new type of aperture in which there is no mechanical blade, but a large or small hole is formed by controlling movement of dyed liquid in a cavity (as shown in FIG. 1c). Compared with the conventional mechanical aperture, the liquid aperture has the advantages of round hole, low power consumption, fast response speed, high precision, and the like. In recent years, the liquid aperture has gradually become a research hotspot and has not been used in consumer products.

An existing liquid aperture may implement driving adjustment on a size of a hole based on electrowetting effect. For a principle of the liquid aperture, refer to the following electrowetting equation with reference to FIG. 1d:

$$\cos\theta = \cos\theta_0 + (\varepsilon_0\varepsilon_r/2dr_{lg}) \cdot V^2$$

Herein, $\theta_0$ is a start contact angle (not shown in FIG. 1d), $\theta$ is a contact angle with voltage applied, $n_g$ is liquid-gas surface tension (which is not affected by an applied voltage and is a constant value), $\varepsilon_r$ is a relative dielectric constant of an insulation dielectric layer, so is a vacuum dielectric constant, d is a thickness of the insulation dielectric layer, and V is a voltage applied to an electrode.

It may be learned that a three-phase contact point in FIG. 1d is simultaneously subjected to solid-liquid surface tension $r_{sl}$, solid-gas surface tension $r_{sg}$, and the liquid-gas surface tension $n_g$. When a voltage is applied between a liquid electrode and a solid electrode, a contact angle of a micro droplet may be changed. In other words, a wetting property of a hydrophobic surface is changed by using an electric field, and the contact angle of the droplet on the hydrophobic surface may be changed. In the liquid aperture, the contact angle of the droplet in the electrowetting effect may be changed to push opaque liquid to move, to change a size of a light inlet hole of the aperture.

However, a liquid aperture technology based on the electrowetting effect in a conventional technology is not mature enough, and cannot meet a requirement for adjusting the amount of incoming light.

SUMMARY

This application provides a liquid aperture, an electronic device, and a driving method and apparatus for a liquid aperture, to adjust a size of a light inlet hole of an aperture.

According to a first aspect, this application provides a liquid aperture. The liquid aperture may be applied to an electronic device having a photographing function, and adjusts the amount of light entering the electronic device when the electronic device performs photographing. The liquid aperture includes a first substrate, a first electrode plate, an insulation layer, a hydrophobic layer, a hydrophilic layer, a sidewall, a second electrode plate, and a second substrate that are disposed adjacent to each other in a specified sequence (namely, in a direction of an optical axis of the liquid aperture). The first substrate, the first electrode plate, the insulation layer, the hydrophobic layer, the hydrophilic layer, the second electrode plate, and the second substrate all have light transmission, and the sidewall blocks light. The first substrate and the second substrate herein are equivalent to bottom plate structures at two ends of the entire liquid aperture in the direction of the optical axis. The first substrate bears and supports the first electrode plate, and the second substrate bears and supports the second electrode plate. It should be understood that, as the outermost structures of the entire liquid aperture structure, the first substrate and the second substrate may further protect the entire liquid aperture. During use, a voltage may be applied to the first electrode plate and the second electrode plate, so that an electric field may be formed between the first electrode plate and the second electrode plate. The insulation layer is disposed on a side of the first electrode plate away from the first substrate, to insulate the hydrophobic layer from the first electrode plate, which is equivalent to insulating the hydrophobic layer and a structure above the hydrophobic layer from the first electrode plate. The hydrophobic layer refers to a layer of hydrophobic substance formed on a side that is of the insulation layer and that faces the second substrate. The hydrophilic layer refers to a layer of hydrophilic substance formed on a side that is of the hydrophobic layer and that faces the second substrate. The hydrophobic layer is a solid plate structure, and the plate structure is continuous and not hollowed out. The hydrophilic layer specifically includes a first hydrophilic part and a second hydrophilic part that are disposed on the same hydrophobic layer. The first hydrophilic part and the second hydrophilic part have a same thickness. The first hydrophilic part is located in a central region of the hydrophilic layer, and the second hydrophilic part is located in a peripheral region of the hydrophilic layer. The first hydrophilic part is cylindrical, and an axis of the first hydrophilic part is coaxial with the optical axis of the liquid aperture. The second hydrophilic part has a cylindrical hollow middle part, and a shape of an outer edge of the second hydrophilic part is not limited, for example, a circle or a rectangle. An axis of the cylindrical hollow part is also coaxial with the optical axis of the liquid aperture. The first hydrophilic part is located in a central region of the cylindrical hollow part, and a radius of the first hydrophilic part is less than a radius of the cylindrical hollow part, so that a gap exists between the first hydrophilic part and the second hydrophilic part. There are N annular second hollow structures between the first hydrophilic part and the second hydrophilic part, where N herein is an integer greater than or equal to 1. Each second hollow structure penetrates through the hydrophilic layer in a thickness direction of the hydrophilic layer, so that a surface of a side that is of the hydrophobic layer and that faces the hydrophilic layer may be partially exposed from the second hollow structure. An axis of each second hollow structure coincides with the optical axis of the liquid aperture. The sidewall is disposed between the hydrophilic layer and the second electrode plate. A first hollow structure is formed in a middle of the sidewall. The first hollow structure may penetrate through the sidewall in a thickness direction of the liquid aperture. The first hollow structure communicates with the N second hollow structures to form a closed cavity among the second electrode plate, the sidewall, the hydrophilic layer, and the hydrophobic layer. It should be understood that the first substrate, the first electrode plate, the insulation layer, the hydrophobic layer, the hydrophilic layer, the sidewall, the second electrode plate, and the second substrate are disposed adjacent to each other to ensure sealing of the closed cavity. Certainly, the sidewall and the hydrophilic layer herein serve as a sealing structure of the closed cavity between the second electrode plate and the hydrophobic layer. The closed cavity is filled with a nonopaque transparent electrolyte and opaque dyed oil. The transparent electrolyte and the dyed oil are incompatible. Surface adsorbability of the hydrophilic layer to the transparent electrolyte is greater than surface adsorbability of the hydrophobic layer to the transparent electrolyte. Surface adsorbability of the hydrophilic layer to the dyed oil is less than surface adsorbability of the hydrophobic layer to the dyed oil. A volume of the transparent electrolyte is fixed, and a volume of the dyed oil is also fixed. When the transparent electrolyte moves in the closed cavity, the transparent electrolyte may occupy a space occupied by the dyed oil, and a vacant position of the transparent electrolyte is accordingly filled with the dyed oil. In other words, distribution of the transparent electrolyte and the dyed oil in the closed cavity changes. The transparent electrolyte is configured to isolate the dyed oil from the second electrode plate. The transparent electrolyte comes into contact with the second electrode plate, and the dyed oil is equivalent to being "pressed" by the transparent electrolyte on one side of the hydrophobic layer. When an electric field is formed between the first electrode plate and the second electrode plate, wetting effect of the hydrophobic layer corresponding to a battery on the transparent electrolyte may be changed by changing electric field strength. The transparent electrolyte is nonopaque. In other words, the transparent electrolyte may allow light to pass through. The dyed oil is opaque. In other words, the dyed oil may prevent light from passing through. A distribution state of the transparent electrolyte and the dyed oil in the closed cavity may be controlled to change a size of a light inlet hole of the liquid aperture for light transmission. An operation principle of the liquid aperture is as follows: When no electric field is formed between the first electrode plate and the second electrode plate or strength of the formed electric field is less than a specified threshold, a hydrophobic layer region corresponding to the electric field exhibits a hydrophobic characteristic relative to the transparent electrolyte, a contact angle between the transparent electrolyte and the hydrophobic layer is large, the first hollow structure is substantially filled with the transparent electrolyte, the N second hollow structures are substantially filled with the dyed oil, and the dyed oil may be evenly spread to cover a surface that is of the hydrophobic layer and that is exposed from the second hollow structures. In this case, the size of the light inlet hole of the liquid aperture is determined by the first hydrophilic part. Because the electric field between the first electrode plate and the second electrode plate herein cannot change the distribution of the transparent electrolyte and the dyed oil in the closed cavity, the electric field in this case is equivalent to an ineffective electric field. When an electric field is formed between the first electrode plate and the second electrode plate and strength of the electric field is greater than or equal to the foregoing specified threshold, a hydrophobic layer region corresponding to the electric field exhibits a hydrophilic characteristic relative to the transparent electrolyte, the contact angle between the transparent electrolyte and the hydrophobic layer decreases, and the transparent electrolyte enters the second hollow structures from the first hollow structure, and comes into contact with a part of the hydrophobic layer. In this process, the transparent electrolyte pushes the dyed oil in the second hollow structures to an edge that is of the second hollow structures and that is away from the optical axis of the liquid aperture, so that the size of the light inlet hole for light transmission is increased, and in other words, the light inlet hole of the liquid aperture is enlarged. Because the electric field between the first electrode plate and the second electrode plate herein can change the distribution of the transparent electrolyte and the dyed oil in the closed cavity, the electric field in this case is equivalent to an effective electric field. When the electric field strength between the first electrode plate and the second electrode plate changes from being greater than or equal to the specified threshold to being less than the specified threshold, the hydrophobic layer changes from the hydrophilic characteristic to the hydrophobic characteristic relative to the transparent electrolyte, the contact angle between the transparent electrolyte and the hydrophobic layer increases again, the transparent electrolyte returns into the first hollow structure, and the dyed oil may be evenly spread on the surface of the hydrophobic layer again, so that the light inlet hole of the liquid aperture is narrowed.

During operation, the magnitude of the voltage applied to the first electrode plate and the second electrode plate is controlled, so that the strength of the electric field formed between the first electrode plate and the second electrode plate can be changed, and the contact angle of the transparent electrolyte on the hydrophobic layer is further controlled. The wetting state of the transparent electrolyte on the hydrophobic layer can change the area of the hydrophobic layer covered by the dyed oil in the N second hollow structures, so that the size of the light inlet hole of the liquid aperture is changed. In other words, driving adjustment of the liquid aperture provided in this application may be implemented through low-voltage driving, so that a current consumer requirement for adjusting the amount of light entering the aperture can be met. In addition, in this process, the first hydrophilic part can ensure that the liquid aperture may always have an opening. This improves roundness, concentricity, and repeatability of the light inlet hole of the liquid aperture.

In a possible implementation, an aperture value of the liquid aperture provided in this application may be 1.2-8.

The sidewall may be disposed in at least the following two manners. In the first manner, the sidewall is directly formed on a side that is of the second electrode plate and that faces the hydrophilic layer through an ultraviolet (UV) lithography process. In this case, the sidewall may be made of photoresist. The sidewall is bonded to the hydrophilic layer through an adhesive. In the second manner, the sidewall is independent of the second electrode plate. The sidewall is bonded to the second electrode plate through an adhesive, and the sidewall is bonded to the hydrophilic layer through an adhesive. The sidewall herein may be made of glass, polymethyl methacrylate (PMMA, commonly referred to as acrylic), or another hard polymer. In the two manners, the adhesive may be a pressure-sensitive adhesive or an epoxy resin adhesive.

In the liquid aperture, a density difference between the transparent electrolyte and the dyed oil should be less than or equal to 0.09 $g/cm^3$, to minimize impact of a gravity difference caused by the density difference on the distribution state of the transparent electrolyte and the dyed oil. To limit a volume of the closed cavity and ensure implementation of a capillary function of the structure, a height of the sidewall (namely, a size in the thickness direction of the liquid aperture) may be 0.05-2 mm, and a thickness of the hydrophilic layer may be 0.5-3 μm. Thicknesses of other structures are respectively as follows. A thickness of the hydrophobic layer may be 0.02-1 μm. A thickness of the insulation layer may be 0.5-1 μm. A thickness of the first electrode plate and/or the second electrode plate may be 20-30 nm. Materials of all layers of structures in the liquid aperture are as follows. The first electrode plate and the second electrode plate may be made of transparent indium tin oxide (ITO) or nano-silver. The hydrophobic layer may be made of a fluorine-containing polymer. The hydrophilic layer may be made of photoresist.

It should be understood that, to ensure integrity and regularity of an overall structure of the liquid aperture, in a direction perpendicular to the optical axis of the liquid aperture, outer edges of the first substrate, the first electrode plate, the insulation layer, the hydrophobic layer, the hydrophilic layer, the sidewall, the second electrode plate, and the second substrate may be a matching structure. The matching herein may refer to a shape and a size.

Shapes of the first substrate and the second substrate are not limited in this application, provided that a surface that is of the first substrate and that faces the second substrate is a plane, and a surface that is of the second substrate and that faces the first substrate is a plane. An outer surface of the first substrate (equivalent to a surface of the first substrate away from the second substrate) may be a curved surface, and an outer surface of the second substrate (equivalent to a surface of the second substrate away from the first substrate) may also be a curved surface.

In a possible implementation, there is only one annular second hollow structure between the first hydrophilic part and the second hydrophilic part, that is, N is 1, and there is no other structure between the first hydrophilic part and the second hydrophilic part. Corresponding to the structure of the hydrophilic layer, the first electrode plate may include a first sub-electrode. The first sub-electrode is a solid circular plate. An axis of the first sub-electrode is coaxial with the optical axis of the liquid aperture, so that the first sub-electrode may correspond to the first hydrophilic part. In the direction perpendicular to the optical axis of the liquid aperture, a radius of the first sub-electrode is greater than a radius of the first hydrophilic part and less than a radius of an inner edge of the second hydrophilic part, which is equivalent to that a projection of the first hydrophilic part on the hydrophobic layer falls within a projection of the first sub-electrode on the hydrophobic layer, and a projection of the second hydrophilic part on the hydrophobic layer is not connected to the projection of the first sub-electrode on the hydrophobic layer. When a voltage is applied to the first sub-electrode and the second electrode plate to form an electric field greater than or equal to a specified threshold between the first sub-electrode and the second electrode plate, a hydrophobic layer region corresponding to the first sub-electrode exhibits a hydrophilic characteristic relative to the transparent electrolyte, and a contact angle between the transparent electrolyte corresponding to the first sub-electrode and the hydrophobic layer may be changed, so that the transparent electrolyte may come into contact with this part of the hydrophobic layer, and the distribution state of the dyed oil is changed. A structure of the first sub-electrode herein relative to the first hydrophilic part and the second hydrophilic part limits a distribution range of the dyed oil, which is equivalent to controlling an adjustment range of the amount of light entering the liquid aperture.

In another possible implementation, there is only one annular second hollow structure between the first hydrophilic part and the second hydrophilic part, that is, N is 1, and there is no other structure between the first hydrophilic part and the second hydrophilic part. However, corresponding to a structure of the hydrophilic layer, the first electrode plate herein may include M arc electrodes and a central electrode that are disposed at a same layer, where M is an integer greater than or equal to 1. The central electrode is a solid circular plate. The central electrode is located in a central region of the first electrode plate. An axis of each arc electrode is coaxial with the optical axis of the liquid aperture. Radiuses of the arc electrodes are different. The central electrode and the arc electrodes are each externally connected to at least one lead. In use, a voltage may be separately applied to the central electrode and each arc electrode. In the direction perpendicular to the optical axis of the liquid aperture, a radius of an outer edge of an arc electrode located on an outermost side of the first electrode plate is greater than a radius of the first hydrophilic part and less than a radius of an inner edge of the second hydrophilic part. A width between an arc electrode adjacent to the central electrode and the central electrode is 10-50 μm. A width between any two adjacent arc electrodes is 10-50 μm. Such a width enables the transparent electrolyte corresponding to the arc electrode to still move depending on the motion inertia of the transparent electrolyte when the transparent electrolyte cannot be affected by the electric field between the first electrode plate and the second electrode plate. Therefore, the first electrode plate of such a structure can still adjust the size of the liquid aperture.

In still another possible implementation, there are two second hollow structures, that is, N=2. In this manner, there is an annular third hydrophilic part between the first hydrophilic part and the second hydrophilic part. An axis of the third hydrophilic part is coaxial with the optical axis of the liquid aperture. A radius of an inner edge of the third hydrophilic part is greater than a radius of the first hydrophilic part. A radius of an outer edge of the third hydrophilic part is less than a radius of an inner edge of the second hydrophilic part. In other words, the third hydrophilic part is neither connected to the first hydrophilic part nor connected to the second hydrophilic part, so that a second hollow structure is formed between the first hydrophilic part and the third hydrophilic part, and a second hollow structure is formed between the second hydrophilic part and the third hydrophilic part. Correspondingly, the first electrode plate includes a first sub-electrode and a third sub-electrode. The first sub-electrode is a solid circular plate. The first sub-electrode is located in a central region of the first electrode plate. The third sub-electrode is arc-shaped. The third sub-electrode surrounds the first sub-electrode. An axis of the first sub-electrode and an axis of the third sub-electrode are coaxial with the optical axis of the liquid aperture. The first sub-electrode and the third sub-electrode are each externally connected to at least one lead. A radius of an outer edge of the first sub-electrode is greater than the radius of the first hydrophilic part and less than the radius of the inner edge of the third hydrophilic part. A radius of an inner edge of the third sub-electrode is greater than the radius of the inner edge of the third hydrophilic part. A radius of an outer edge of the third sub-electrode is greater than the radius of the outer edge of the third hydrophilic part and less than the radius of the inner edge of the second hydrophilic part. The liquid aperture of this structure may form the light inlet hole including a circular hole and an annular hole surrounding the hole, and control the electric field to be correspondingly formed between the first sub-electrode, the third sub-electrode, and the second electrode plate, to correspondingly control distribution of the dyed oil corresponding to the two hollow structures, and further control adjustment of the size of the light inlet hole of the liquid aperture.

In yet another possible implementation, $N\geq 3$. To be specific, there are three, four, five, or even more integral second hollow structures between the first hydrophilic part and the second hydrophilic part. The hydrophilic layer herein further includes $N-1$ annular third hydrophilic parts located between the first hydrophilic part and the second hydrophilic part. An axis of each third hydrophilic part is coaxial with the optical axis of the liquid aperture. In a direction perpendicular to the optical axis of the liquid aperture, a radius of an inner edge of an $x^{th}$ third hydrophilic part of the hydrophilic layer in a sequence from inside to outside is $r_{xi}$, a radius of an outer edge is $r_{xj}$, and sizes of the third hydrophilic parts meet the following condition: $r_{1i}<r_{1j}<r_{2i}<r_{2j}<\ldots r_{(N-1)i}<r_{(N-1)j}$. Correspondingly, the first electrode plate includes a first sub-electrode and $N-1$ third sub-electrodes. The $N-1$ third sub-electrodes one-to-one correspond to the $N-1$ third hydrophilic parts. The first sub-electrode is located in a central region of the first electrode plate. The first sub-electrode is a solid circular plate. An axis of the first sub-electrode is coaxial with the optical axis of the liquid aperture. Each third sub-electrode is arc-shaped. An axis of each third sub-electrode is coaxial with the optical axis of the liquid aperture. The first sub-electrode and the third sub-electrodes are each externally connected to at least one lead. In the direction perpendicular to the optical axis of the liquid aperture, a radius of an inner edge of a $y^{th}$ third sub-electrode of the first electrode plate in a sequence from inside to outside is $R_{yi}$, a radius of an outer edge is $R_{yj}$, and sizes of the third sub-electrodes meet the following condition: $R_{1i}<R_{1j}<R_{2i}<R_{2j}<\ldots R_{(N-1)i}<R_{(N-1)j}$. A radius of the first sub-electrode is greater than a radius of the first hydrophilic part and less than a radius of an inner edge of a third hydrophilic part adjacent to the first hydrophilic part. For the $N-1$ third hydrophilic parts and the $N-1$ third sub-electrodes, when $x=y$, $r_{xi}<R_{yi}<r_{xj}<R_{yj}$. The liquid aperture of this structure may form the light inlet hole including a circular hole and at least two annular holes surrounding the hole. During operation, voltages applied to different parts (the first sub-electrode and the $N-1$ third sub-electrodes) of the first electrode plate are controlled, so that the size of the light inlet hole of the liquid aperture can be adjusted.

Specifically, in each group of the third hydrophilic part and the third sub-electrode that correspond to each other, when $x=y$, $R_{yi}-r_{xi}\geq 10$ μm. Such a structure setting may limit a distribution range of the dyed oil in the corresponding second hollow structure.

In a possible implementation, the first electrode plate may further include a second sub-electrode located in a peripheral region of the first electrode plate. The second sub-electrode is equivalent to an outermost structure located in the first electrode plate. The first sub-electrode and the second sub-electrode are disposed at a same layer. The second sub-electrode has a hollow middle part. The first electrode plate is located in a central region of the second sub-electrode. The second sub-electrode is externally connected to at least one lead. A distance between an inner edge of the second sub-electrode and the optical axis of the liquid aperture is less than the radius of the inner edge of the second hydrophilic part, so that a projection of the second hollow structure closest to the second sub-electrode on the hydrophobic layer and a projection of the second sub-electrode on the hydrophobic layer do not overlap. When the light inlet hole of the liquid aperture is narrowed, a voltage may be applied to the second sub-electrode and the second electrode plate, to change wettability between the hydrophobic layer corresponding to the second sub-electrode and the transparent electrolyte, so that the transparent electrolyte applies pressure to a part of the dyed oil corresponding to the second sub-electrode, and promotes the dyed oil to move toward the inner edge of the second hollow structure, which is equivalent to narrow the liquid aperture. During operation, different voltages may be applied to the first sub-electrode and the second sub-electrode, so that an intensity difference exists between the electric field formed between the first sub-electrode and the second electrode plate and an electric field formed between the second sub-electrode and the second electrode plate, to adjust the size of the light inlet hole of the liquid aperture based on a requirement.

In the liquid aperture provided in this application, different from the first electrode plate, the second electrode plate may be a solid plate structure, and the structure is continuous and not hollowed out.

In a possible implementation, in view of the foregoing structure of the hydrophilic layer, in the direction perpendicular to the optical axis of the liquid aperture, a distance between an inner edge of the sidewall and the optical axis of the liquid aperture is greater than the radius of the inner edge of the second hydrophilic part. This is equivalent to that a projection of the sidewall on the hydrophobic layer falls within a projection of the second hydrophilic part on the hydrophobic layer, so that the dyed oil does not come into contact with the sidewall. This avoids that the dyed oil comes into contact with the second electrode plate under a capillary function. Specifically, in the direction perpendicular to the optical axis of the liquid aperture, a distance between the inner edge of the sidewall and the inner edge of the second hydrophilic part may be greater than or equal to 0.1 mm.

According to a second aspect, based on the foregoing structure of the liquid aperture, this application further provides an electronic device. The electronic device may be specifically a smartphone, a tablet computer, a smartwatch, or the like that has a camera function. The electronic device includes a device body, a mainboard, and a camera. The mainboard is disposed in the device body, and the camera is installed on the device body. The liquid aperture according to any one of the foregoing implementations is disposed in the camera, and the mainboard is electrically connected to the first electrode plate and the second electrode plate of the liquid aperture. In use, the mainboard may adjust a voltage applied to the first electrode plate and the second electrode plate to change an electric field formed between the first electrode plate and the second electrode plate, to implement driving adjustment on the size of the light inlet hole of the liquid aperture. This meets an adjustment requirement of this type of electronic device for the amount of light entering during photographing or video taking.

According to a third aspect, this application further provides a driving method for a liquid aperture, used to adjust the size of the light inlet hole of the liquid aperture. The method specifically includes the following steps:

obtaining an aperture adjustment command; and when the aperture adjustment command indicates to widen the aperture, increasing electric field strength between the first electrode plate and the second electrode plate, to change a distribution state of the transparent electrolyte and the dyed oil, move the dyed oil toward an outer edge of a corresponding second hollow structure, and allow more light to pass through the liquid aperture; or when the aperture adjustment command indicates to narrow the aperture, decreasing electric field strength between the first electrode plate and the second electrode plate, to change a distribution state of the transparent electrolyte and the dyed oil, spread the dyed oil onto the corresponding hydrophobic layer, and allow less light to pass through the liquid aperture.

It should be understood that the electric field strength between the first electrode plate and the second electrode plate is changed by changing a voltage applied to the first electrode plate and the second electrode plate. The electric field change may change a contact angle between the hydrophobic layer and the transparent electrolyte, and change wettability between the hydrophobic layer and the transparent electrolyte, so that the transparent electrolyte can move in the closed cavity and push the dyed oil to move, to adjust the size of the light inlet hole of the liquid aperture.

There are at least two manners for obtaining the aperture adjustment command. In the first manner, the aperture adjustment command sent by a user is directly obtained. In other words, the user may directly change the voltage applied to the first electrode plate and the second electrode plate. In the second manner, the aperture adjustment command sent by a control center is obtained. The control center herein may be the mainboard in the foregoing electronic device, and controls the liquid aperture by using a software program.

According to a fourth aspect, this application further provides a driving apparatus for a liquid aperture. The driving apparatus is configured to drive the foregoing liquid aperture. For example, the driving apparatus may include modules or units configured to perform operations in the foregoing driving method for a liquid aperture, for example, include an obtaining module and an electric field adjustment module. The obtaining module is configured to obtain an aperture adjustment command. The electric field adjustment module is configured to invoke the aperture adjustment command to perform the following process: when the aperture adjustment command indicates to widen the aperture, increase electric field strength between the first electrode plate and the second electrode plate, to change a distribution state of the transparent electrolyte and the dyed oil, move the dyed oil toward an outer edge of a corresponding second hollow structure, and allow more light to pass through the liquid aperture; or the electric field adjustment module is further configured to: when the aperture adjustment command indicates to narrow the aperture, decrease electric field strength between the first electrode plate and the second electrode plate, to change a distribution state of the transparent electrolyte and the dyed oil, spread the dyed oil onto the corresponding hydrophobic layer, and allow less light to pass through the liquid aperture.

According to a fifth aspect, this application further provides an electronic device. The electronic device includes a processor, a memory, and the liquid aperture according to any one of the foregoing technical solutions. The memory is configured to store program instructions. The processor is configured to invoke the stored program instructions from the memory, to perform the foregoing driving method by using the liquid aperture.

BRIEF DESCRIPTION OF DRAWINGS

FIG. 3l is a schematic diagram of a cross-sectional structure of a liquid aperture according to Embodiment 1 of this application;

DESCRIPTION OF EMBODIMENTS

To make the objectives, technical solutions, and advantages of this application clearer, the following further describes this application in detail with reference to the accompanying drawings.

An application scenario of this application is first described. A liquid aperture is a new type of aperture, and may be applied to a device having a photographing function to control the amount of light entering a camera, especially an electronic device having a miniaturization requirement on size, quality, and space. The liquid aperture has more advantages than a mechanical aperture. An existing liquid aperture has various problems, for example, a high drive voltage, a small adjustable range of a hole size, a hole not round enough, a not repeatable central position of an opening, and a complex structure. These defects affect commercial feasibility of the liquid aperture. Therefore, an embodiment of this application provides a liquid aperture. The liquid aperture uses a simple structure design and adjusts the amount of light entering a camera according to an electrowetting principle.

Figure 1A:
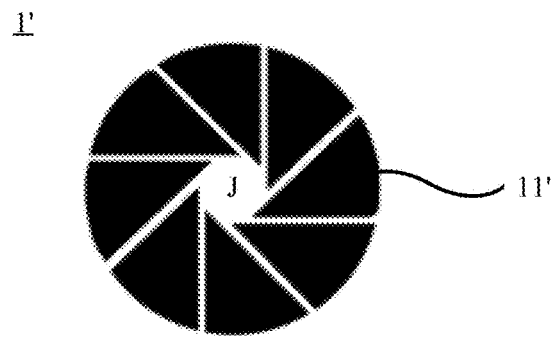
FIG. 1a and FIG. 1b each are a schematic diagram of a structure of a mechanical aperture.
Figure 1B:
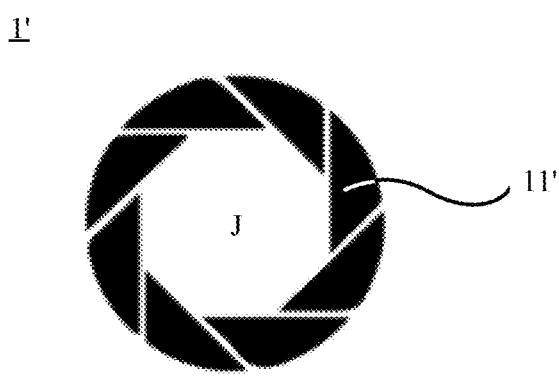
Figure 1C:
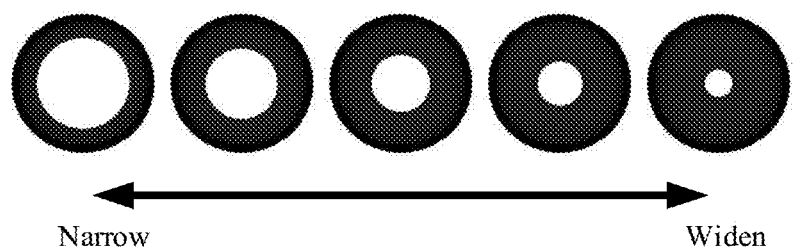
FIG. 1c is a schematic diagram of adjusting a size of a light inlet hole of a liquid aperture.
Figure 1D:
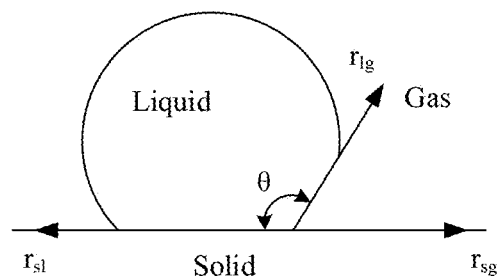
FIG. 1d is a schematic diagram of a principle of electrowetting effect.
Figure 2:
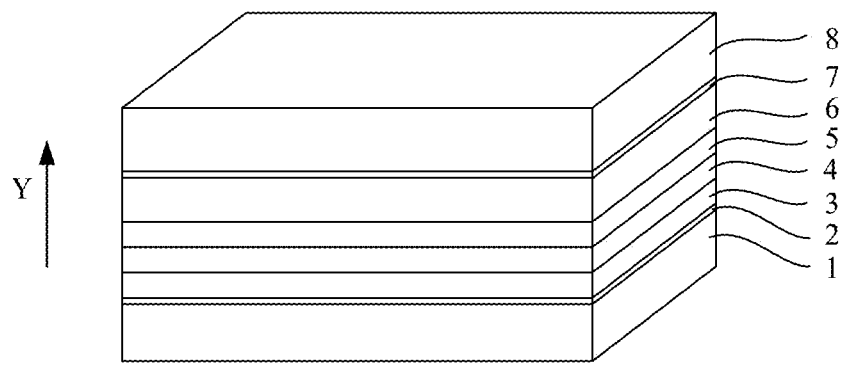
FIG. 2 is a schematic diagram of a structure of a liquid aperture according to Embodiment 1 of this application.

The following describes an example of a structure of the liquid aperture provided in this application with reference to the accompanying drawings. FIG. 2 shows a schematic diagram of a three-dimensional structure of a liquid aperture 01. In a Y direction in FIG. 2, the liquid aperture 01 includes a first substrate 1, a first electrode plate 2, an insulation layer 3, a hydrophobic layer 4, a hydrophilic layer 5, a sidewall 6, a second electrode plate 7, and a second substrate 8 that are disposed adjacent to each other in sequence from bottom to top. The Y direction herein is parallel to an optical axis of the liquid aperture 01.

As shown in FIG. 2, the first substrate 1 and the second substrate 8 are equivalent to an upper substrate structure and a lower substrate structure of the liquid aperture 01. Therefore, the first substrate 1 and the second substrate 8 are each a solid plate structure, and the structure is continuous and not hollowed out. The first substrate 1 may carry and support the first electrode plate 2, and the second substrate 8 may carry and support the second electrode plate 7. In addition, the first substrate 1 and the second substrate 8 may further protect the structure of the entire liquid aperture 01.

It should be understood that the first electrode plate 2 and the second electrode plate 7 in FIG. 2 are shown in a layered structure, to clearly indicate distribution locations of the first electrode plate 2 and the second electrode plate 7 in the entire liquid aperture 01. In an actual preparation process of the liquid aperture 01, a circuit wire that plays an electrode role in the first electrode plate 2 may be formed on a solid plate (the first electrode plate 2 shown in FIG. 2 is equivalent to being formed by the circuit wire in a plate structure). Alternatively, the circuit wire may be directly formed on the first substrate 1 in a manner such as electroplating (In this case, a thickness of the first electrode plate 2 may reach a nanometer level. Although the thickness is quite small, the first electrode plate 2 still has a certain thickness and structurally protrudes from a surface of the first substrate 1. Therefore, the first electrode plate 2 may still be understood as a "layer"). Correspondingly, a circuit that plays an electrode role in the second electrode plate 7 may be formed on a solid plate (the second electrode plate 7 shown in FIG. 2 is equivalent to being formed by a circuit wire in a plate structure). Alternatively, the circuit wire may be directly formed on the second substrate 8 in a manner such as electroplating (In this case, a thickness of the second electrode plate 7 may reach a nanometer level. Although the thickness is quite small, the second electrode plate 7 still has a certain thickness and structurally protrudes from a surface of the second substrate 8. Therefore, the second electrode plate 7 may still be understood as a "layer"). That is, the first electrode plate 2 and the second electrode plate 7 are shown in the layered structure in FIG. 2, and are merely used as an example of the locations of the first electrode plate 2 and the second electrode plate 7 in the entire liquid aperture 01, but are not used to limit specific implementation forms of the first electrode plate 2 and the second electrode plate 7.

The insulation layer 3 may be disposed on a side that is of the first electrode plate 2 and that faces the second substrate 8, to insulate and isolate the first electrode plate 2 from the hydrophobic layer 4, which is equivalent to insulating and isolating the hydrophobic layer 4 and a structure above the hydrophobic layer 4 from the first electrode plate 2. The insulation layer 3 is a solid plate structure made of an insulation material, and the structure is continuous and not hollowed out. An outer edge of the insulation layer 3 is a rectangle matching the first substrate 1. A thickness of the insulation layer 3 is 0.5-1 µm. For example, the thickness of the insulation layer 3 may be 0.5 µm, 0.6 µm, 0.8 µm, or 1 µm.

Herein, the hydrophobic layer 4 and the hydrophilic layer 5 are relative, and both exhibit hydrophobic or hydrophilic characteristics relative to a same liquid. Certainly, "water" herein refers to a liquid flowable substance, and is not limited to water in common sense. The hydrophobic layer 4 refers to a layered substance that exhibits a hydrophobic characteristic relative to the liquid. Correspondingly, the hydrophilic layer 5 refers to a layered substance that exhibits a hydrophilic characteristic relative to the liquid.

When the liquid aperture 01 is used, the light inlet hole for light transmission needs to be formed in a middle of a light blocking structure. It should be understood that the optical axis of the liquid aperture 01 is parallel to the Y direction, so that light passes through the liquid aperture 01 in a direction parallel to the Y direction. Specifically, in this embodiment of this application, the first substrate 1, the first electrode plate 2, the insulation layer 3, the hydrophobic layer 4, the hydrophilic layer 5, the second electrode plate 7, and the second substrate 8 have light transmission, and the sidewall 6 blocks light herein. A manner of forming the light inlet hole and adjustment of the light inlet hole are described by using the following specific implementations as examples.

Embodiment 1

Figure 3A:
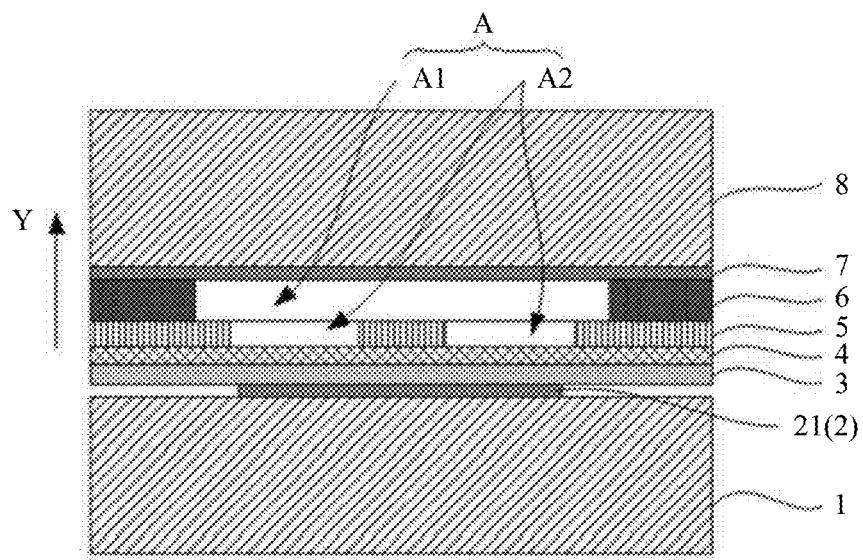
FIG. 3a is a schematic diagram of a cross-sectional structure of a liquid aperture not filled with liquid according to Embodiment 1 of this application.

FIG. 3a shows a schematic diagram of a cross-sectional structure of a liquid aperture 01. To clearly show a hardware structure of the liquid aperture 01, the liquid aperture 01 shown in FIG. 3a is not filled with liquid. As shown in FIG. 3a, in a Y direction in FIG. 3a, the liquid aperture 01 includes a first substrate 1, a first electrode plate 2 (shown by a first sub-electrode 21 herein), an insulation layer 3, a hydrophobic layer 4, a hydrophilic layer 5, a sidewall 6, a second electrode plate 7, and a second substrate 8 that are disposed adjacent to each other in a specific sequence (namely, in the bottom-to-top direction shown by Y in FIG. 3a, it should be understood that an optical axis of the liquid aperture 01 is parallel to the Y direction). A central region of the sidewall 6 has a first hollow structure A1. The hydrophilic layer 5 has a second hollow structure A2. The first hollow structure A1 communicates with the second hollow structure A2 to form a closed cavity A among the second electrode plate 7, the hydrophilic layer 5, the sidewall 6, and the hydrophobic layer 4. The following describes in detail with reference to all layers of structures.

Figure 3B:
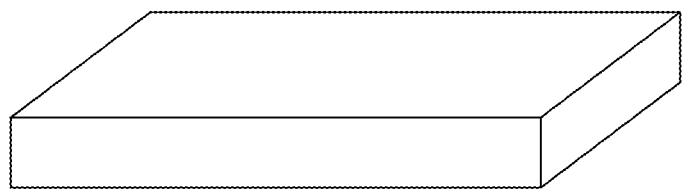
FIG. 3b is a schematic diagram of a structure of a first substrate of a liquid aperture according to Embodiment 1 of this application.
Figure 3C:
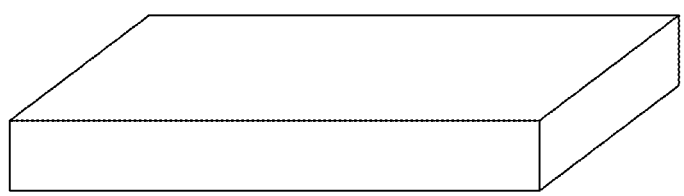
FIG. 3c is a schematic diagram of a structure of a second substrate of a liquid aperture according to Embodiment 1 of this application.

Based on the structure of the liquid aperture 01 shown in FIG. 3a, FIG. 3b and FIG. 3c show structures of the first substrate 1 and the second substrate 8 in this embodiment of this application. Both the first substrate 1 and the second substrate 8 are solid plate structures, and an outer edge of the first substrate 1 and an outer edge of the second substrate 8 are rectangular in a direction perpendicular to the optical axis of the liquid aperture 01. As shown in FIG. 3b and FIG. 3c, both upper and lower surfaces of the first substrate 1 are planes, and both upper and lower surfaces of the second substrate 8 are also planes. The first substrate 1 and the second substrate 8 herein have high light transmission during specific implementation. In a possible implementation, the first substrate 1 and the second substrate 8 may be glass.

Figure 3D:
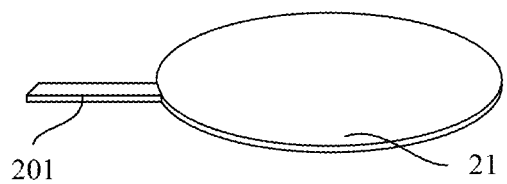
FIG. 3d is a schematic diagram of a structure of a first electrode plate of a liquid aperture according to Embodiment 1 of this application.

FIG. 3d shows a structure of the first electrode plate 2. The first sub-electrode 21 included in the first electrode plate 2 is a solid plate transparent electrode, and the structure is continuous and not hollowed out. A specific material may be ITO, nano-silver, or another transparent electrode material. The first sub-electrode 21 is externally connected to a lead 201. When a voltage needs to be applied to the first electrode plate 2, the first sub-electrode 21 is connected to an external power supply through the lead 201. It should be understood that only one lead 201 is shown herein. During actual application, one or more leads 201 may be disposed in a specific application scenario. In addition, a connection direction between the lead 201 and the first sub-electrode 21 is not limited to a manner in which the lead 201 and the first sub-electrode 21 are disposed at a same layer in FIG. 3d, and the connection direction may be adjusted in a manner of disposing the first electrode plate 2 in a specific structure. It should be noted that, when the first sub-electrode 21 herein is directly formed on the first substrate 1 in an electroplating manner, a thickness of the first electrode plate 2 may be 20-30 nm. For example, the thickness of the first electrode plate 2 may be 20 nm, 22 nm, 25 nm, 28 nm, or 30 nm.

Figure 3E:
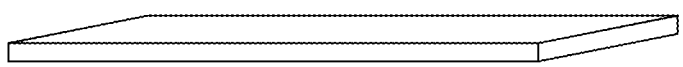
FIG. 3e is a schematic diagram of a structure of an insulation layer of a liquid aperture according to Embodiment 1 of this application.

For a structure of the insulation layer 3, refer to FIG. 3e. The insulation layer 3 is a solid plate structure made of an insulation material, and the structure is continuous and not hollowed out.

Figure 3F:
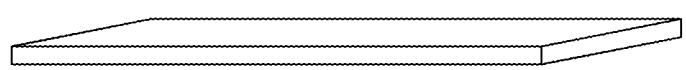
FIG. 3f is a schematic diagram of a structure of a hydrophobic layer of a liquid aperture according to Embodiment 1 of this application.

For a structure of the hydrophobic layer 4, refer to FIG. 3f. The hydrophobic layer 4 is a continuous and solid layered structure disposed on a side of the insulation layer 3 away from the first electrode plate 2. The hydrophobic layer 4 may be specifically a solid plate structure prepared from a fluorine-containing polymer, and has high light transmission. An outer edge of the hydrophobic layer 4 is a rectangle matching the first substrate 1, and has a thickness of 0.02-1 µm. For example, the thickness of the hydrophobic layer 4 may be 0.02 µm, 0.1 µm, 0.25 µm, 0.3 µm, 0.5 µm, 0.75 µm, or 1 µm. In a case of normal temperature and normal pressure and without power-on, a water-gas contact angle of the hydrophobic layer 4 should be greater than 110°.

The hydrophilic layer 5 is a layered structure disposed on a side of the hydrophobic layer 4 away from the insulation layer 3, but the layered structure of the hydrophilic layer 5 is discontinuous. For a structure of the hydrophilic layer 5, refer to FIG. 3g. The hydrophilic layer 5 includes a first hydrophilic part 51 and a second hydrophilic part 52. The first hydrophilic part 51 and the second hydrophilic part 52 are disposed on the same hydrophilic layer 4. The first hydrophilic part 51 and the second hydrophilic part 52 have a same thickness. The first hydrophilic part 51 is cylindrical. The first hydrophilic part 51 is located in a central region of the entire hydrophilic layer 5. The second hydrophilic part 52 is of a frame shape. An outer edge is shown in a rectangle. A central region has a cylindrical hollow part. In other words, an inner edge of the second hydrophilic part 52 is equivalent to a cylindrical surface. The first hydrophilic part 51 is located in a central region of the cylindrical hollow part. An annular second hollow structure A2 is formed between the inner edge of the cylindrical hollow part of the second hydrophilic part 51 and an outer edge of the first hydrophilic part 51. During operation, an axis of the second hollow structure A2 is coaxial with the optical axis of the liquid aperture 01. The second hollow structure A2 is equivalent to penetrating through the hydrophilic layer 5 in a thickness direction of the hydrophilic layer 5. Therefore, a surface of the hydrophobic layer 4 facing the second electrode plate 7 may be partially exposed from the second hollow structure A2. The hydrophilic layer 5 may be made of photoresist, and has a thickness of 0.5-3 μm. For example, the thickness of the hydrophilic layer 5 may be 0.5 μm, 1 μm, 1.6 μm, 2.5 μm, and 3 μm. In a case of normal temperature and normal pressure and without power-on, a water-gas contact angle of the hydrophilic layer 5 is less than 70°.

The sidewall 6 is disposed between the hydrophilic layer 5 and the second electrode plate 7. The sidewall 6 is also of a frame shape. As shown in FIG. 3h, an outer edge of the sidewall 6 is a rectangle matching the first substrate 2. There is a cylindrical hollow middle part. In other words, an inner edge of the sidewall 6 is equivalent to a cylindrical surface. The cylindrical hollow part forms the first hollow structure A1. It should be understood that the first hollow structure A1 penetrates through the sidewall 6 along a thickness of the sidewall 6, so that a surface that is of the second electrode plate 7 and that faces the first electrode plate 2 is partially exposed. Herein, a height of the sidewall 6 (namely, a size in the Y direction shown in FIG. 3a) is 0.05-2 mm. For example, the height of the sidewall 6 may be 0.05 mm, 0.8 mm, 1 mm, 1.2 mm, 1.6 mm, or 2 mm. Herein, the sidewall 6 may be made of photoresist, and is directly prepared on the second electrode plate 7 through UV lithography. The sidewall 6 and the hydrophilic layer 5 are independent of each other, and need to be bonded through an adhesive (such as a pressure-sensitive adhesive and an epoxy resin adhesive) during preparation. Such a bonding manner helps reduce stress of the insulation layer 3, the hydrophobic layer 4, and the hydrophilic layer 5, and can improve reliability and prolong a service life of a device.

Figure 3G:
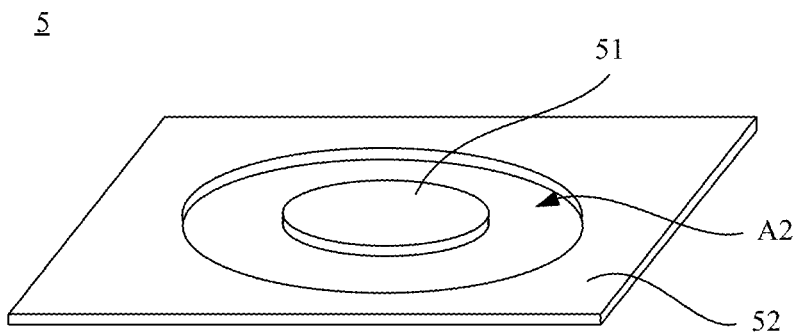
FIG. 3g is a schematic diagram of a structure of a hydrophilic layer of a liquid aperture according to Embodiment 1 of this application.
Figure 3H:
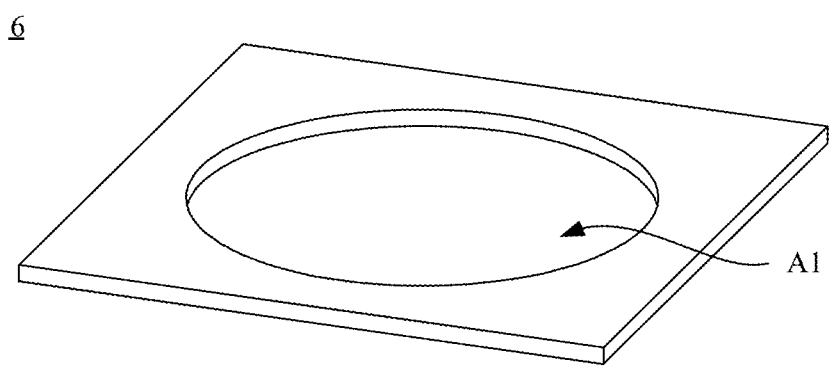
FIG. 3h is a schematic diagram of a structure of a sidewall of a liquid aperture according to Embodiment 1 of this application.

With reference to FIG. 3a, FIG. 3g, and FIG. 3h, the first hollow structure A1 and the second hollow structure A2 in this embodiment of this application communicate with each other to form a closed cavity A among the hydrophobic layer 4, the second electrode plate 7, the hydrophilic layer 5, and the sidewall 6. The sidewall 6 and the hydrophilic layer 5 function as a sealing structure between the hydrophobic layer 4 and the second electrode plate 7.

Figure 3I:
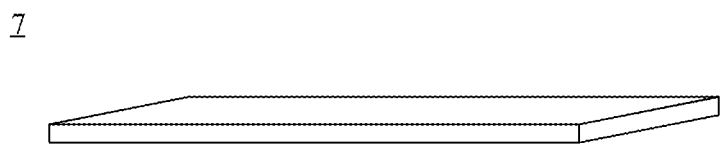
FIG. 3i is a schematic diagram of a structure of a second electrode plate of a liquid aperture according to Embodiment 1 of this application.

For a structure of the second electrode plate 7, refer to FIG. 3i. The second electrode plate 7 may be a rectangular transparent electrode. A specific material may be ITO, nano-silver, or another transparent electrode material. The second electrode plate 7 herein is also a solid plate structure, and an outer edge is a rectangle matching the first substrate 1. When the second electrode plate 7 herein is directly formed on the first substrate 1 in an electroplating manner, a thickness of the second electrode plate 7 may be 20-30 nm. For example, the thickness of the second electrode plate 7 may be 20 nm, 22 nm, 25 nm, 28 nm, or 30 nm.

Figure 3J:
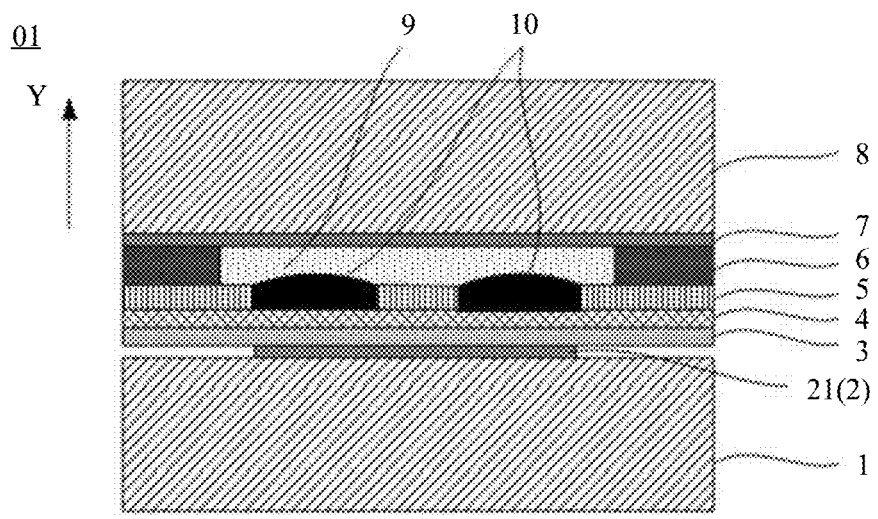
FIG. 3j is a schematic diagram of a cross-sectional structure of a liquid aperture according to Embodiment 1 of this application.

The liquid aperture 01 shown in FIG. 3j may be obtained by aligning and stacking the foregoing structures in a specified sequence. In the liquid aperture 01, the first electrode plate 2 is shown in a form of the first sub-electrode 21. It should be understood that, for structural integrity, outer edges of the first substrate 1, the insulation layer 3, the hydrophobic layer 4, the hydrophilic layer 5, the sidewall 6, the second electrode plate 7, and the second substrate 8 may be of a same shape, and the first electrode plate 2 may be filled with another structure 2' at an edge of the first sub-electrode 21 as shown in FIG. 3k, so that an outer edge of a region in which the first electrode plate 2 is located may also be aligned with a structure of another layer.

Figure 3K:
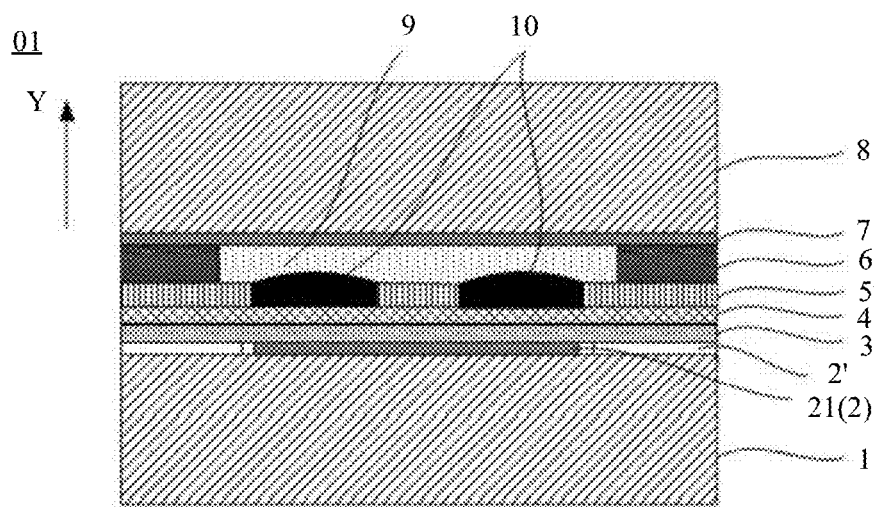
FIG. 3k is a schematic diagram of a cross-sectional structure of a liquid aperture according to Embodiment 1 of this application.
Figure 31:
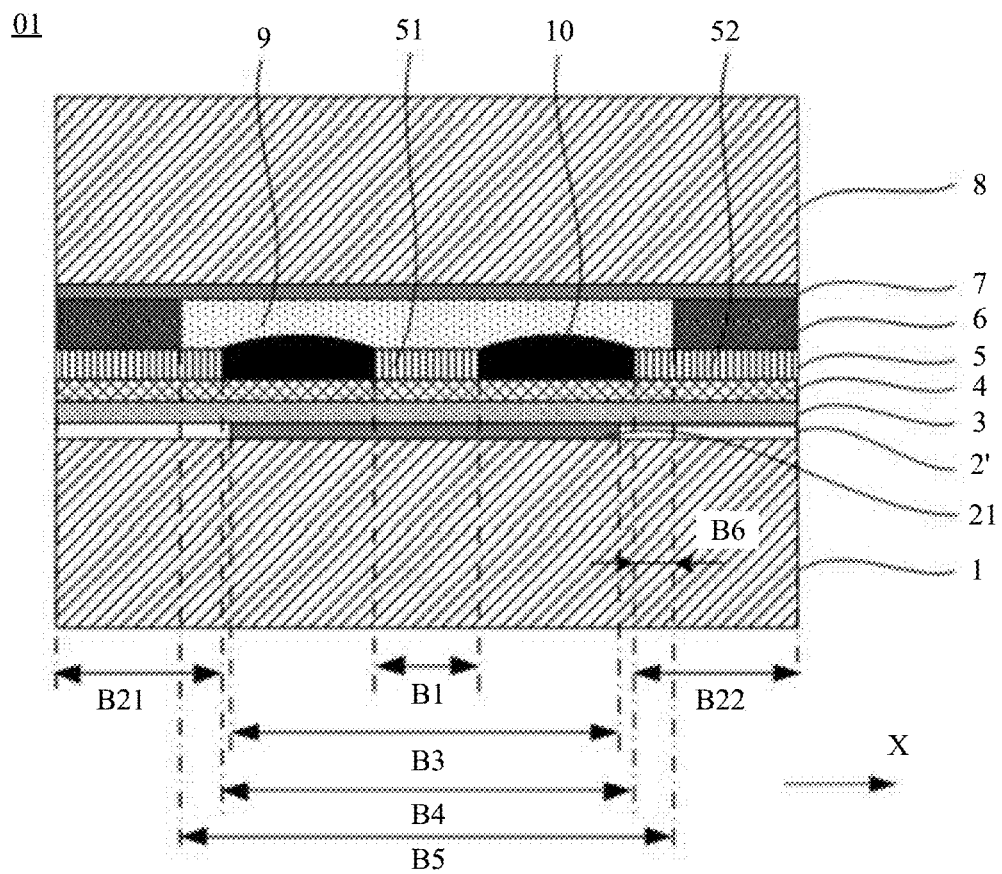

FIG. 3k shows an example of a structure of the liquid aperture. With reference to the structure shown in FIG. 3a, the closed cavity A is filled with a transparent electrolyte 9 and dyed oil 10. The transparent electrolyte 9 is a transparent salt-containing solution, and has high transmittance to some or all spectra of visible light and infrared light. The dyed oil 10 is dye-containing oily liquid, and has low transmittance to some or all spectra of visible light and infrared light. In other words, when the liquid aperture 01 is applied to a device having a photographing function, light may pass through the transparent electrolyte 9, but basically cannot pass through the dyed oil 10. A distribution state of the dyed oil 10 may be reflected as a state of a formable peripheral shadow of a light inlet hole. In other words, distribution of the dyed oil 10 determines a size of the light inlet hole of the liquid aperture 01, and the distribution state of the dyed oil 10 herein is changed by a distribution state of the transparent electrolyte 9. A hydrophilic characteristic of the hydrophilic layer 5 and a hydrophobic characteristic of the hydrophobic layer 4 in this embodiment of this application are reflected relative to the transparent electrolyte 9 herein. In addition, surface adsorbability of the hydrophilic layer 5 to the transparent electrolyte 9 is greater than surface adsorbability of the hydrophobic layer 4 to the transparent electrolyte 9. Surface adsorbability of the hydrophilic layer 5 to the dyed oil 10 is less than surface adsorbability of the hydrophobic layer 4 to the dyed oil 10. During operation, the distribution state of the dyed oil 10 may be changed by changing a wetting state between the transparent electrolyte 9 and both of the hydrophobic layer 4 and the hydrophilic layer 5, to adjust the size of the light inlet hole of the liquid aperture 01.

As shown in FIG. 3k, the closed cavity A is filled with the transparent electrolyte 9 and the dyed oil 10 that are incompatible with each other. There is always a boundary between the transparent electrolyte 9 and the dyed oil 10 (as shown in FIG. 3k, the second hollow structure A2 is substantially filled with the dyed oil 10, the first hollow structure A1 is substantially filled with the transparent electrolyte 9, the boundary between the transparent electrolyte 9 and the dyed oil 10 is substantially equivalent to a contact surface between the sidewall 6 and the hydrophilic layer 5, and under surface tension of the liquid, the dyed oil 10 slightly protrudes toward the transparent electrolyte 9). It should be understood that, due to the liquid property of the transparent electrolyte 9 and the structure limitation of the closed cavity A, the transparent electrolyte 9 does not completely come into no contact with the hydrophobic layer 4. Microscopically, the transparent electrolyte 9 is in wetting connection to the hydrophobic layer 4 at an edge of the second hollow structure A2 to a slight extent (an extent that cannot be shown in the figure), which is macroscopically reflected as a state shown in FIG. 3k. Such a relationship is the basis for changing a contact angle between the hydrophobic layer 4 and the transparent electrolyte 9.

In the state shown in FIG. 3k, a volume of the closed cavity A occupied by the transparent electrolyte 9 is constant, and a volume of the closed cavity A occupied by the dyed oil 10 is also constant. It should be understood that, if the transparent electrolyte 9 flows into a space occupied by the dyed oil 10, the transparent electrolyte 9 is equivalent to intruding into a space occupied by the dyed oil 10, and the dyed oil 10 is "extruded" to enter a vacant space of the transparent electrolyte 9.

It should be noted that, to meet the foregoing distribution state of the transparent electrolyte 9 and the dyed oil 10, density of the transparent electrolyte 9 in an ideal state should be equal to density of the dyed oil 10. However, a conventional technology cannot achieve this effect. Considering implementability of the technology, a density difference between the transparent electrolyte 9 and the dyed oil 10 is less than or equal to 0.09 g/cm$^3$. Such a small density difference may minimize impact of a gravity difference caused by the density difference on distribution of the transparent electrolyte 9 and the dyed oil 10, and a small density difference may keep a stable position and shape between the transparent electrolyte 9 and the dyed oil 10. In addition, during specific implementation, a distance between the second electrode plate 7 and the hydrophobic layer 4 (which is equivalent to a sum of thicknesses of the hydrophilic layer 5 and the sidewall 6) is minimized, so that a capillary function in the entire closed cavity is strong enough to offset impact of a part of the gravity difference between the transparent electrolyte 9 and the dyed oil 10 on shapes and distribution changes of the transparent electrolyte 9 and the dyed oil 10.

In the structure shown in FIG. 3k, the transparent electrolyte 9 separates the dyed oil 10 from the second electrode plate 7, and the transparent electrolyte 9 may be connected to the second electrode plate 7. During operation, a voltage may be applied to the first electrode plate 2 and the second electrode plate 7 respectively, so that an electric field is formed between the first electrode plate 2 and the second electrode plate 7. If strength of the formed electric field is greater than or equal to a specified threshold of electric field strength, a contact angle between the transparent electrolyte 9 and the hydrophobic layer 4 is decreased according to an electrowetting principle. When the contact angle between the transparent electrolyte 9 and the hydrophobic layer 4 decreases, the transparent electrolyte 9 moves downward to come into contact with the hydrophobic layer 4. The transparent electrolyte 9 is equivalent to occupying a part of the space occupied by the dyed oil 10, and the dyed oil 10 is extruded by the transparent electrolyte 9. That is, shapes and distribution of the transparent electrolyte 9 and the dyed oil 10 in the closed cavity A change. In this change process, because light can pass through the transparent electrolyte 9, but is blocked by the dyed oil 10, the distribution of the transparent electrolyte 9 and the dyed oil 10 in the closed cavity A is equivalent to determining the size of the light inlet hole of the liquid aperture 01. Therefore, the voltage applied to the first electrode plate 2 and the second electrode plate 7 may be controlled to change the electric field strength between the first electrode plate 2 and the second electrode plate 7, and the distribution state of the transparent electrolyte 9 and the dyed oil 10 in the closed cavity A may be changed. Through a proper structure design, the state change between the transparent electrolyte 9 and the dyed oil 10 may be reflected as an increase and a decrease of the amount of light entering the liquid aperture 01. It should be understood that the foregoing specified threshold for changing the electric field in the distribution state of the transparent electrolyte 9 and the dyed oil 10 in the closed cavity A is equivalent to a critical electric field value for enlarging or narrowing the liquid aperture 01. When the electric field strength between the first electrode plate 2 and the second electrode plate 7 is greater than or equal to the specified threshold, the electric field is an effective electric field. When the electric field strength between the first electrode plate 2 and the second electrode plate 7 is less than the specified threshold, the electric field is an ineffective electric field.

As shown in FIG. 3l, the hydrophobic layer 4 is used as a reference. For a projection of the first hydrophilic part 51 on the hydrophobic layer 4, refer to B1. For a projection of the second hydrophilic part 52 on the hydrophobic layer 4, refer to B21 and B22. For a projection of the first sub-electrode 21 of the first electrode plate 2 on the hydrophobic layer 4, refer to B3. It may be seen that the projection of the first hydrophilic part 51 on the hydrophobic layer 4 falls within the projection of the first sub-electrode 21 on the hydrophobic layer 4, and the projection of the first sub-electrode 21 on the hydrophobic layer 4 is not connected to the projection of the second hydrophilic part 52 on the hydrophobic layer 4. In addition, a projection of the sidewall 6 on the hydrophobic layer 4 falls within the projection of the second hydrophilic part 52 on the hydrophobic layer 4. A size of an inner edge of the second hydrophilic part 52 is B4. A size of a cylindrical hollow part in a central region of the sidewall 6 is B5. B4 is less than B5. In other words, in the direction perpendicular to the optical axis of the liquid aperture 01 (namely, an X direction in FIG. 3l), a radius of an outer edge of the first sub-electrode 21 is greater than a radius of the first hydrophilic part 51 and less than a radius of an inner edge of the second hydrophilic part 52. A distance between an inner edge of the sidewall 6 and the optical axis is greater than the radius of the inner edge of the second hydrophilic part 52. Herein, the inner edge of the sidewall 6 is equivalent to a cylindrical surface. In this case, the distance between the inner edge of the sidewall 6 and the optical axis is the radius of the inner edge of the sidewall 6. In addition, a size B6 of a closest part between the inner edge (equivalent to a side wall of the cylindrical hollow part in the central region of the sidewall 6) of the sidewall 6 and the inner edge of the second hydrophilic part 52 is not less than 0.1 mm. In other words, a distance between the inner edge of the sidewall 6 and the inner edge of the second hydrophilic part 52 is greater than or equal to 0.1 mm. Such a structure design considers an operation principle of the liquid aperture 01 provided in this embodiment of this application. The following describes in detail the operation process of the liquid aperture 01 shown in FIG. 3l.

Figure 3M:
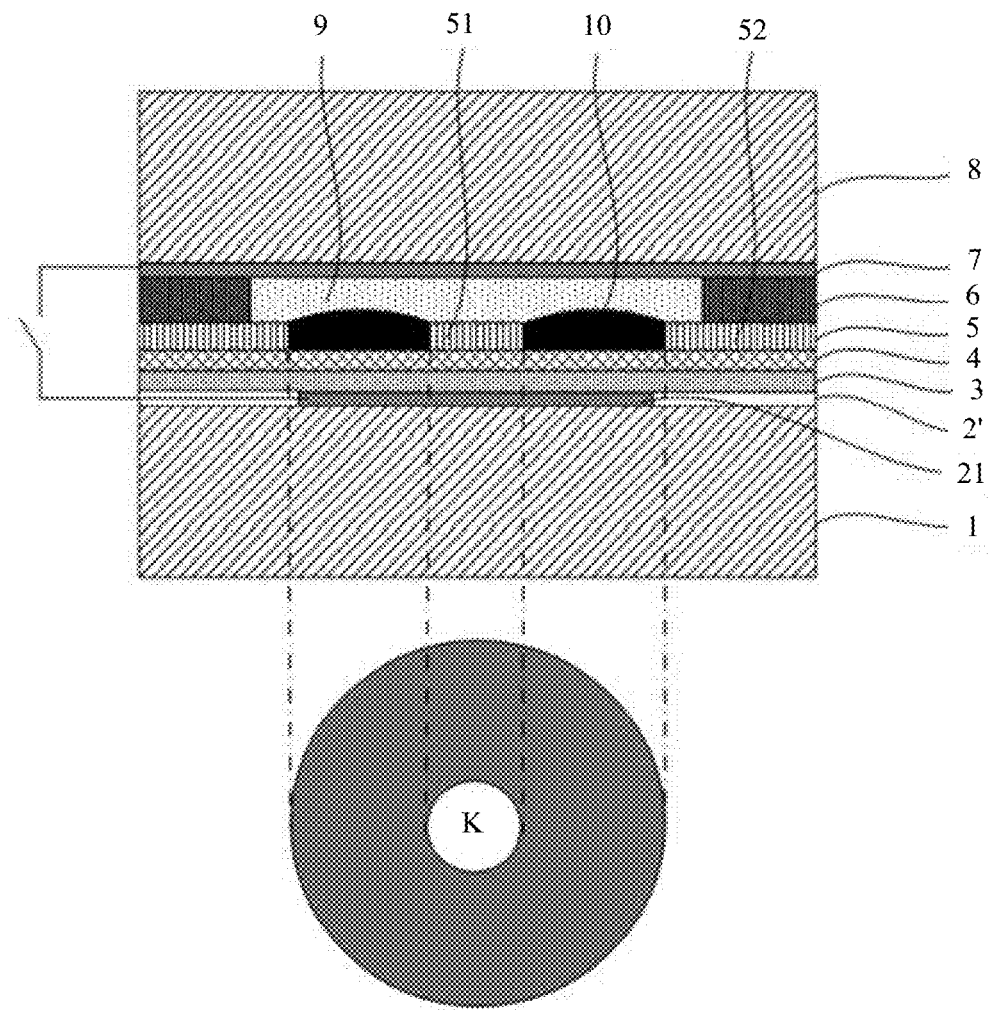
FIG. 3m to FIG. 3p each are a schematic diagram of a process of adjusting a size of a light inlet hole of a liquid aperture according to Embodiment 1 of this application.

Based on the state of the liquid aperture 01 shown in FIG. 3m, the closed cavity A is filled with the transparent electrolyte 9 and the dyed oil 10, and there is a boundary between the transparent electrolyte 9 and the dyed oil 10. In this case, no voltage is applied to the first sub-electrode 21 and the second electrode plate 7. Therefore, no electric field is formed between the first sub-electrode 21 and the second electrode plate 7 (or a voltage is applied to the first sub-electrode 21 and the second electrode plate 7, but the electric field formed between the first sub-electrode 21 and the second electrode plate 7 is not an effective electric field). A contact angle between the transparent electrolyte 9 and the hydrophobic layer 4 is large. The hydrophobic layer 4 exhibits a hydrophobic characteristic relative to the transparent electrolyte 9. The first hollow structure A1 is substantially filled with the transparent electrolyte 9. The second hollow structure A2 is substantially filled with the dyed oil 10. The dyed oil 10 is equivalent to forming an oil ring that can prevent light from passing through. An inner ring of the oil ring is equivalent to a light inlet hole K of the liquid aperture 01. A size of the light inlet hole K of the liquid aperture 01 is equivalent to a size of the first hydrophilic part 51, and is also equivalent to a size of the inner ring of the dyed oil 10 (refer to a schematic diagram of a structure of an oil ring in the lower part of FIG. 3m).

Figure 3N:
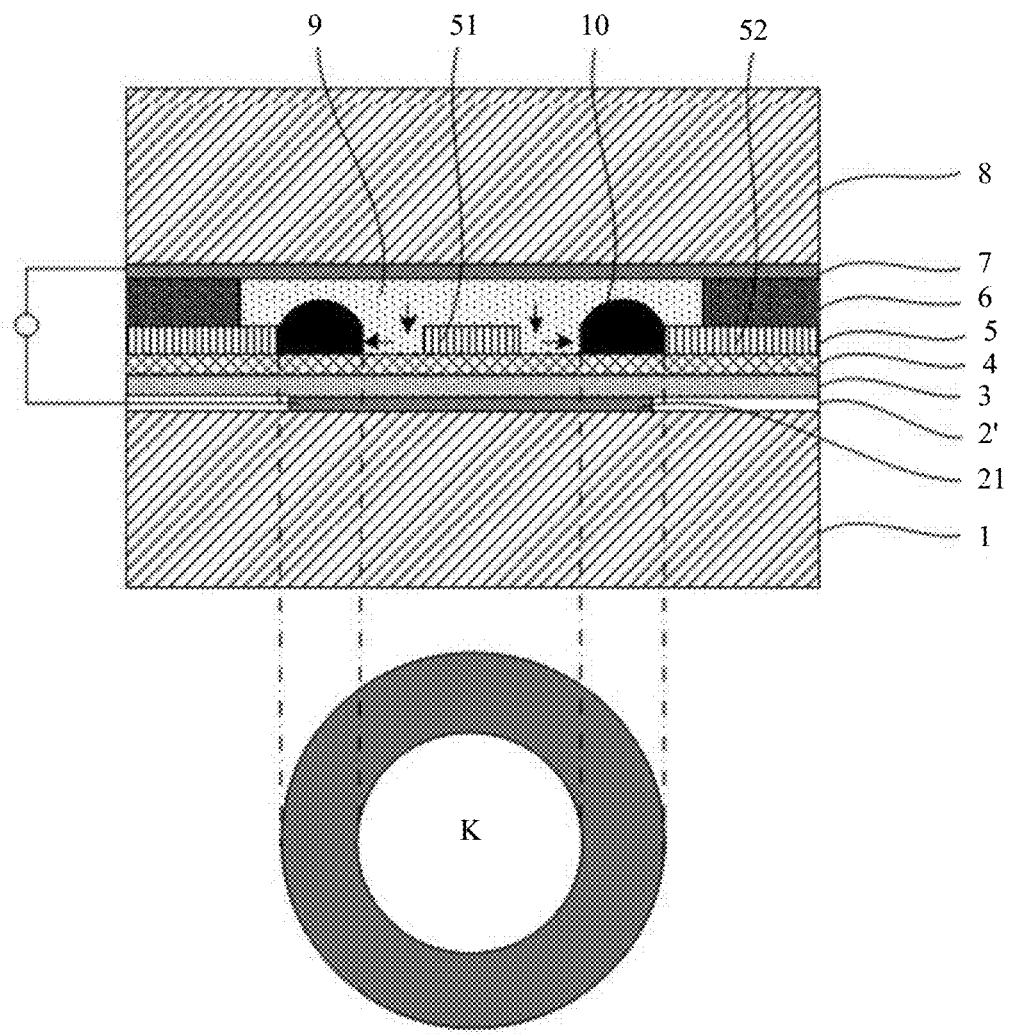

As shown in FIG. 3n, when a voltage is applied to the first sub-electrode 21 and the second electrode plate 7, an effective electric field with sufficient strength is formed between the first sub-electrode 21 and the second electrode plate 7, so that the contact angle between the transparent electrolyte 9 and the hydrophobic layer 4 decreases, and the hydrophobic layer 4 corresponding to the first sub-electrode 21 exhibits a hydrophilic characteristic relative to the transparent electrolyte 9. The transparent electrolyte 9 enters the second hollow structure A2 downward along vertical downward arrows in FIG. 3n, and comes into contact with the hydrophobic layer 4. Such movement of the transparent electrolyte 9 generates a thrust along horizontal arrows in FIG. 3n to push the dyed oil 10 to an outer edge of the second hollow structure A2 (equivalent to the inner edge of the second hydrophilic part 52). In addition, because a volume of the dyed oil 10 is constant, a height of the dyed oil 10 increases. However, the transparent electrolyte 9 still isolates the dyed oil 10 from the second electrode plate 7. In the state shown in FIG. 3n, an outer diameter of the oil ring formed by the dyed oil 10 does not change, but an inner diameter increases, which is equivalent to that the light inlet hole K of the liquid aperture 01 is enlarged.

Figure 3O:
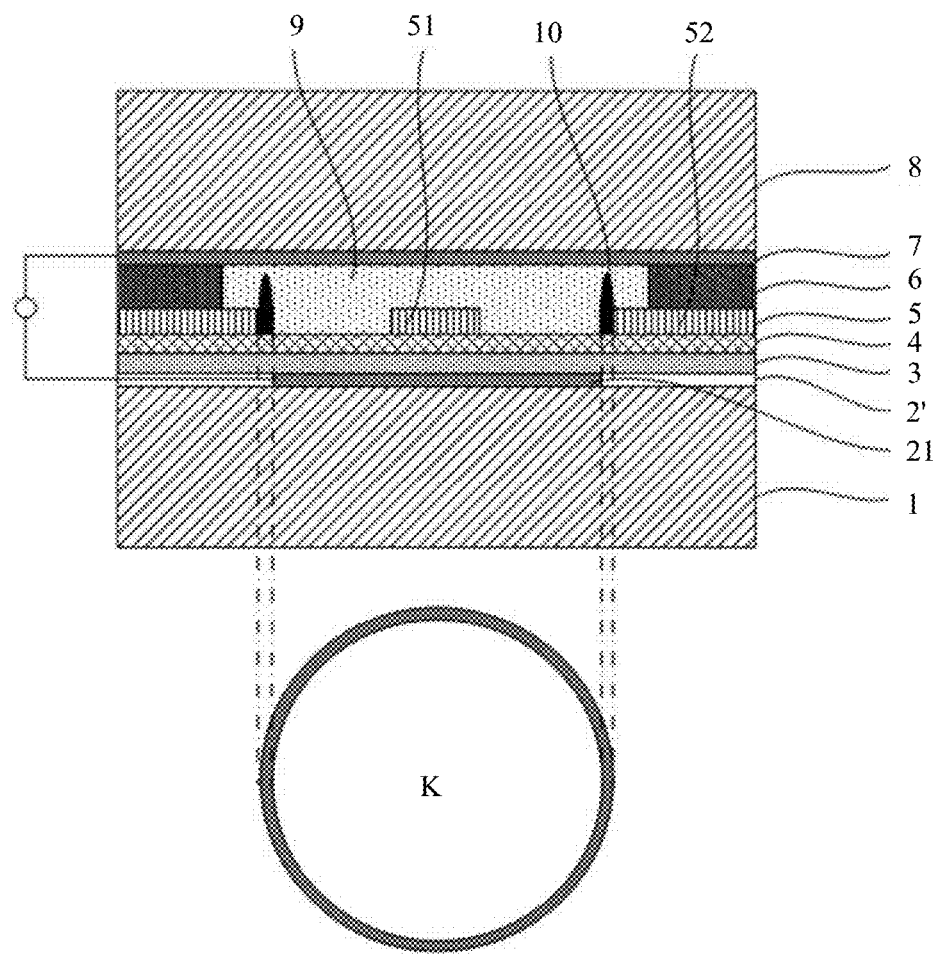

When the effective electric field that can drive the transparent electrolyte 9 to move is formed between the first sub-electrode 21 and the second electrode plate 7, the transparent electrolyte 9 continuously moves along the arrows in FIG. 3n, and keeps pushing the dyed oil 10 toward the outer edge of the second hollow structure A2 (equivalent to the inner edge of the second hydrophilic part 52). Because the electric field formed between the first sub-electrode 21 and the second electrode plate 7 is equivalent to corresponding to the first sub-electrode 21, and a range of an edge of the first sub-electrode 21 is less than a range of the outer edge of the second hollow structure A2, when the transparent electrolyte 9 moves near the edge of the first sub-electrode 21, the electric field disappears, the transparent electrolyte 9 may no longer generate movement shown in FIG. 3n, and push extrusion effect on the dyed oil 10 also disappears. A distribution range and a shape of the dyed oil 10 are shown in FIG. 3o. To be specific, the dyed oil 10 is attached to the inner edge of the second hydrophilic part 52 on the outer edge of the second hollow structure A2. A width of the oil ring formed by the dyed oil 10 reaches the minimum, and correspondingly, the size of the light inlet hole K of the liquid aperture 01 reaches the maximum. Certainly, the height of the dyed oil 10 reaches the maximum. Herein, the transparent electrolyte 9 still isolates the dyed oil 10 from the second electrode plate 7.

It may be learned that in the liquid aperture 01 provided in this embodiment of this application, the size of the first hydrophilic part 51 is equivalent to limiting a minimum value of the light inlet hole K of the liquid aperture 01, and the inner edge of the second hydrophilic part 52 is equivalent to limiting a maximum value of the light inlet hole K of the liquid aperture 01 (certainly, the minimum width of the dyed oil 10 after extrusion should be further considered herein). In a possible implementation, a diameter of the first hydrophilic part 51 may be 0.5-2 mm, and a diameter of the inner edge of the second hydrophilic part 52 may be 2.5-10 mm. Based on experimental data, an adjustment rate of the light inlet hole of the liquid aperture 01 in this embodiment of this application is approximately 1.2-8. In actual production and use, selection may be performed based on a use requirement.

It should be noted that, in the foregoing operation process, due to a structural design of the sidewall 6 and the second hydrophilic part 52, the dyed oil 10 always comes into no contact with the sidewall 6. Ibis can avoid that the dyed oil 10 comes into contact with the second electrode plate 7 along the sidewall 6 due to a capillary function. This can further reduce resistance of closing the opened liquid aperture 01, decrease a drive voltage, and increase a reaction speed of the liquid aperture 01.

Figure 3P:
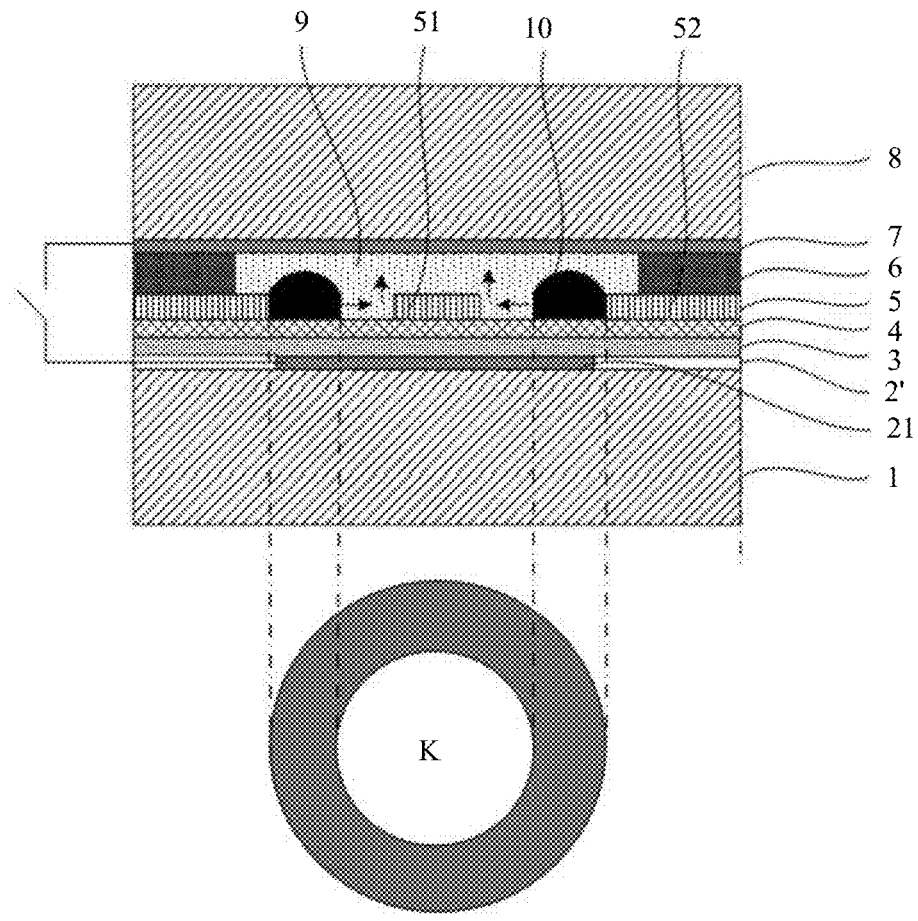

It may be learned that switching the liquid aperture 01 from FIG. 3m to FIG. 3n and then to the state shown in FIG. 3o is a process of enlarging the light inlet hole of the liquid aperture 01 provided in this embodiment of this application. When the voltage applied to the first sub-electrode 21 and the second electrode plate 7 is removed or the voltage is decreased until the effective electric field cannot be formed between the first sub-electrode 21 and the second electrode plate 7, the contact angle between the transparent electrolyte 9 and the hydrophobic layer 4 increases, the hydrophobic layer 4 exhibits a hydrophobic characteristic relative to the transparent electrolyte 9, and the transparent electrolyte 9 leaves the hydrophobic layer 4 along vertical upward arrows shown in FIG. 3p, a vacant space of the transparent electrolyte 9 moving in the second hollow structure A2 is occupied by the dyed oil 10 moving along horizontal arrows, and finally the state shown in FIG. 3m is restored. That is, the liquid aperture 01 switches from FIG. 3o to FIG. 3p and then to the state shown in FIG. 3m, which is a process of narrowing the light inlet hole of the liquid aperture 01 provided in this embodiment of this application. In the entire adjustment process, the first hydrophilic part 51 can ensure that a center of the liquid aperture 01 always has a circular opening (equivalent to the minimum value of the light inlet hole K of the liquid aperture 01). This provides an initial rupture point for the dyed oil 10, and improves roundness, concentricity, and repeatability of the opening of the liquid aperture 01, so that the dyed oil 10 can freely move within a specific range, and the opening range of the entire liquid aperture 01 has a large adjustment space.

Embodiment 2

Figure 4A:
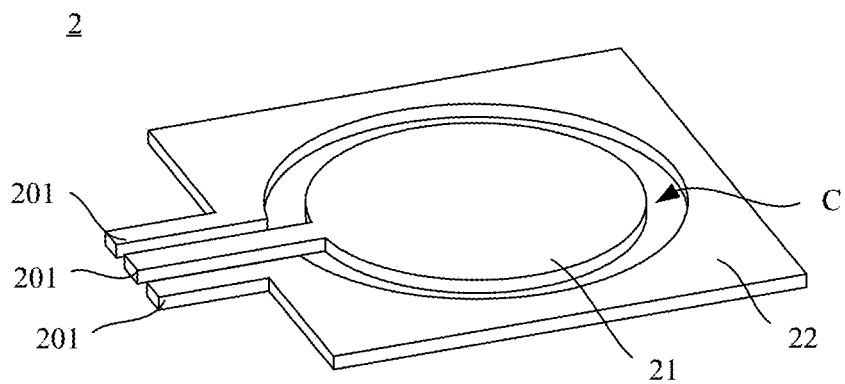
FIG. 4a is a schematic diagram of a structure of a first electrode plate of a liquid aperture according to Embodiment 2 of this application.

A liquid aperture 01 provided in this embodiment of this application is an improvement of the structure of the liquid aperture 01 provided in Embodiment 1. A difference from the liquid aperture 01 provided in Embodiment 1 lies in that, as shown in FIG. 4a, a first electrode plate 2 of the liquid aperture 01 includes a first sub-electrode 21 and a second sub-electrode 22. The first sub-electrode 21 is a circular solid plate structure, and is located in a central region of the entire first electrode plate 2. The first sub-electrode 21 is externally connected to a lead 201. The second sub-electrode 22 is of a frame shape with an opening. An outer edge of the second sub-electrode 22 is a rectangle matching a first substrate 1. A central region of the second sub-electrode 22 has a hollow. The first sub-electrode 21 is located in a central region of the hollow. The second sub-electrode 22 is externally connected to at least one lead 201. In FIG. 4a, two sides of the opening of the second sub-electrode 22 are separately and externally connected to two leads 201. The lead 201 of the first sub-electrode 21 extends out of the opening of the second sub-electrode 22, and is parallel to the leads 201 of the second sub-electrode 22. The first sub-electrode 21 and the second sub-electrode 22 are not connected to each other, and an electrode gap C is formed in between. A width of the electrode gap C may be 10-50 μm. For example, the width of the electrode gap C may be 10 μm, 20 μm, 25 μm, 30 μm, or 50 μm. The electrode gap C isolates the first sub-electrode 21 from the second sub-electrode 22. During operation, different voltages may be separately applied to the first sub-electrode 21 and the second sub-electrode 22.

Figure 4B:
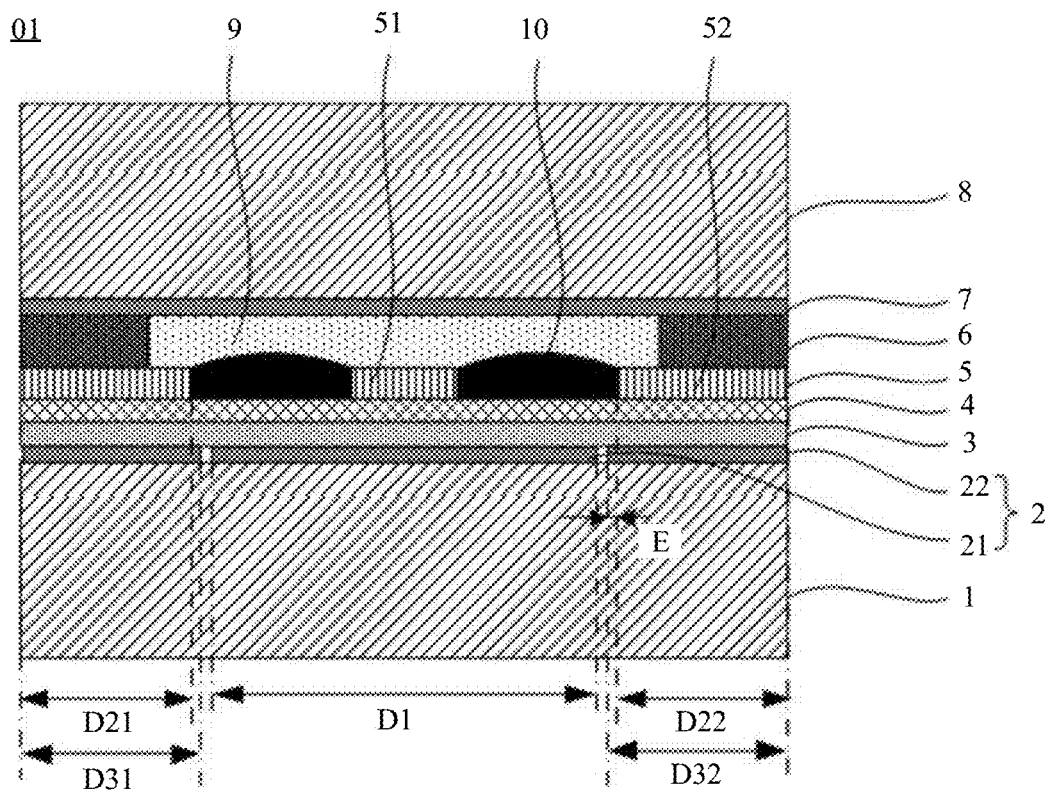
FIG. 4b is a schematic diagram of a cross-sectional structure of a liquid aperture according to Embodiment 2 of this application.

A cross-sectional structure of the liquid aperture 01 is shown in FIG. 4b. For a size of the first sub-electrode 21, refer to D1. For a size of the second sub-electrode 22, refer to D31 and D32. For a size of a second hydrophilic part 52, refer to D21 and D22. It may be learned that a projection of the second hydrophilic part 52 on a hydrophobic layer 4 falls within a projection of the second sub-electrode 22 on the hydrophobic layer 4. In other words, a radius of an inner edge of the second hydrophilic part 52 is greater than a radius of an inner edge of the second sub-electrode 22. When a light inlet hole of the liquid aperture 01 is enlarged, different voltages may be applied to the first sub-electrode 21 and the second sub-electrode 22 of the first electrode plate 2, so that different electric fields are separately formed between the first sub-electrode 21 and a second electrode plate 7 and between the second sub-electrode 22 and the second electrode plate 7, and adjustment of the light inlet hole of the liquid aperture 01 may still be implemented.

Specifically, when the light inlet hole of the liquid aperture 01 is enlarged, a large voltage is applied to the first sub-electrode 21 of the first electrode plate 2 to form an effective electric field between the first sub-electrode 21 and the second electrode plate 2, and a small voltage is applied to the second sub-electrode 22 of the first electrode plate 2 to form no effective electric field between the second sub-electrode 22 and the second electrode plate 2. A transparent electrolyte 9 may still implement the switching from FIG. 3m to FIG. 3n and then to FIG. 3o in Embodiment 1, and a state of dyed oil 10 is changed to enlarge the light inlet hole of the liquid aperture 01. When the light inlet hole of the liquid aperture 01 is narrowed, the voltage applied to the first sub-electrode 21 and the second electrode plate 7 is removed or the voltage is decreased until an effective electric field cannot be formed between the first sub-electrode 21 and the second electrode plate 7. A transparent electrolyte 9 may implement the switching from FIG. 3p to FIG. 3o and then to FIG. 3m in Embodiment 1, and a state of dyed oil 10 is changed to narrow the light inlet hole of the liquid aperture 01.

It should be understood that, when a voltage is applied to the second sub-electrode 22, because the voltage applied to the second sub-electrode 22 is very small, the electric field formed between the second sub-electrode 22 and the second electrode plate 7 has little impact on a contact angle between the transparent electrolyte 9 and the hydrophobic layer 4. As shown in FIG. 4b, a region E is equivalent to a range of the transparent electrolyte 9 that can be affected by the electric field formed between the second electrode plate 7 and the second sub-electrode 22, and the region E is very small. Therefore, when the light inlet hole of the liquid aperture 01 is enlarged, it may be considered that a state in which the dyed oil 10 is close to the inner edge of the second hydrophilic part 52 is not affected.

In addition, there is an overlapping region (the region E shown in FIG. 4b) between a projection of a second hollow structure A2 (namely, a region in which the dyed oil 10 is distributed in FIG. 4b) on the hydrophobic layer 4 and a projection of the second sub-electrode 22 on the hydrophobic layer 4. In other words, in a direction perpendicular to an optical axis of the liquid aperture 01, a radius of the inner edge of the second hydrophilic part 52 is greater than a distance from the inner edge of the second sub-electrode 22 to the optical axis (equivalent to a radius of the inner edge of the second sub-electrode 22). When the light inlet hole of the liquid aperture 01 is narrowed, a voltage may be applied to the second sub-electrode 22 and the second electrode plate 7, to change wettability between the hydrophobic layer 4 corresponding to the second sub-electrode 22 and the transparent electrolyte 9, so that the transparent electrolyte 9 applies pressure to a part of the dyed oil 10 corresponding to the second sub-electrode 22, and promotes the dyed oil 10 to move toward an inner edge of the second hollow structure A2, and the light inlet hole of the liquid aperture 01 is narrowed.

When the light inlet hole of the liquid aperture 01 is narrowed, a magnitude of a voltage applied to the second sub-electrode 22 directly affects duration and a range of contact between the hydrophobic layer 4 corresponding to the second sub-electrode 22 and the transparent electrolyte 9. As long as the magnitude of the voltage applied to the second sub-electrode 22 and time are controlled, a requirement of pushing the dyed oil 10 to move toward the inner edge of the second hollow structure A2 can be met. It should be understood that, in this process, the voltage applied to the second sub-electrode 22 takes effect only at an instant of narrowing the light inlet hole of the liquid aperture 01, and the action time is very short. Even if the hydrophobic layer 4 corresponding to the second sub-electrode 22 is in wetting contact with the transparent electrolyte 9, the contact time is very short, and the contact range is very small, which does not affect a proper operation of narrowing the light inlet hole of the liquid aperture 01.

Embodiment 3

Figure 5A:
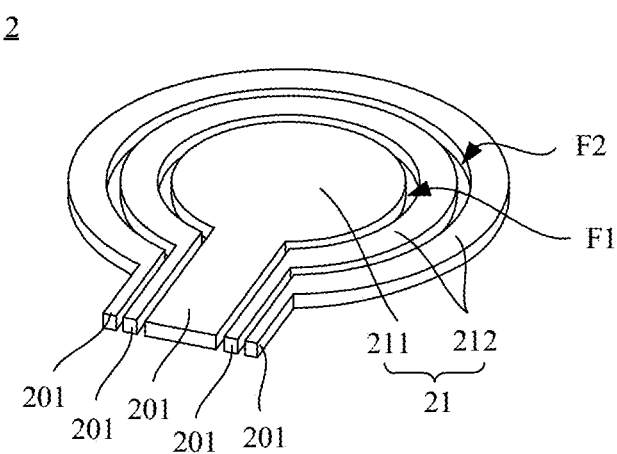
FIG. 5a is a schematic diagram of a structure of a first electrode plate of a liquid aperture according to Embodiment 3 of this application.

A liquid aperture 01 provided in this embodiment of this application is an improvement of the structure of the liquid aperture 01 provided in Embodiment 1. A difference from the liquid aperture 01 provided in Embodiment 1 lies in that, as shown in FIG. 5a, a first sub-electrode 21 includes a central electrode 211 and M arc electrodes 212 (M herein is an integer greater than or equal to 1, and FIG. 5a shows two arc electrodes 212). The central electrode 211 is a solid circular plate structure, and is located in a central region of the first sub-electrode 21. An axis of each arc electrode 212 is coaxial with an axis of the central electrode 211. The central electrode 211 is externally connected to at least one lead 201. Each arc electrode 212 is also externally connected to at least one lead 201.

As shown in FIG. 5a, a first gap F1 is formed between an arc electrode 212 adjacent to the central electrode 211 (an arc electrode 212 closest to the central electrode 211 in FIG. 5a) and the central electrode 211. A second gap F2 is formed between any two adjacent arc electrodes 212 (two arc electrodes 212 in FIG. 5*a*). A width of the first gap F1 may be 10-50 μm. For example, the width of the first gap F1 may be 10 μm, 20 μm, 25 μm, 30 μm, or 50 μm. A width of the second gap F2 may also be 10-50 μm. For example, the width of the second gap F2 may be 10 μm, 20 μm, 25 μm, 30 μm, or 50 μm. It should be understood that the width of the first gap F1 may be the same as or different from the width of the second gap F2. The structure in FIG. 5*a* is merely an example.

Figure 5B:
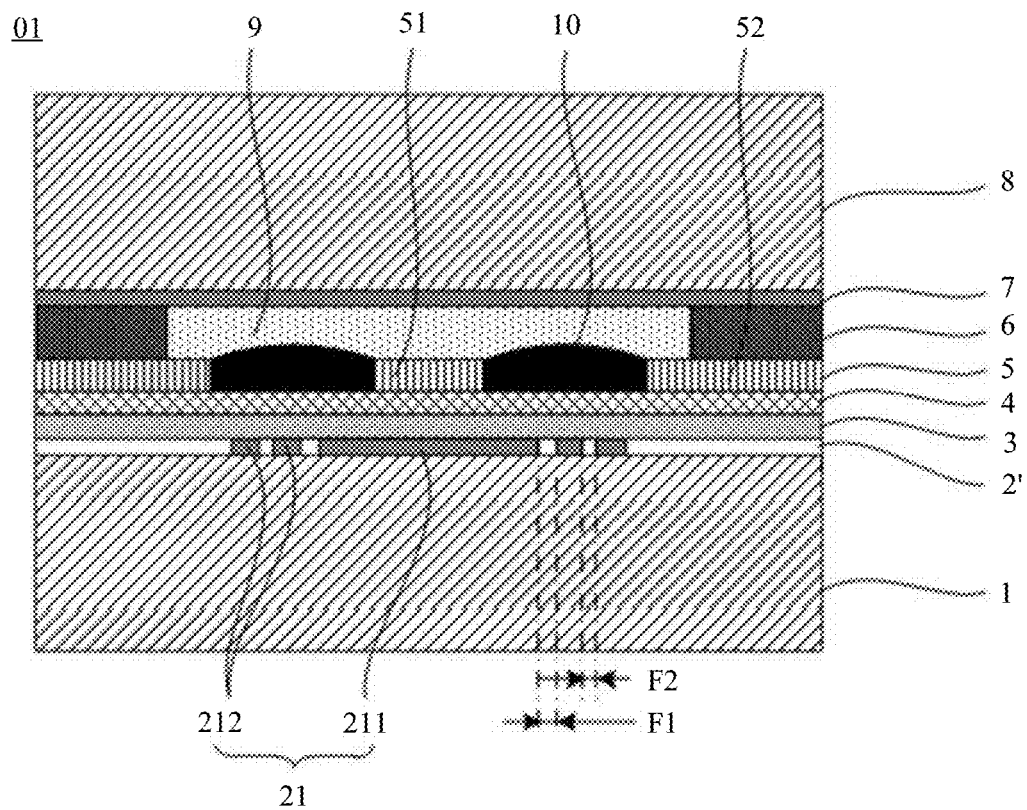
FIG. 5b is a schematic diagram of a cross-sectional structure of a liquid aperture according to Embodiment 3 of this application.

For a cross-sectional structure of the liquid aperture 01, refer to FIG. 5*b*. It should be understood that the first gap F1 and the second gap F2 are small enough, and a voltage is applied to the first sub-electrode 21 and a second electrode plate 7, so that an effective electric field is separately formed between the central electrode 211 of the first sub-electrode 21 and the second electrode plate 7 and between each arc electrode 212 and the second electrode plate 7. When a contact angle between a transparent electrolyte 9 corresponding to the central electrode 211 and a hydrophobic layer 4 decreases, the transparent electrolyte 9 generates movement similar to that shown in FIG. 3*n*, and pushes dyed oil 10 to an inner side of a second hydrophilic part 52. When the transparent electrolyte 9 moves to a range of the hydrophobic layer 4 corresponding to the first gap F1, the electric field disappears, and the contact angle between the transparent electrolyte 9 and the hydrophobic layer 4 cannot be controlled by the electric field. However, because the first gap F1 is small, the transparent electrolyte 9 may still continue to move under movement inertia to a region in which the hydrophobic layer 4 corresponding to the arc electrode 212 on the inner side is located, and push the dyed oil 10 to move. When the transparent electrolyte 9 moves to a region in which the hydrophobic layer 4 corresponding to the arc electrode 212 on the outer side is located, the electric field formed between the arc electrode 212 and the second electrode plate 7 may decrease the contact angle between the transparent electrolyte 9 and the hydrophobic layer 4, and the transparent electrolyte 9 continues to move in a manner similar to that shown in FIG. 3*n*, pushes the dyed oil 10 to the inner side of the second hydrophilic part 52, and finally reaches the state shown in FIG. 3*o*. Certainly, for movement of the transparent electrolyte 9 between the two arc electrodes 212, refer to the foregoing movement process. Details are not described herein again.

Embodiment 4

Figure 6A:
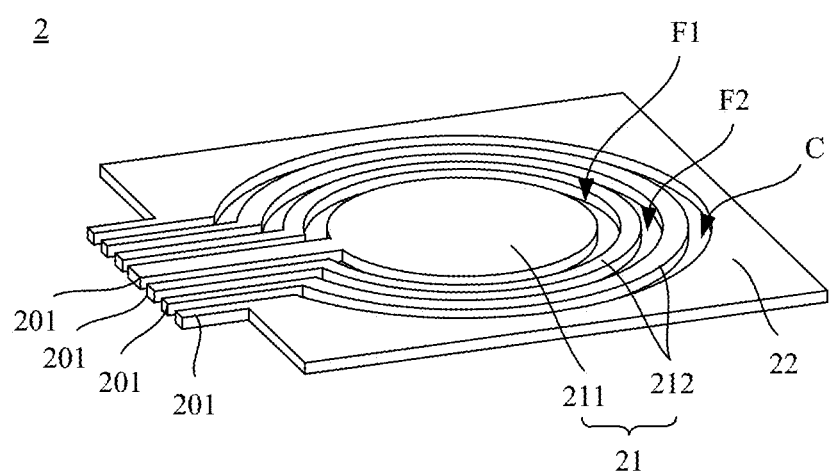
FIG. 6a is a schematic diagram of a structure of a first electrode plate of a liquid aperture according to Embodiment 4 of this application.

With reference to Embodiment 2 and Embodiment 3, as shown in FIG. 6*a*, a first electrode plate 2 of a liquid aperture 01 provided in this embodiment of this application includes a first sub-electrode 21 and a second sub-electrode 22. The second sub-electrode 22 herein is equivalent to the second sub-electrode 22 in Embodiment 2. The first sub-electrode 21 is a solid circle, and is located in a central region of the entire first electrode plate 2. The first sub-electrode 21 is externally connected to a lead 201. The second sub-electrode 22 is of a frame shape with an opening. The second sub-electrode 22 has a circular hollow middle part. The first sub-electrode 21 is located in a central region of the circular hollow. The second sub-electrode 22 is externally connected to at least one lead 201. The first sub-electrode 21 and the second sub-electrode 22 are not connected to each other, and an electrode gap C is formed in between. A width of the electrode gap C is 10-50 μm. The first sub-electrode 21 herein is equivalent to the first sub-electrode 21 in Embodiment 3. The first sub-electrode 21 includes a central electrode 211 and M arc electrodes 212 (M is an integer greater than or equal to 1, and FIG. 6*a* shows two arc electrodes 212). The central electrode 211 is a solid circular plate structure, and is located in a central region of the first sub-electrode 21. An axis of each arc electrode 212 is coaxial with an axis of the central electrode 211. The central electrode 211 is externally connected to at least one lead 201. Each arc electrode 212 is also externally connected to at least one lead 201. A first gap F1 is formed between an arc electrode 212 adjacent to the central electrode 211 (an arc electrode 212 closest to the central electrode 211 in FIG. 6*a*) and the central electrode 211. A second gap F2 is formed between any two adjacent arc electrodes 212 (two arc electrodes 212 in FIG. 6*a*). A width of the first gap F1 may be 10-50 μm. A width of the second gap F2 may also be 10-50 μm. It should be understood that the width of the first gap F1 may be the same as or different from the width of the second gap F2. The structure in FIG. 6*a* is merely an example.

Figure 6B:
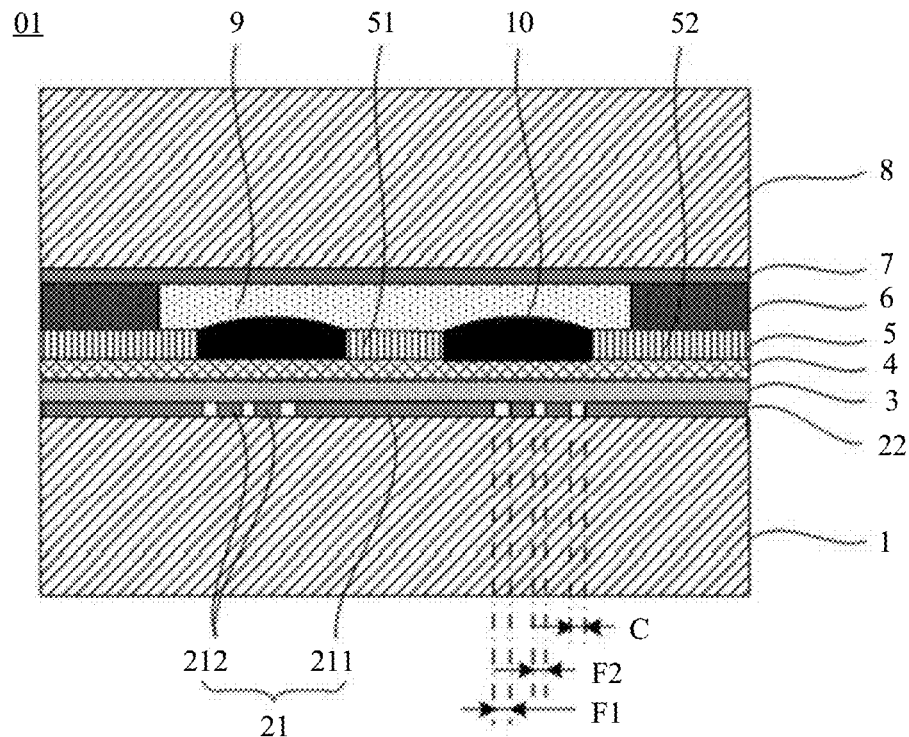
FIG. 6b is a schematic diagram of a cross-sectional structure of a liquid aperture according to Embodiment 4 of this application.

For a schematic diagram of a cross-sectional structure of the liquid aperture 01, refer to FIG. 6*b*. It should be understood that, when a light inlet hole of the liquid aperture 01 is adjusted, refer to the operation processes of Embodiment 2 and Embodiment 3. Details are not described herein again.

Embodiment 5

Figure 7A:
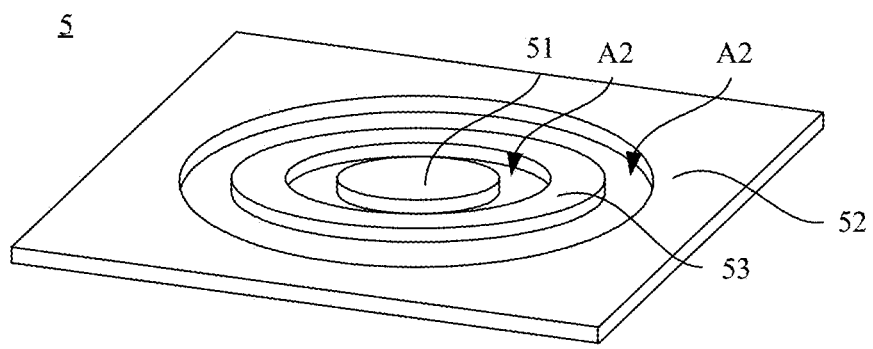
FIG. 7a is a schematic diagram of a structure of a hydrophilic layer of a liquid aperture according to Embodiment 5 of this application.

A liquid aperture 01 provided in this embodiment of this application is an improvement of the structure of the liquid aperture 01 provided in Embodiment 2. A difference from the liquid aperture 01 provided in Embodiment 2 lies in that, as shown in FIG. 7*a*, a hydrophilic layer 5 includes a first hydrophilic part 51 and a second hydrophilic part 52. The first hydrophilic part 51 is cylindrical. The first hydrophilic part 51 is located in a central region of the entire hydrophilic layer 5. The second hydrophilic part 52 is of a frame shape, an outer edge is a rectangle matching a first substrate 1, and there is a cylindrical hollow middle part. The first hydrophilic part 51 is located in a central region of the cylindrical hollow part. There is one third hydrophilic part 53 between the first hydrophilic part 51 and the second hydrophilic part 52. The first hydrophilic part 51, the second hydrophilic part 52, and the third hydrophilic part 53 are disposed on a same hydrophobic layer 4 at a same height. The third hydrophilic part 53 is annular (it should be understood that, because a thickness of the third hydrophilic part 53 is small, the annular shape herein may also be understood as a ring shape). An axis of the third hydrophilic part 53 is coaxial with an optical axis of the liquid aperture 01. A second hollow structure A2 is formed between the first hydrophilic part 51 and the third hydrophilic part 53. A second hollow structure A2 is formed between the second hydrophilic part 52 and the third hydrophilic part 53.

Figure 7B:
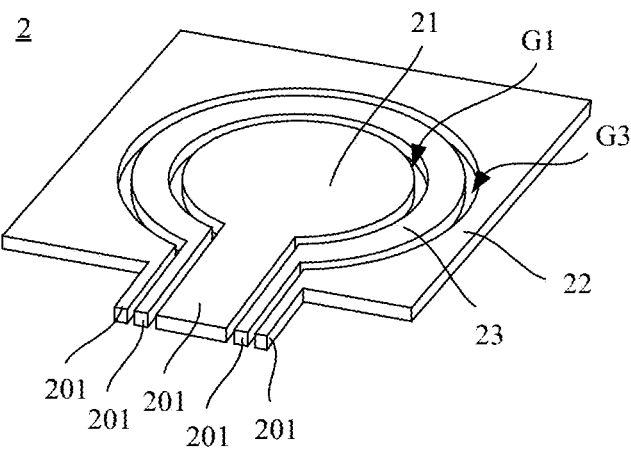
FIG. 7b is a schematic diagram of a structure of a first electrode plate of a liquid aperture according to Embodiment 5 of this application.

In view of the foregoing structure of the hydrophilic layer 5, for a structure of a first electrode plate 2 in this embodiment of this application, refer to FIG. 7*b*. The first electrode plate 2 includes a first sub-electrode 21, a second sub-electrode 22, and one third sub-electrode 23. The third sub-electrode 23 herein corresponds to the third hydrophilic part 53. The first sub-electrode 21 is a solid circular plate structure that is continuous and not hollowed out (when a thickness of the first sub-electrode 21 is small enough, the first sub-electrode 21 may also be understood as a circle), and is located in a central region of the entire first electrode plate 2. The first sub-electrode 21 is externally connected to a lead 201. The second sub-electrode 22 is of a frame shape. An outer edge of the second sub-electrode 22 herein is a rectangle. The first sub-electrode 21 is equivalent to being disposed in a central region of the second sub-electrode 22. Two ends of an opening of the second sub-electrode 22 are each externally connected to a lead 201. The lead 201 of the first sub-electrode 21 extends out of the opening of the second sub-electrode 22. The third sub-electrode 23 is annular. The third sub-electrode 23 is located between the first sub-electrode 21 and the second sub-electrode 22. An axis of the third sub-electrode 23 is coaxial with the optical axis of the liquid aperture 01. Certainly, the third sub-electrode 23 also has an opening, so that the lead 201 of the first sub-electrode 21 located in the ring extends in parallel. Two ends of the opening of the third sub-electrode 23 are each externally connected to a lead 201. As shown in FIG. 7b, in the first electrode plate 2, an electrode gap G1 is formed between the third sub-electrode 23 and the first sub-electrode 21, and an electrode gap G3 is formed between the third sub-electrode 23 and the second sub-electrode 22. Widths of the electrode gap G1 and the electrode gap G3 herein may be the same or different.

Figure 7C:
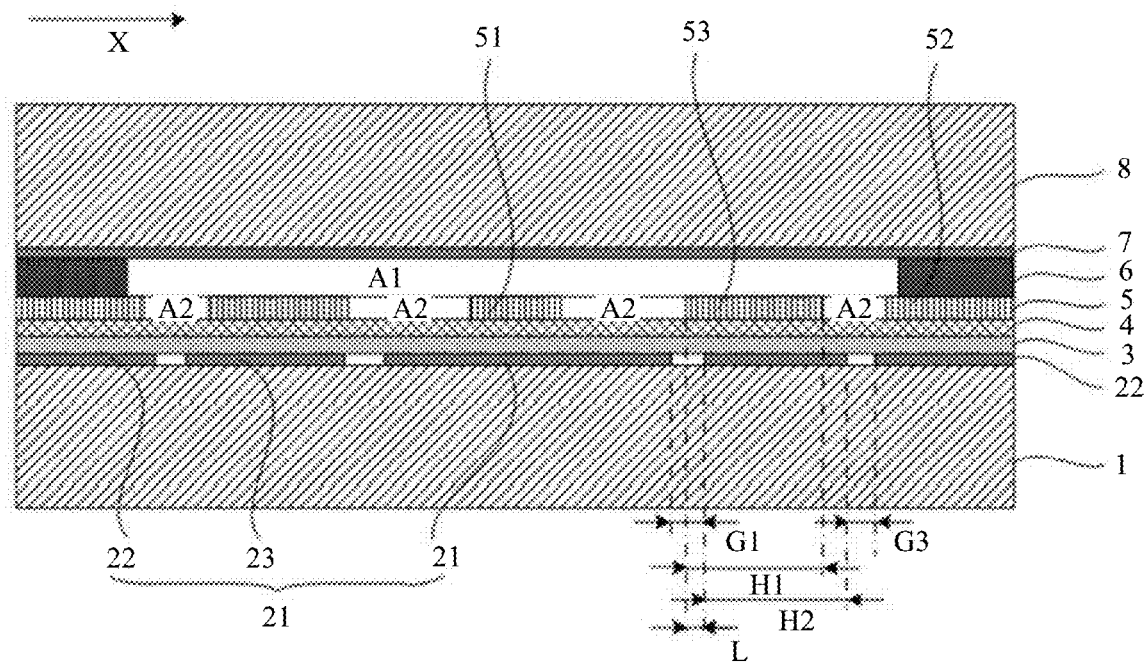
FIG. 7c is a schematic diagram of a cross-sectional structure of a liquid aperture according to Embodiment 5 of this application.

In this embodiment of this application, there is a correspondence between the structure of the hydrophilic layer 5 and a structure of a second electrode plate 7. FIG. 7c shows a schematic diagram of a cross-sectional structure of the liquid aperture 01 (a transparent electrolyte 9 and dyed oil 10 are not shown herein). The first sub-electrode 21 corresponds to the first hydrophilic part 51. A radius of the first hydrophilic part 51 is less than a radius of the first sub-electrode 21. In other words, a projection of the first hydrophilic part 51 on the hydrophobic layer 4 falls within a projection of the first sub-electrode 21 on the hydrophobic layer 4. The second sub-electrode 22 corresponds to the second hydrophilic part 52. A radius of an inner edge of the second hydrophilic part 52 is greater than a radius of an inner edge of the second sub-electrode 22. In the structure shown in FIG. 7c, it is equivalent to that a projection of the second hydrophilic part 52 on the hydrophobic layer 4 falls within a projection of the second sub-electrode 22 on the hydrophobic layer 4. The radius of the inner edge of the second hydrophilic part 52 is greater than the radius of the first sub-electrode 21. The third sub-electrode 23 corresponds to the third hydrophilic part 53. A radius of an inner edge of the third hydrophilic part 53 is greater than the radius of the first sub-electrode 21 and less than a radius of an inner edge of the third sub-electrode 23. A projection of the third hydrophilic part 53 on the hydrophobic layer 4 overlaps an inner edge of a projection of the third sub-electrode 23 on the hydrophobic layer 4. As shown in FIG. 7c, the hydrophobic layer 4 is used as a reference. For the projection of the third hydrophilic part 53 on the hydrophobic layer 4, refer to H1. For the projection of the third sub-electrode 23 on the hydrophobic layer 4, refer to H2. For a distance between the inner edge of the third sub-electrode 23 and the inner edge of the third hydrophilic part 53, refer to L. The electrode gap G1 is formed between the third sub-electrode 23 and the first sub-electrode 21. The electrode gap G3 is formed between the third sub-electrode 23 and the second sub-electrode 22. When the third hydrophilic part 53 is projected onto the first electrode plate 2, the inner edge of the third hydrophilic part 53 falls within the electrode gap G1. Herein, in a direction perpendicular to the optical axis of the liquid aperture 01 (an X direction in FIG. 7c), a range of L is equivalent to a distance between the inner edge of the third sub-electrode 23 and the inner edge of the third hydrophilic part 53, and L is greater than or equal to 10 µm.

Figure 7D:
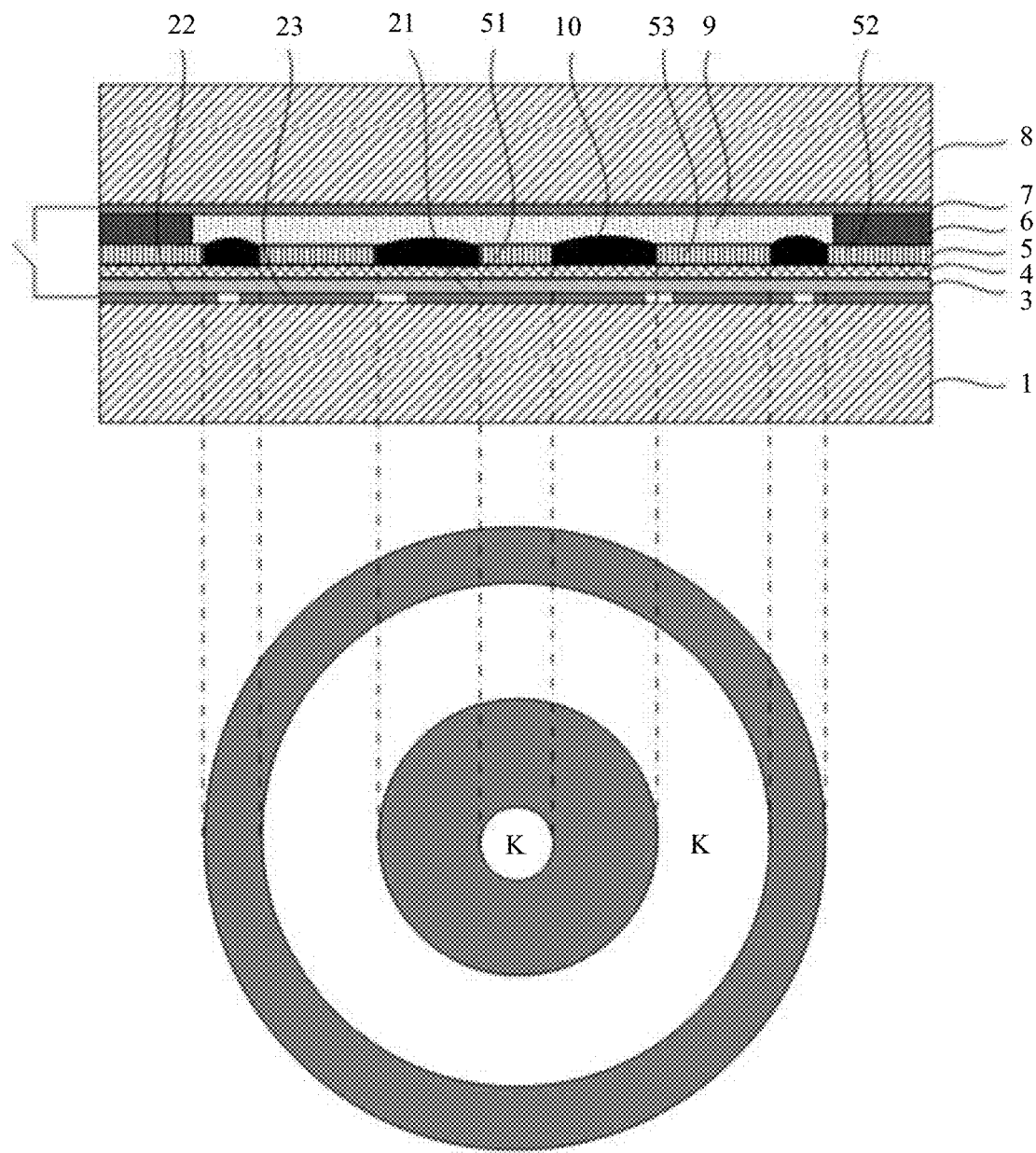
FIG. 7d to FIG. 7j each are a schematic diagram of a process of adjusting a size of a light inlet hole of a liquid aperture according to Embodiment 5 of this application.
Figure 7E:
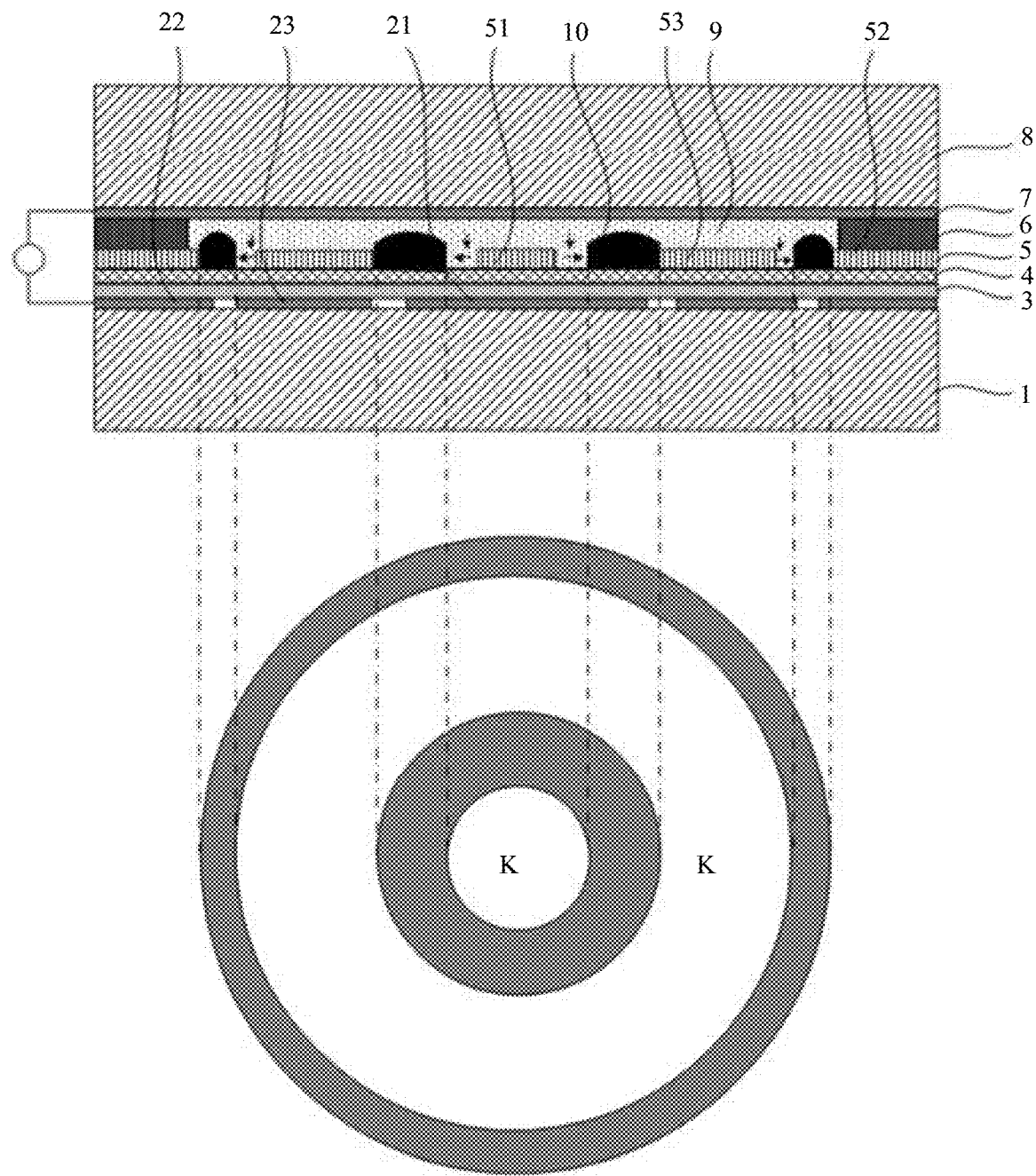
Figure 7F:
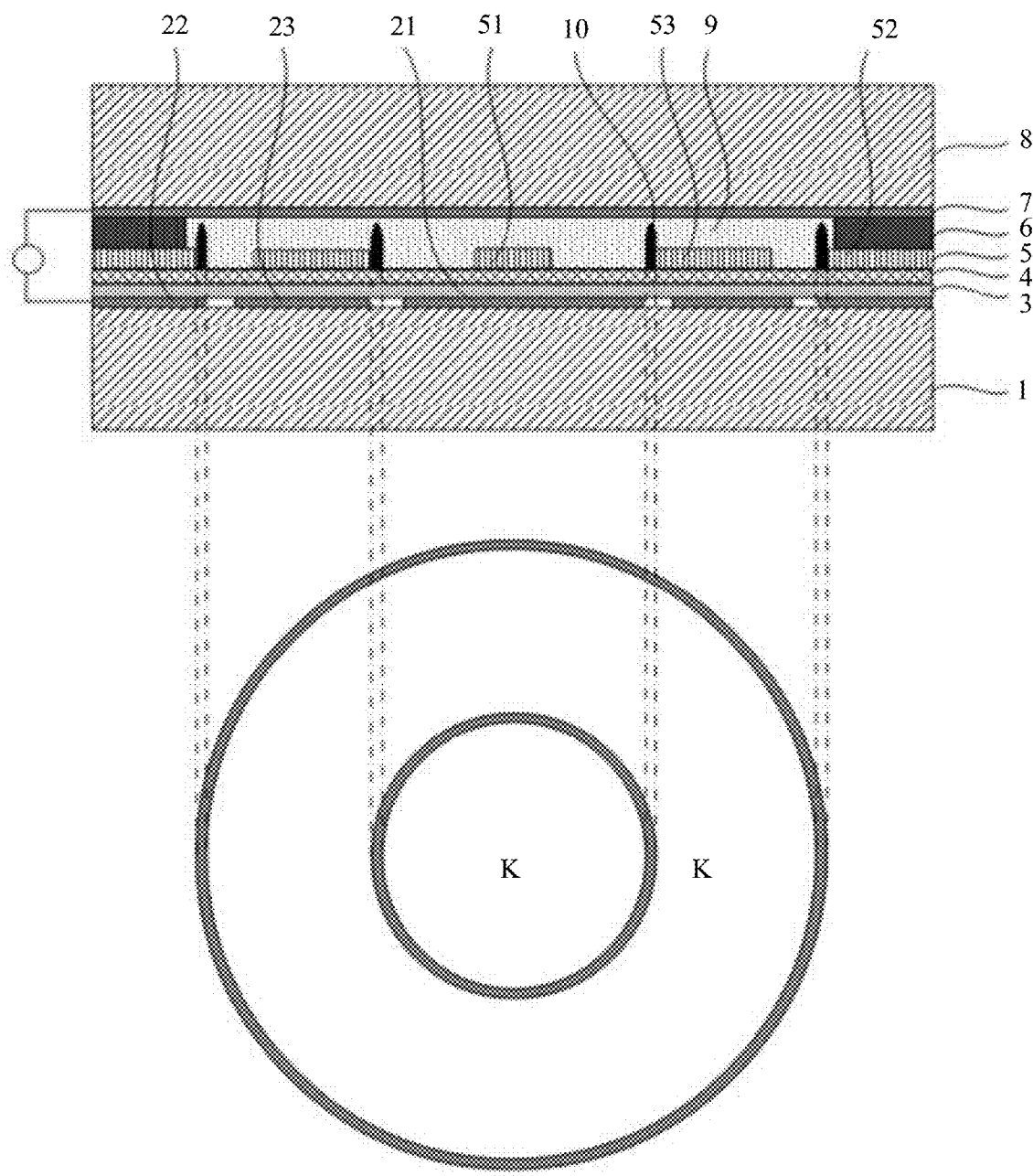

The following describes an operation process of the liquid aperture 01 in detail with reference to FIG. 7d to FIG. 7f.

As shown in FIG. 7d, the liquid aperture 01 in this case does not apply a voltage to the first electrode plate 2 and the second electrode plate 7 or the applied voltage cannot form an effective electric field between the first electrode plate 2 and the second electrode plate 7, a contact angle between the transparent electrolyte 9 and the hydrophobic layer 4 is large, and the hydrophobic layer 4 exhibits a hydrophobic characteristic relative to the transparent electrolyte 9. A first hollow structure A1 is substantially filled with the transparent electrolyte 9. Each second hollow structure A2 is substantially filled with the dyed oil 10 (in this embodiment, it is equivalent to second hollow structures A2 with two concentric rings). The dyed oil 10 is equivalent to forming two oil rings that can prevent light from passing through. An inner ring of each oil ring is equivalent to a light inlet hole of the liquid aperture 01. The light inlet holes of the liquid aperture 01 corresponding to the inner rings have a state shown as concentric rings in FIG. 7d.

When the liquid aperture 01 is enlarged, the voltage applied to the first electrode plate 2 and the second electrode plate 7 may form an effective electric field between the first electrode plate 2 and the second electrode plate 7. Because the first electrode plate 2 includes the first sub-electrode 21, the second sub-electrode 22, and one third sub-electrode 23, there are a plurality of manners of applying the voltage.

Manner 1: A voltage is applied to the first sub-electrode 21, the third sub-electrode 23, and the second electrode plate 7 to form an effective electric field between the first sub-electrode 21 and the second electrode plate 7 and between the third sub-electrode 23 and the second electrode plate 7. As shown in FIG. 7e, a contact angle between the transparent electrolyte 9 and the hydrophobic layer 4 corresponding to the first sub-electrode 21 and the third sub-electrode 23 decreases, and the hydrophobic layer 4 exhibits a hydrophilic characteristic relative to the transparent electrolyte 9. The transparent electrolyte 9 enters each second hollow structure A2 downward along vertical downward arrows in FIG. 7e, and comes into contact with the hydrophobic layer 4. Such movement of the transparent electrolyte 9 generates a thrust along horizontal arrows in FIG. 7e to push the dyed oil 10 in each second hollow structure A2 to an outer edge of the second hollow structure A2 (equivalent to the inner edge of the third hydrophilic part 53 and the inner edge of the second hydrophilic part 52). In addition, because a volume of the dyed oil 10 is constant, a height of the dyed oil 10 increases. However, the transparent electrolyte 9 still isolates the dyed oil 10 from the second electrode plate 7. As shown in FIG. 7e, the dyed oil 10 forms the two oil rings. An outer diameter of each oil ring does not change, but an inner diameter increases, which is equivalent to that each light inlet hole K of the liquid aperture 01 is enlarged. In addition, under the movement trend shown in FIG. 7e, distribution of the transparent electrolyte 9 and the dyed oil 10 in the liquid aperture 01 is finally shown in FIG. 7f. The dyed oil 10 between the first hydrophilic part 51 and the third hydrophilic part 53 on the inner side is attached to the inner edge of the third hydrophilic part 53. The dyed oil 10 between the third hydrophilic part 53 and the second hydrophilic part 52 is attached to the inner edge of the second hydrophilic part 52. Widths of the two oil rings formed by the dyed oil 10 reach the minimum, and correspondingly, sizes of the two light inlet holes K of the liquid aperture 01 reach the maximum. The height of the dyed oil 10 reaches the maximum. Herein, the transparent electrolyte 9 still isolates the dyed oil 10 from the second electrode plate 7.

Figure 7G:
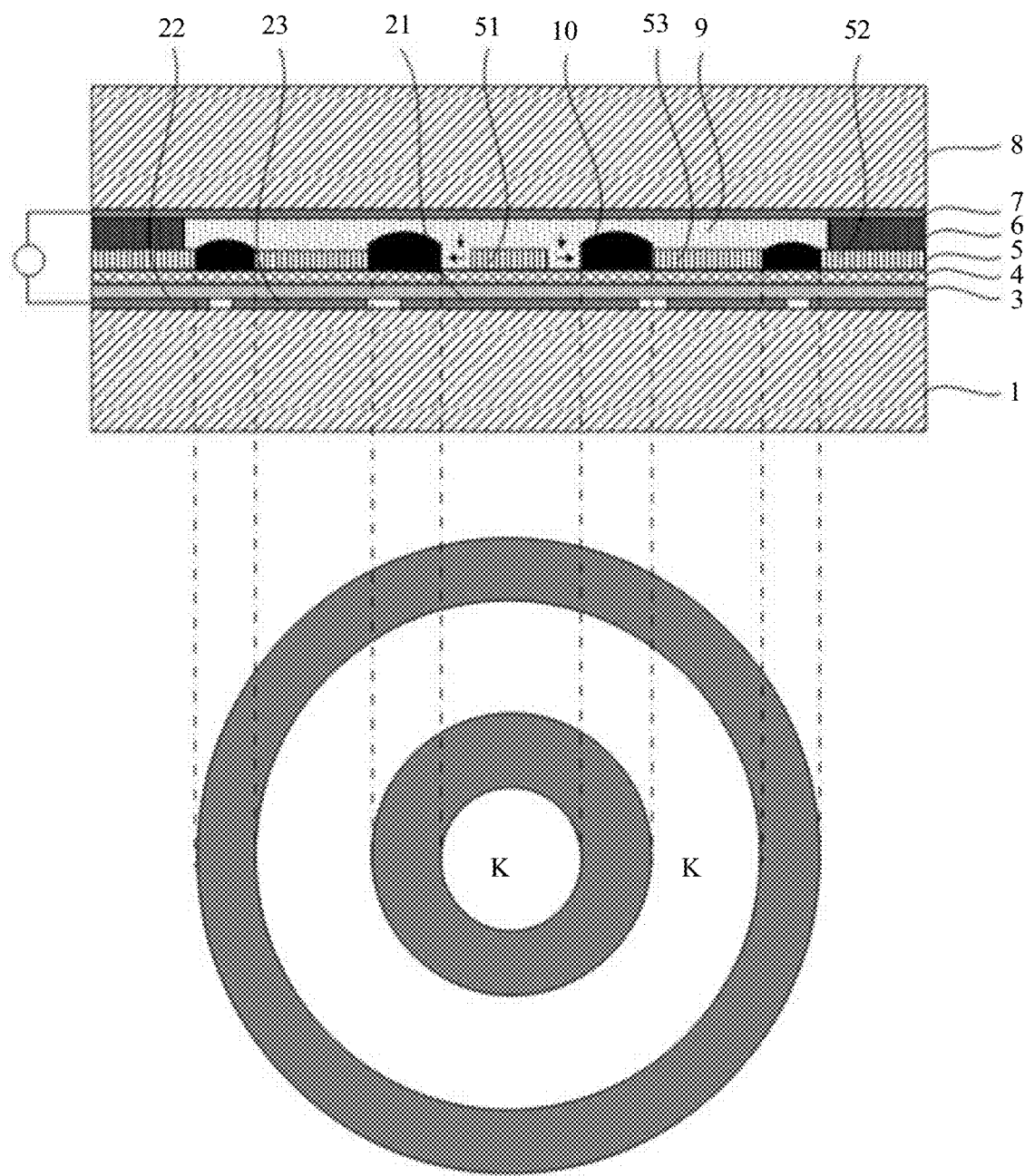
Figure 7H:
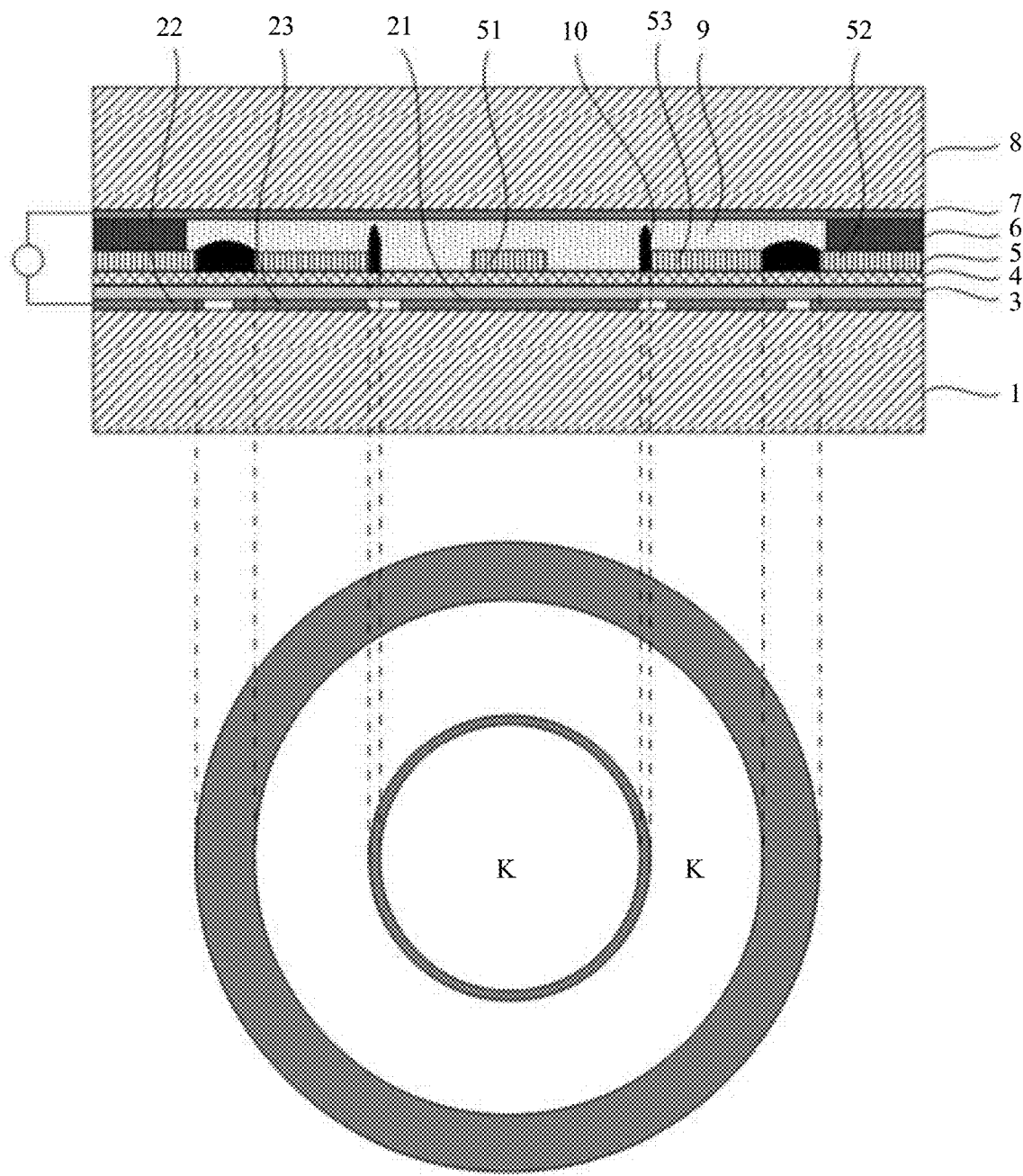

Manner 2: As shown in FIG. 7g, a voltage is applied only to the first sub-electrode 21 and the second electrode plate 7 to form an effective electric field between the first sub-electrode 21 and the second electrode plate 7, a contact angle between the transparent electrolyte 9 and the hydrophobic layer 4 corresponding to the first sub-electrode 21 decreases, and the hydrophobic layer 4 exhibits a hydrophilic characteristic relative to the transparent electrolyte 9. The transparent electrolyte 9 enters the second hollow structure A2 between the first hydrophilic part 51 and the third hydrophilic part 53 downward along vertical downward arrows in FIG. 7g, and comes into contact with the hydrophobic layer 4. Such movement of the transparent electrolyte 9 generates a thrust along horizontal arrows in FIG. 7g to push the dyed oil 10 in the second hollow structure A2 to an outer edge of the second hollow structure A2 (equivalent to the inner edge of the third hydrophilic part 53). In addition, no voltage is applied to the third sub-electrode 23 or the applied voltage cannot form an effective electric field between the third sub-electrode 23 and the second electrode plate 7, a contact angle between the transparent electrolyte 9 and the hydrophobic layer 4 corresponding to the third sub-electrode 23 does not change, and distribution of the dyed oil in the second hollow structure A2 between the third hydrophilic part 53 and the second hydrophilic part 52 does not change either. Finally, distribution of the transparent electrolyte 9 and the dyed oil 10 is shown in FIG. 7h. In the two oil rings formed by the dyed oil 10, an inner diameter of the oil ring on the inner side reaches the maximum, a state of the oil ring on the outer side does not change, and sizes of the light inlet holes K of the liquid aperture 01 corresponding to the oil rings may be shown in FIG. 7h.

Figure 7I:
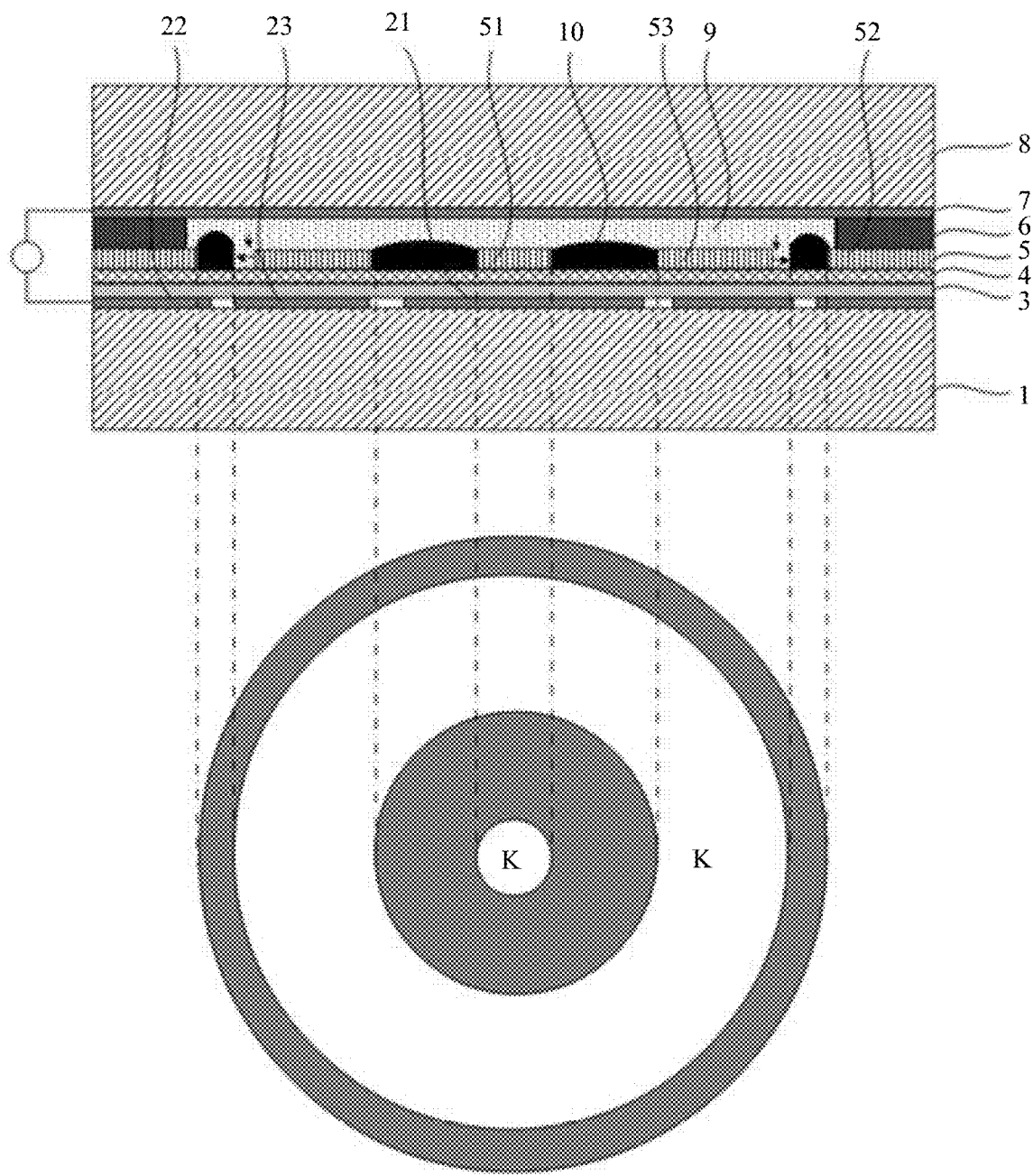
Figure 7J:
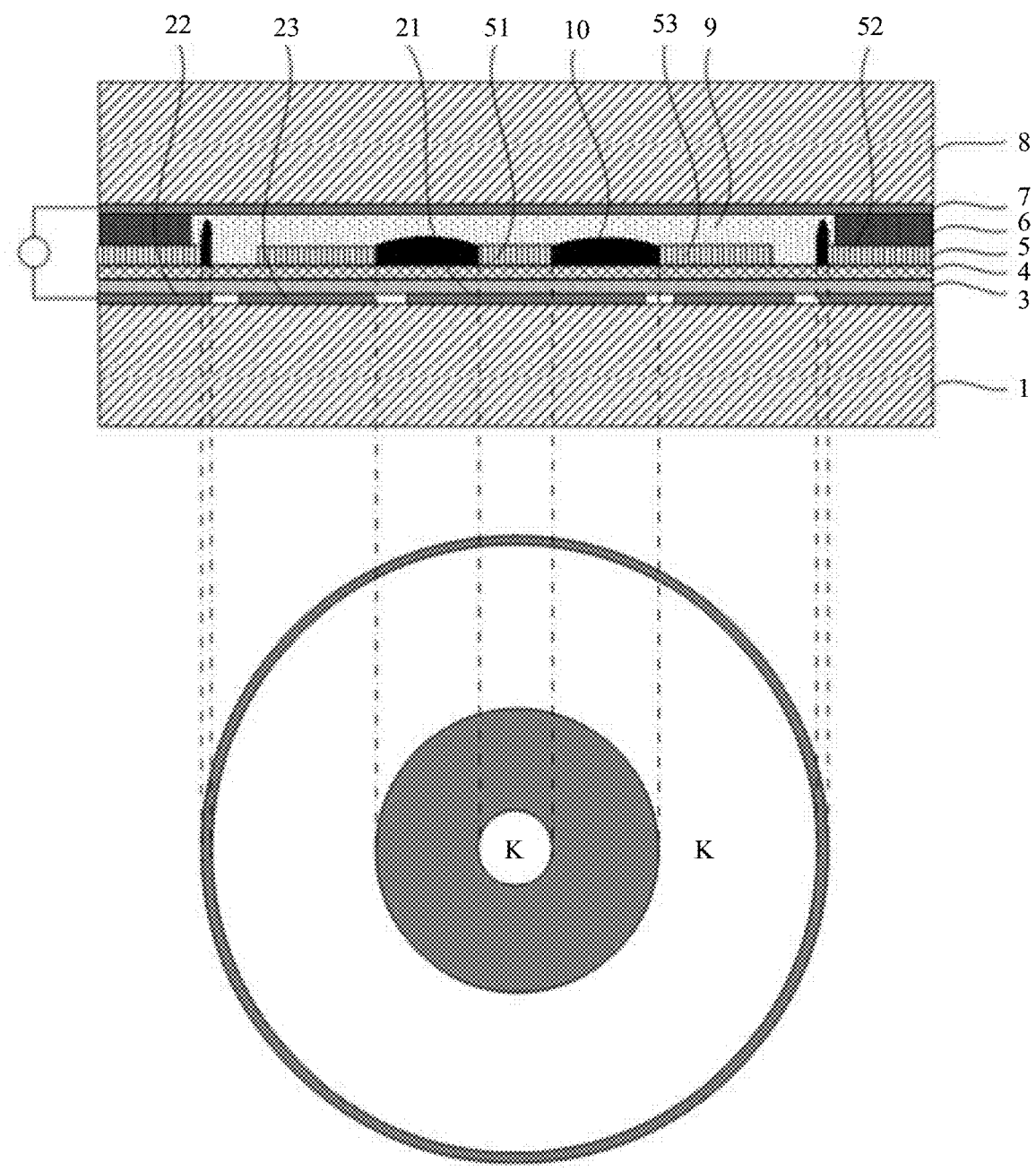

Manner 3: As shown in FIG. 7i, a voltage is applied only to the third sub-electrode 23 and the second electrode plate 7 to form an effective electric field between the third sub-electrode 23 and the second electrode plate 7, a contact angle between the transparent electrolyte 9 and the hydrophobic layer 4 corresponding to the third sub-electrode 23 decreases, and the hydrophobic layer 4 exhibit a hydrophilic characteristic relative to the transparent electrolyte 9. The transparent electrolyte 9 enters the second hollow structure A2 between the second hydrophilic part 52 and the third hydrophilic part 53 downward along vertical downward arrows in FIG. 7g, and comes into contact with the hydrophobic layer 4. Such movement of the transparent electrolyte 9 generates a thrust along horizontal arrows in FIG. 7i to push the dyed oil 10 in the second hollow structure A2 to an outer edge of the second hollow structure A2 (equivalent to the inner edge of the second hydrophilic part 52). In addition, no voltage is applied to the first sub-electrode 21 or the applied voltage cannot form an effective electric field between the first sub-electrode 21 and the second electrode plate 7, a contact angle between the transparent electrolyte 9 and the hydrophobic layer 4 corresponding to the first sub-electrode 21 does not change, and distribution of the dyed oil in the second hollow structure A2 between the third hydrophilic part 53 and the first hydrophilic part 51 does not change either. Finally, distribution of the transparent electrolyte 9 and the dyed oil 10 is shown in FIG. 7j. In the two oil rings formed by the dyed oil 10, an inner diameter of the oil ring on the outer side reaches the maximum, a state of the oil ring on the inner side does not change, and sizes of the light inlet holes K of the liquid aperture 01 corresponding to the oil rings may be shown in FIG. 7j.

It should be understood that, when the light inlet hole K of the liquid aperture 01 is narrowed, the voltage applied to the first electrode plate 2 and the second electrode plate 7 is removed or the voltage applied to the first electrode plate 2 and the second electrode plate 7 is not enough to form an effective electric field between the first electrode plate 2 and the second electrode plate 7, and distribution of the transparent electrolyte 9 and the dyed oil 10 is restored to that shown in FIG. 7d. In addition, neither of the two voltage application manners provided in this embodiment of this application relates to a voltage application manner of the second sub-electrode 22. It may be understood that when a voltage is applied to the second sub-electrode 22, a principle of adjusting the liquid aperture 01 by the voltage is similar to the operation principle in Embodiment 2. Details are not described herein again.

Embodiment 6

Figure 8A:
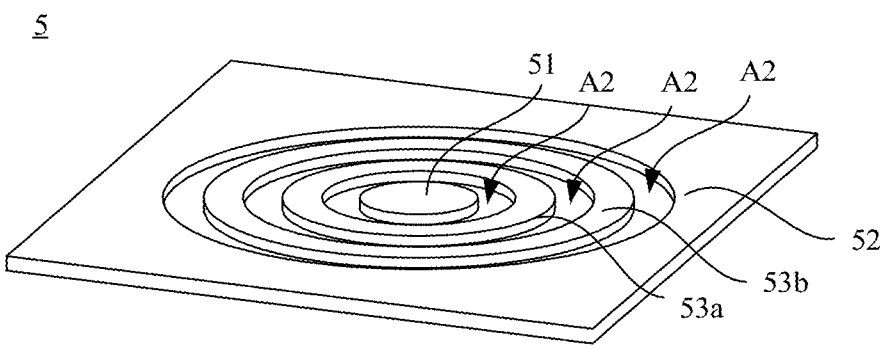
FIG. 8a is a schematic diagram of a structure of a hydrophilic layer of a liquid aperture according to Embodiment 6 of this application.

A liquid aperture 01 provided in this embodiment of this application is an improvement of the structure of the liquid aperture 01 provided in Embodiment 5. A difference from the liquid aperture 01 provided in Embodiment 5 lies in that, as shown in FIG. 8a, two third hydrophilic parts 53 (a third hydrophilic part 53a and a third hydrophilic part 53b shown in FIG. 8a) are disposed between a first hydrophilic part 51 and a second hydrophilic part 52. Each third hydrophilic part 53 is annular. An axis of each third hydrophilic part 53 is coaxial with an optical axis of the liquid aperture 01. The two third hydrophilic parts 53 are shown as concentric rings. A second hollow structure A2 is formed between the first hydrophilic part 51 and the third hydrophilic part 53a. A second hollow structure A2 is formed between the third hydrophilic part 53a and the third hydrophilic part 53b. A second hollow structure A2 is formed between the second hydrophilic part 52 and the third hydrophilic part 53b.

Figure 8B:
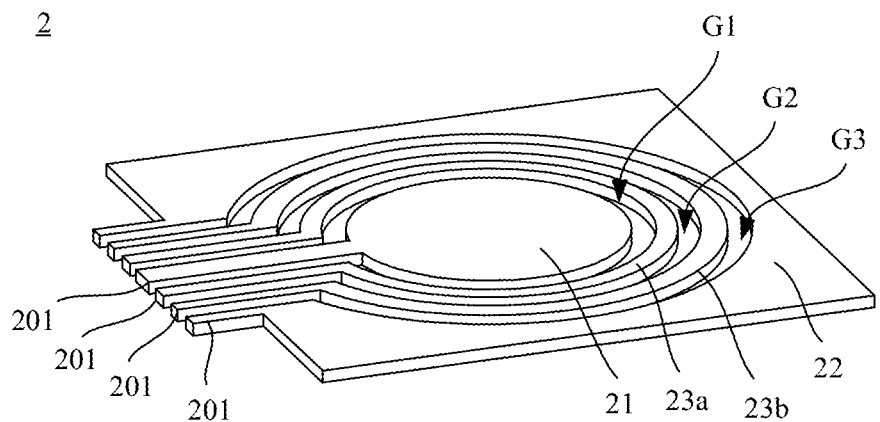
FIG. 8b is a schematic diagram of a structure of a first electrode plate of a liquid aperture according to Embodiment 6 of this application.

In view of the foregoing structure of a hydrophilic layer 5, for a structure of a first electrode plate 2 in this embodiment of this application, refer to FIG. 8b. The first electrode plate 2 includes a first sub-electrode 21, a second sub-electrode 22, and two third sub-electrodes 23 (a third sub-electrode 23a and a third sub-electrode 23b shown in FIG. 8b). The two third sub-electrodes 23 herein one-to-one correspond to the two third hydrophilic parts 53. As shown in FIG. 8b, in the first electrode plate 2, an electrode gap G1 is formed between the third sub-electrode 23a and the first sub-electrode 21, an electrode gap G2 is formed between the two third sub-electrodes 23, and an electrode gap G3 is formed between the third sub-electrode 23b and the second sub-electrode 22. Widths of the electrode gap G1, the electrode gap G2, and the electrode gap G3 herein may be the same or different. The first sub-electrode 21, the second sub-electrode 22, and the third sub-electrodes 23 are each externally connected to at least one lead 201.

Figure 8C:
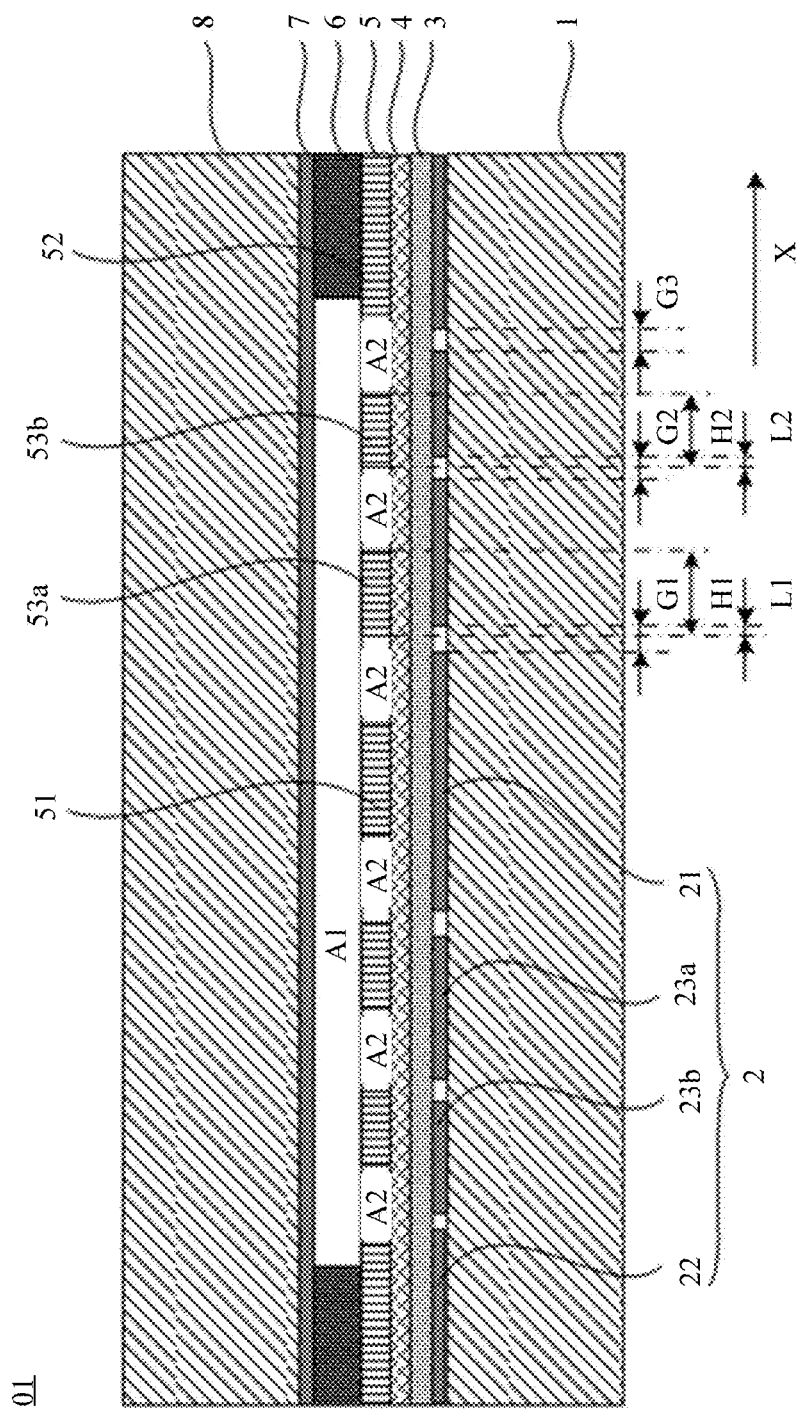
FIG. 8c is a schematic diagram of a cross-sectional structure of a liquid aperture according to Embodiment 6 of this application.

In this embodiment of this application, there is a correspondence between the structure of the hydrophilic layer 5 and a structure of a second electrode plate 7. FIG. 8c shows a schematic diagram of a cross-sectional structure of the liquid aperture 01 (a transparent electrolyte 9 and dyed oil 10 are not shown herein). The first sub-electrode 21 corresponds to the first hydrophilic part 51. A projection of the first hydrophilic part 51 on a hydrophobic layer 4 falls within a projection of the first sub-electrode 21 on the hydrophobic layer 4, which is equivalent to that a radius of the first hydrophilic part 51 is less than a radius of the first sub-electrode 21. The second sub-electrode 22 corresponds to the second hydrophilic part 52. A projection of the second hydrophilic part 52 on the hydrophobic layer 4 falls within a projection of the second sub-electrode 22 on the hydrophobic layer 4, which is equivalent to that the radius of the first hydrophilic part 51 is less than a radius of an outer edge of the first sub-electrode 21, and a radius of an inner edge of the second hydrophilic part 52 is greater than the radius of the outer edge of the first sub-electrode 21. The third sub-electrodes 23 one-to-one correspond to the third hydrophilic parts 53. Specifically, a projection of the third hydrophilic part 53a on the hydrophobic layer 4 overlaps an inner edge of a projection of the third sub-electrode 23a on the hydrophobic layer 4, and a projection of the third hydrophilic part 53b on the hydrophobic layer 4 overlaps an inner edge of a projection of the third sub-electrode 23b on the hydrophobic layer 4. As shown in FIG. 8c, the hydrophobic layer 4 is used as a reference. For the projection of the third hydrophilic part 53a on the hydrophobic layer 4, refer to H1. The electrode gap G1 is formed between the third sub-electrode 23a and the first sub-electrode 21. It may be seen that there is an overlapping region L1 between H1 and G1. In other words, when the third hydrophilic part 53a is projected onto the first electrode plate 2, an inner edge of the third hydrophilic part 53a falls within the electrode gap G1. For the projection of the third hydrophilic part 53b on the hydrophobic layer 4, refer to H2. The electrode gap G2 is formed between the third sub-electrode 23b and the third sub-electrode 23a. It may be seen that there is an overlapping region L2 between H2 and G2. In other words, when the third hydrophilic part 53b is projected onto the first electrode plate 2, an inner edge of the third hydrophilic part 53b falls within the electrode gap G2. The electrode gap G3 is formed between the third sub-electrode 23b and the second sub-electrode 22. Herein, in a direction perpendicular to the optical axis of the liquid aperture 01 (an X direction in FIG. 8c), a range of L1 is equivalent to a distance between an inner edge of the third sub-electrode 23a and the inner edge of the third hydrophilic part 53a, and a range of L2 is equivalent to a distance between an inner edge of the third sub-electrode 23b and the inner edge of the third hydrophilic part 53b. Both L1 and L2 are greater than or equal to 10 μm, and L1 and L2 may be the same or different.

Figure 8D:
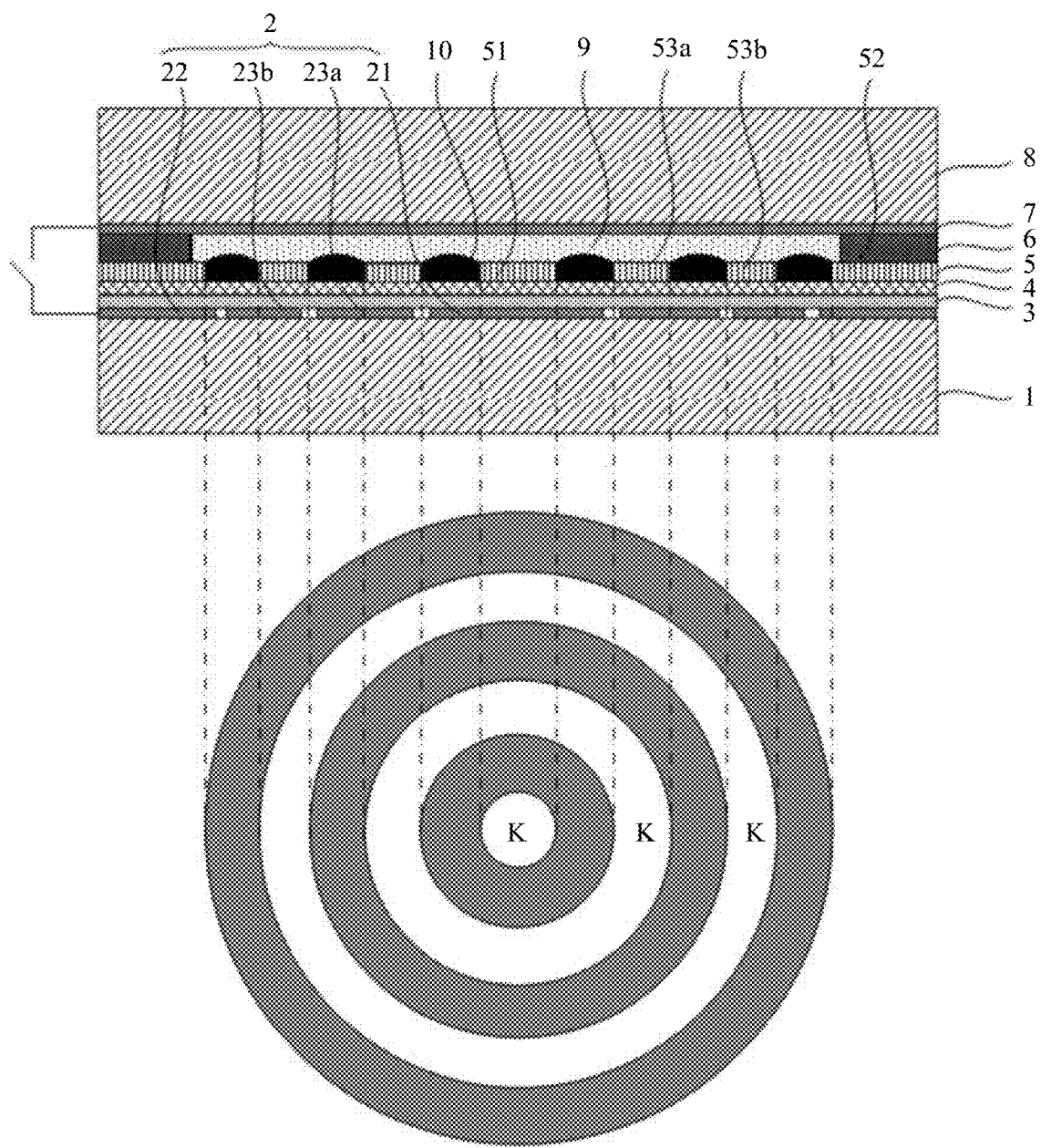
FIG. 8d to FIG. 8h each are a schematic diagram of a process of adjusting a size of a light inlet hole of a liquid aperture according to Embodiment 6 of this application.
Figure 8E:
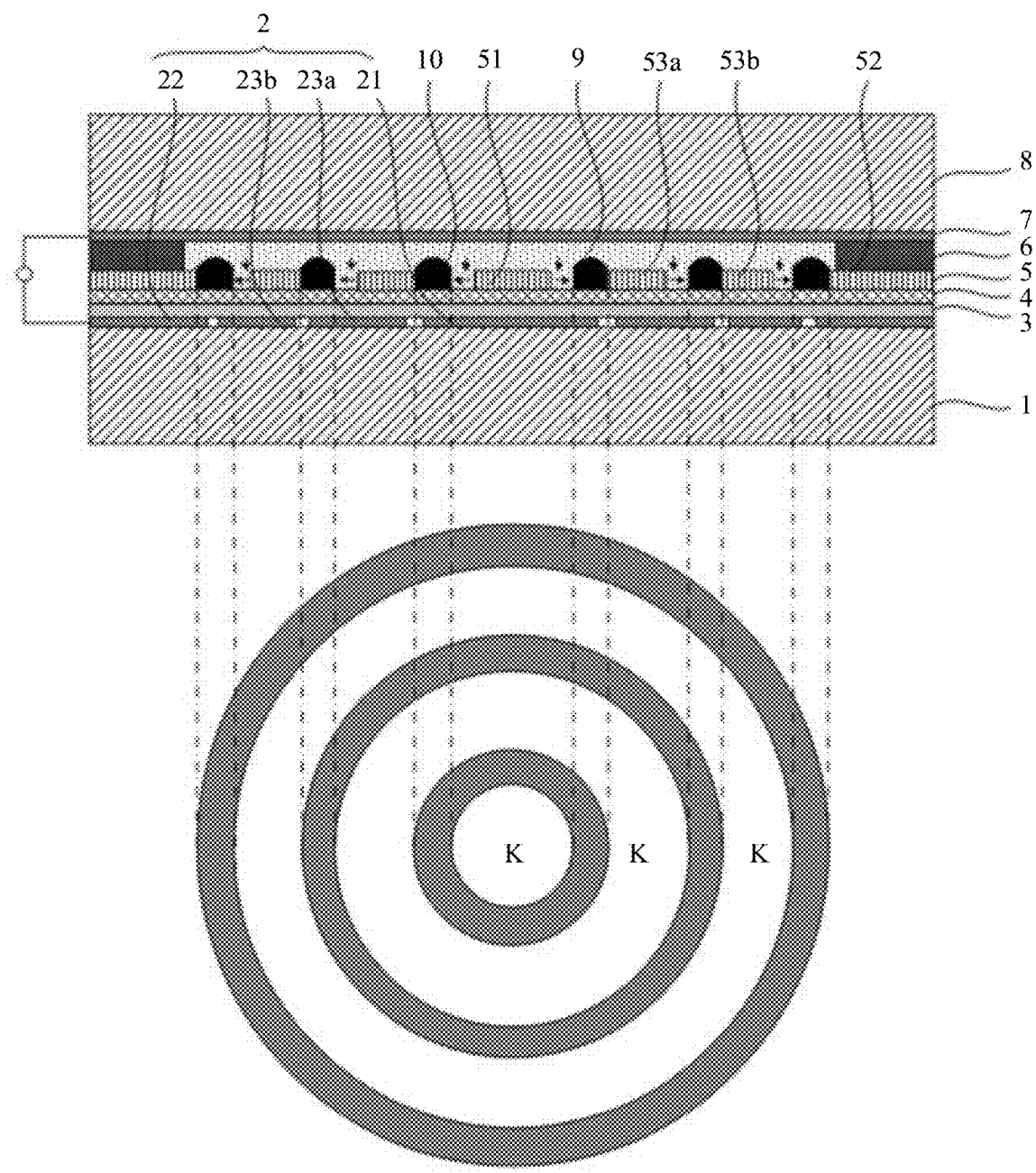
Figure 8F:
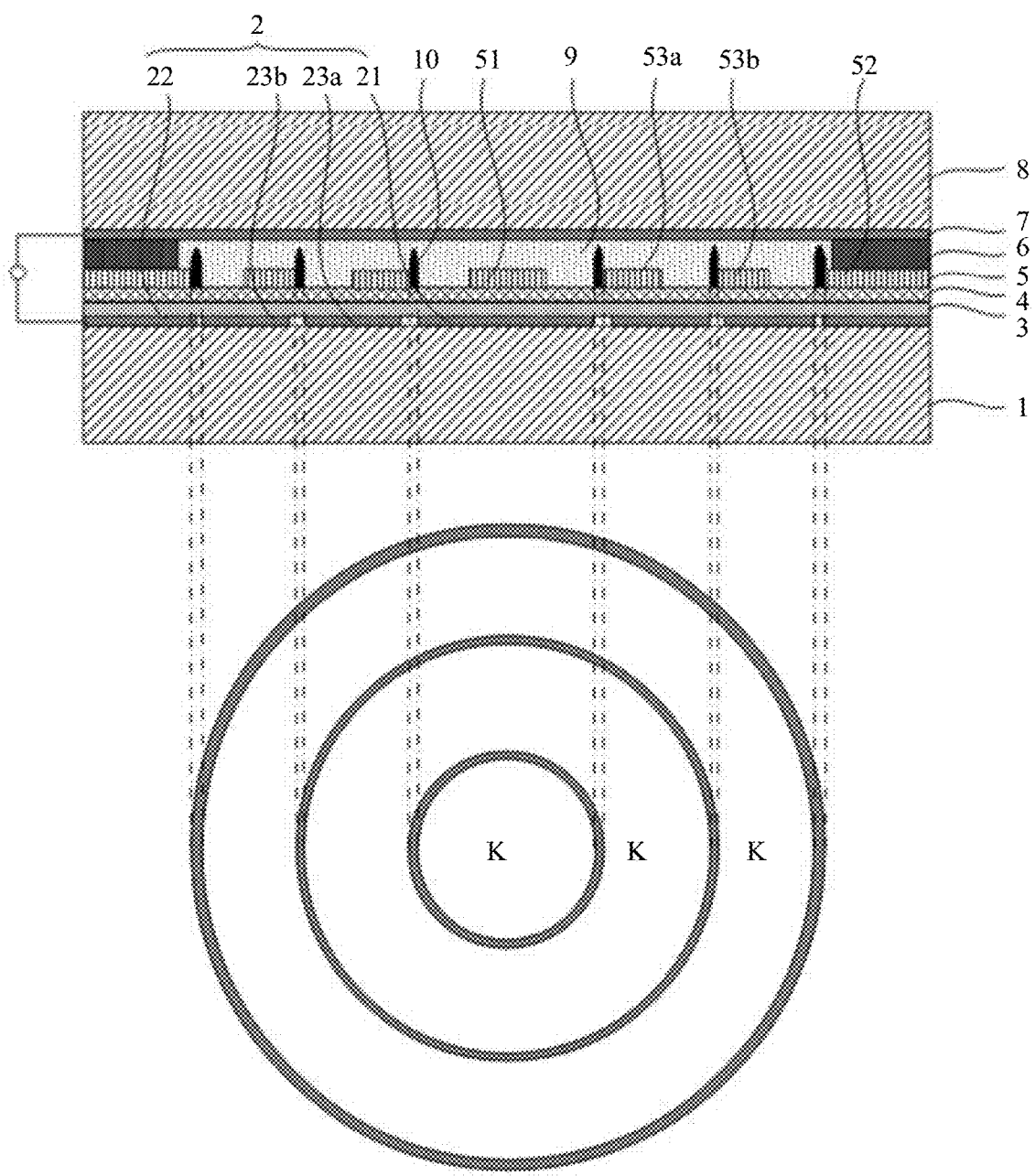

The following describes an operation process of the liquid aperture 01 in detail based on the structure of the liquid aperture 01 with reference to FIG. 8d to FIG. 8f.

As shown in FIG. 8d, the liquid aperture 01 in this case does not apply a voltage to the first electrode plate 2 and the second electrode plate 7 or the applied voltage cannot form an effective electric field between the first electrode plate 2 and the second electrode plate 7, a contact angle between the transparent electrolyte 9 and the hydrophobic layer 4 is large, and the hydrophobic layer 4 exhibits a hydrophobic characteristic relative to the transparent electrolyte 9. A first hollow structure A1 is substantially filled with the transparent electrolyte 9. Each second hollow structure A2 is substantially filled with the dyed oil 10 (in this embodiment, it is equivalent to second hollow structures A2 with three concentric ring structures). The dyed oil 10 is equivalent to forming three oil rings that can prevent light from passing through. An inner ring of each oil ring is equivalent to a light inlet hole of the liquid aperture 01. The light inlet holes of the liquid aperture 01 corresponding to the inner rings have a state shown in FIG. 8d, and includes a circular light inlet hole K and two annular light inlet holes K. The two annular light inlet holes K are distributed as concentric rings with the circular light inlet hole K as the circle center.

The voltage applied to the first electrode plate 2 and the second electrode plate 7 may form an effective electric field between the first electrode plate 2 and the second electrode plate 7. Because the first electrode plate 2 includes the first sub-electrode 21, the second sub-electrode 22, and the two third sub-electrodes 23, there are a plurality of manners of applying the voltage.

Manner 1: A voltage may be applied to the first sub-electrode 21, the two third sub-electrodes 23 (a third sub-electrode 23a and a third sub-electrode 23b shown in FIG. 8e), and the second electrode plate 7 to form an effective electric field between the first sub-electrode 21 and the second electrode plate 7 and between each third sub-electrode 23 and the second electrode plate 7. As shown in FIG. 8e, a contact angle between the transparent electrolyte 9 and the hydrophobic layer 4 corresponding to the first sub-electrode 21 and each third sub-electrode 23 decreases, and the hydrophobic layer 4 exhibits a hydrophilic characteristic relative to the transparent electrolyte 9. The transparent electrolyte 9 enters each second hollow structure A2 downward along vertical downward arrows in FIG. 8e, and comes into contact with the hydrophobic layer 4. Such movement of the transparent electrolyte 9 generates a thrust along horizontal arrows in FIG. 8e to push the dyed oil 10 in each second hollow structure A2 to an outer edge of the second hollow structure A2 (equivalent to the inner edge of each third hydrophilic part 53 and the inner edge of the second hydrophilic part 52). In addition, because a volume of the dyed oil 10 is constant, a height of the dyed oil 10 increases. However, the transparent electrolyte 9 still isolates the dyed oil 10 from the second electrode plate 7. As shown in FIG. 8e, the dyed oil 10 forms the three oil rings. An outer diameter of each oil ring does not change, but an inner diameter increases, which is equivalent to that each light inlet hole K of the liquid aperture 01 is enlarged. In addition, under the movement trend shown in FIG. 8e, distribution of the transparent electrolyte 9 and the dyed oil 10 in the liquid aperture 01 is finally shown in FIG. 8f. The dyed oil 10 between the first hydrophilic part 51 and the third hydrophilic part 53a is attached to the inner edge of the third hydrophilic part 53a. The dyed oil 10 between the third hydrophilic part 53a and the third hydrophilic part 53b is attached to the inner edge of the third hydrophilic part 53b. The dyed oil 10 between the third hydrophilic part 53b and the second hydrophilic part 52 is attached to the inner edge of the second hydrophilic part 52. Widths of the three oil rings formed by the dyed oil 10 reach the minimum, and correspondingly, sizes of the three light inlet holes K of the liquid aperture 01 reach the maximum. The height of the dyed oil 10 reaches the maximum. Herein, the transparent electrolyte 9 still isolates the dyed oil 10 from the second electrode plate 7.

Figure 8G:
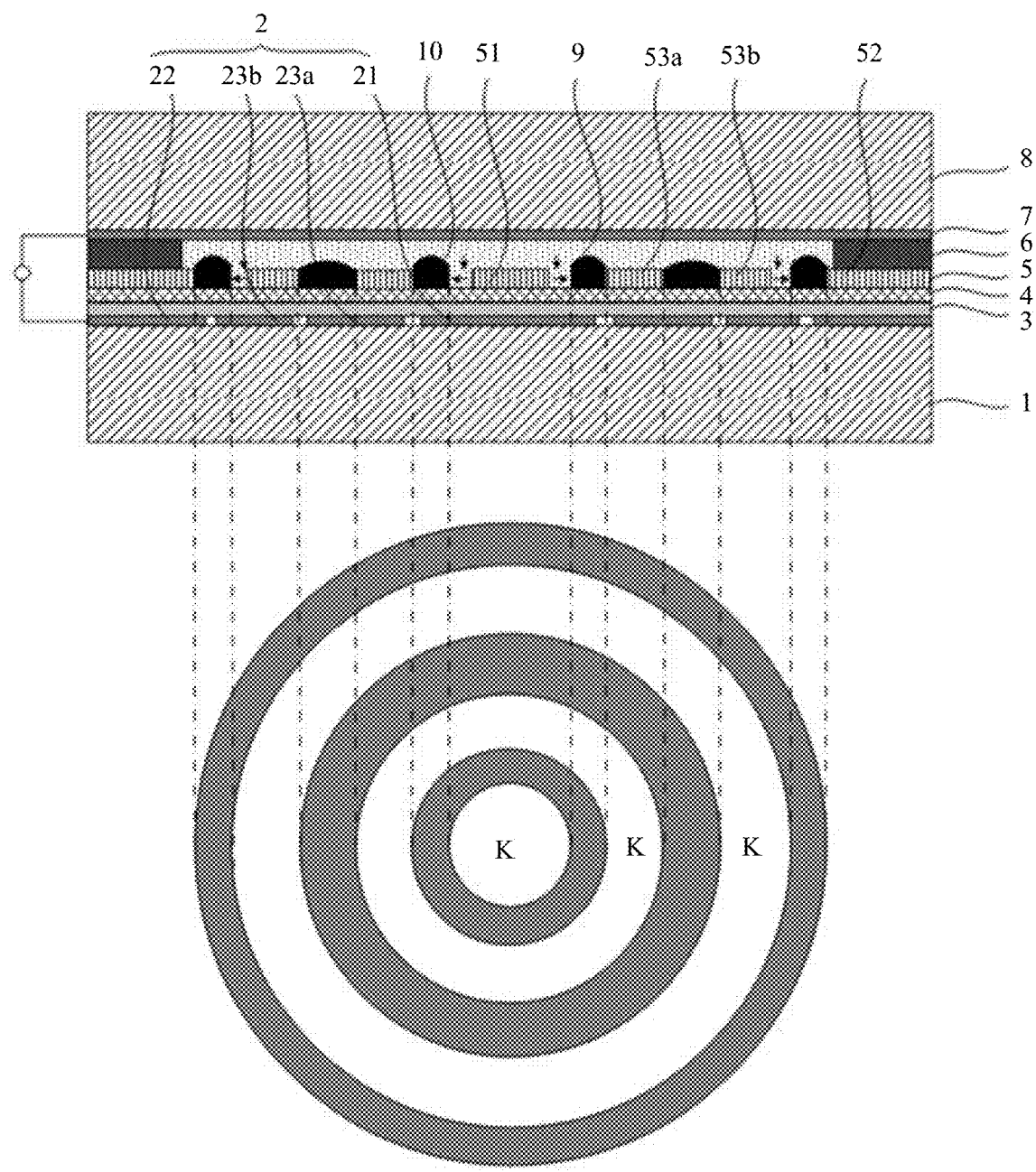
Figure 8H:
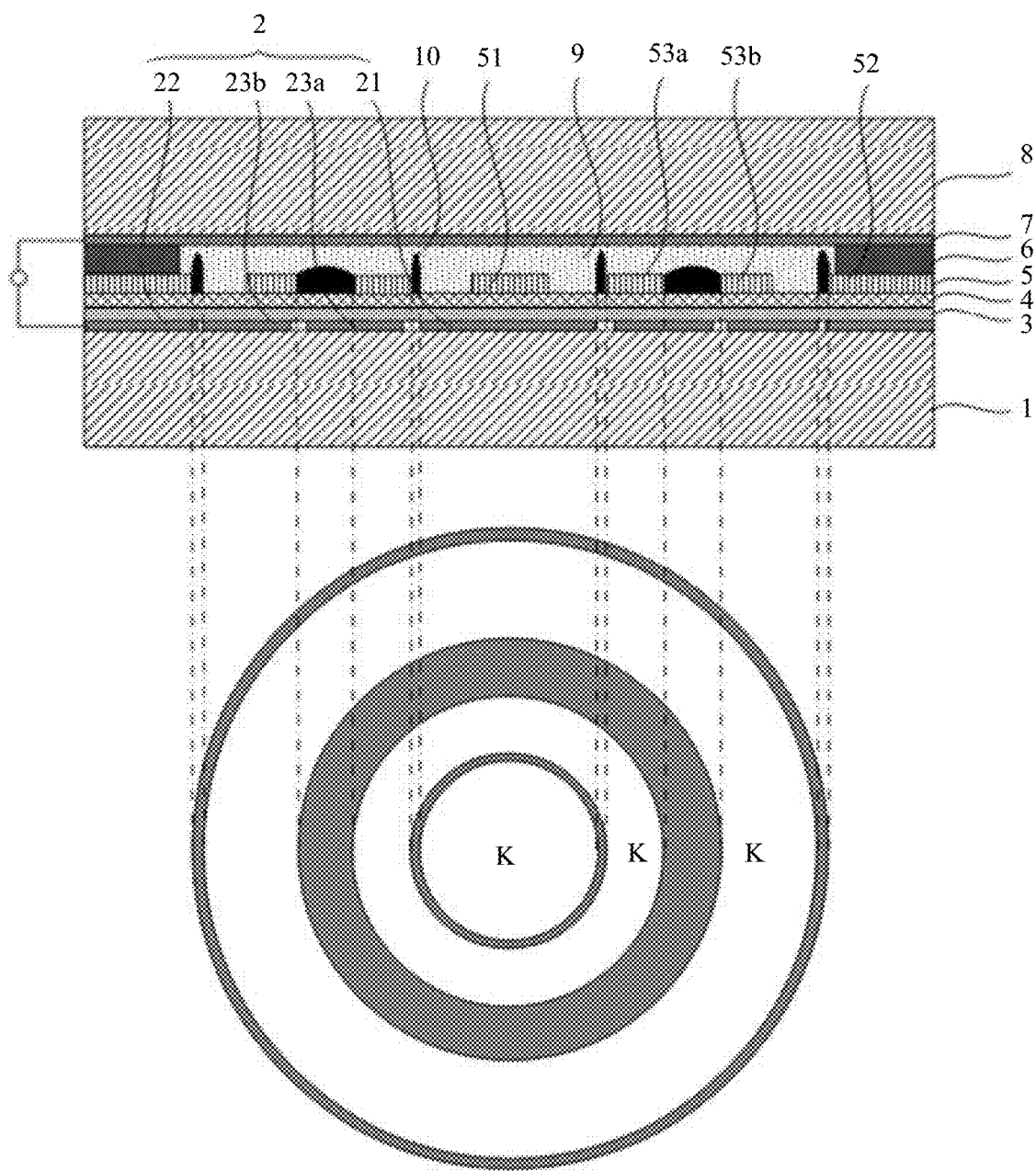

Manner 2: As shown in FIG. 8g, a voltage is applied to the first sub-electrode 21, the third sub-electrode 23b, and the second electrode plate 7 to form an effective electric field between the first sub-electrode 21 and the second electrode plate 7, a contact angle between the transparent electrolyte 9 and the hydrophobic layer 4 corresponding to the first sub-electrode 21 decreases, and the hydrophobic layer 4 exhibits a hydrophilic characteristic relative to the transparent electrolyte 9. The transparent electrolyte 9 enters the second hollow structure A2 between the first hydrophilic part 51 and the third hydrophilic part 53a downward along vertical downward arrows in FIG. 8g, and comes into contact with the hydrophobic layer 4. Such movement of the transparent electrolyte 9 generates a thrust along horizontal arrows in FIG. 8g to push the dyed oil 10 in the second hollow structure A2 to an outer edge of the second hollow structure A2 (equivalent to the inner edge of the third hydrophilic part 53a). In addition, an effective electric field is formed between the third sub-electrode 23b and the second electrode plate 7, a contact angle between the transparent electrolyte 9 and the hydrophobic layer 4 corresponding to the third sub-electrode 23b decreases, and the hydrophobic layer 4 exhibits a hydrophilic characteristic relative to the transparent electrolyte 9. The transparent electrolyte 9 enters the second hollow structure A2 between the second hydrophilic part 52 and the third hydrophilic part 53b downward along vertical downward arrows in FIG. 8d, and comes into contact with the hydrophobic layer 4. Such movement of the transparent electrolyte 9 generates a thrust along horizontal arrows in FIG. 8g to push the dyed oil 10 in the second hollow structure A2 to an outer edge of the second hollow structure A2 (equivalent to the inner edge of the second hydrophilic part 52). In this process, a state of the dyed oil 10 located in the second hollow structure A2 between the third hydrophilic part 53a and the third hydrophilic part 53b does not change. Finally, distribution of the transparent electrolyte 9 and the dyed oil 10 is shown in FIG. 8h. Among the three oil rings formed by the dyed oil 10, inner diameters of the innermost oil ring and the outermost oil ring reach the maximum, a state of the middle oil ring does not change, and sizes of the light inlet holes K of the liquid aperture 01 corresponding to the oil rings may be shown in FIG. 8h.

It should be understood that the foregoing manner of applying a voltage between the first electrode plate 2 and the second electrode plate 7 is merely an example. For the structure of the first electrode plate 2 in this embodiment of this application, there may be another voltage application manner. For example, a voltage that can form an effective electric field between the first sub-electrode 21 and the second electrode plate 7 is applied only to the first sub-electrode 21 and the second electrode plate 7. Alternatively, a voltage that can form an effective electric field between all the third sub-electrodes 23 and the second electrode plate 7 is applied to all the third sub-electrodes 23 and the second electrode plate 7. Alternatively, a voltage that can form an effective electric field between the first sub-electrode 21 and the second electrode plate 7 and between the third sub-electrode 23a and the second electrode plate 7 is applied to the first sub-electrode 21, the third sub-electrode 23a, and the second electrode plate 7. In this case, distribution of the transparent electrolyte 9 and the dyed oil 10 is affected, and finally the size of the light inlet hole K of the liquid aperture 01 is adjusted.

In addition, neither of the two voltage application manners provided in this embodiment of this application relates to a voltage application manner of the second sub-electrode 22. It may be understood that when a voltage is applied to the second sub-electrode 22, a principle of adjusting the liquid aperture 01 by the voltage is similar to the operation principle in Embodiment 2. Details are not described herein again.

Embodiment 7

Figure 9A:
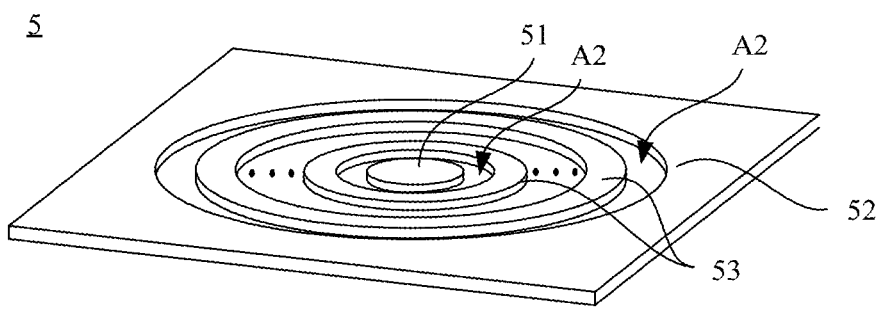
FIG. 9a is a schematic diagram of a structure of a hydrophilic layer of a liquid aperture according to Embodiment 7 of this application.

A liquid aperture 01 provided in this embodiment of this application is an improvement of the structure of the liquid aperture 01 provided in Embodiment 6. A difference from the liquid aperture 01 provided in Embodiment 6 lies in that, as shown in FIG. 9a, N third hydrophilic parts 53 are disposed between a first hydrophilic part 51 and a second hydrophilic part 52. Herein, N is greater than or equal to 3 (two third hydrophilic parts 53 are shown in FIG. 9a, and an ellipsis between the two third hydrophilic parts 53 represents at least one third hydrophilic part 53 that is not shown). Each third hydrophilic part 53 is annular. An axis of each third hydrophilic part 53 is coaxial with an optical axis of the liquid aperture 01. The N third hydrophilic parts 53 are shown as concentric rings. A second hollow structure A2 is formed between the first hydrophilic part 51 and the innermost third hydrophilic part 53. A second hollow structure A2 is formed between any two adjacent third hydrophilic parts 53. A second hollow structure A2 is formed between the second hydrophilic part 52 and the outermost third hydrophilic part 53.

Figure 9B:
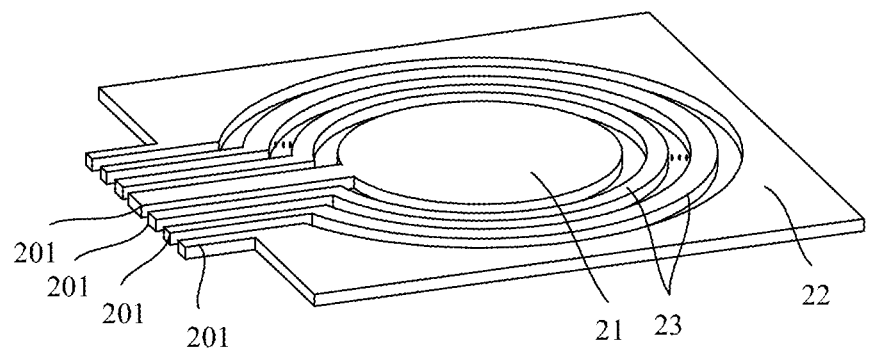
FIG. 9b is a schematic diagram of a structure of a first electrode plate of a liquid aperture according to Embodiment 7 of this application.

In view of the foregoing structure of a hydrophilic layer 5, for a structure of a first electrode plate 2 in this embodiment of this application, refer to FIG. 9b. The first electrode plate 2 includes a first sub-electrode 21 and a second sub-electrode 22, and further includes N third sub-electrodes 23 located between the first sub-electrode 21 and the second sub-electrode 22. Herein, N is greater than or equal to 3 (two third sub-electrodes 23 are shown in FIG. 9b, and an ellipsis between the two third sub-electrodes 23 represents at least one third sub-electrode 23 that is not shown). The N third sub-electrodes 23 herein one-to-one correspond to the N third hydrophilic parts 53.

The liquid aperture 01 provided in this embodiment of this application is improved only in structures of the hydrophilic layer 5 and the first electrode plate 2. For a correspondence between the first sub-electrode 21 and the first hydrophilic part 51 and a correspondence between the second sub-electrode 22 and the second hydrophilic part 52, refer to FIG. 8c. For a correspondence of any group of the third sub-electrode 23 and the third hydrophilic part 53 that correspond to each other, the following rule may be obtained through induction and summary with reference to the structure shown in FIG. 8c.

In the hydrophilic layer 5, in a direction perpendicular to the optical axis of the liquid aperture 01, a radius of an inner edge of an $x^{th}$ third hydrophilic part 53 of the hydrophilic layer 5 in a sequence from inside to outside is $r_{xi}$, a radius of an outer edge is $r_{xj}$, and sizes of all the third hydrophilic parts 53 meet the following condition: $r_{1i} < r_{1j} < r_{2i} < r_{2j} < \ldots r_{(N-1)i} < r_{(N-1)j}$. In the first electrode plate 2, in the direction perpendicular to the optical axis of the liquid aperture 01, a radius of an inner edge of a $y^{th}$ third sub-electrode 23 of the first electrode plate 2 in a sequence from inside to outside is $R_{yi}$, a radius of an outer edge is $R_{yj}$, and sizes of all the third sub-electrodes 23 meet the following condition: $R_{1i} < R_{1j} < R_{2i} < R_{2j} < \ldots R_{(N-1)i} < R_{(N-1)j}$. When x=y, $r_{xi} < R_{yi} < r_{xj} < R_{yj}$. In addition, when x=y, $R_{yi} - r_{xi} \geq 10$ μm. Such a structure setting may limit a distribution range of the dyed oil 10 in the corresponding second hollow structure A2.

Refer to Embodiment 6 and FIG. 8d to FIG. 8h. An operation principle of the liquid aperture 01 with this structure may form one circular light inlet hole and at least two annular light inlet holes. All the annular light inlet holes are distributed as concentric rings with the circular light inlet hole as the circle center. During operation, voltages applied to different parts (the first sub-electrode 21 and the N−1 third sub-electrodes 23) of the first electrode plate 2 are controlled, so that the size of the light inlet hole of the liquid aperture 01 can be adjusted. Details are not described herein again.

Embodiment 8

Figure 10:
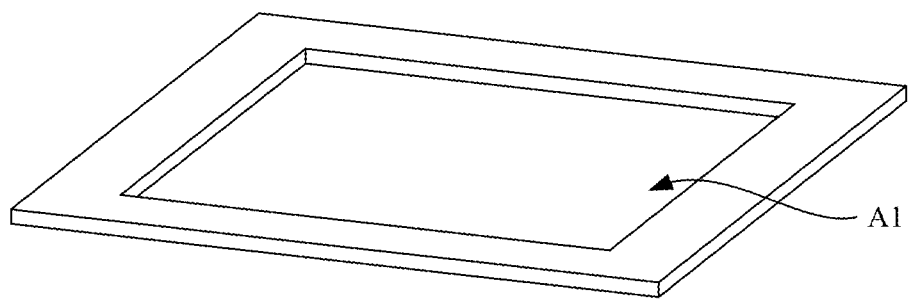
FIG. 10 is a schematic diagram of a structure of a sidewall of a liquid aperture according to Embodiment 8 of this application.

A liquid aperture 01 provided in this embodiment of this application is an improvement of the structure of the liquid aperture 01 provided in Embodiment 1. A difference from the liquid aperture 01 provided in Embodiment 1 lies in that, as shown in FIG. 10, a sidewall 6 is of a frame shape, and a rectangular first hollow structure A1 is formed in a middle of the sidewall. A structure of the liquid aperture 01 is similar to the structure shown in FIG. 3j in Embodiment 1, and is not shown in the figure herein again.

Embodiment 9

Figure 11:
FIG. 11 is a schematic diagram of a structure of a sidewall of a liquid aperture according to Embodiment 9 of this application.

A liquid aperture 01 provided in this embodiment of this application is an improvement of the structure of the liquid aperture 01 provided in Embodiment 1. A difference from the liquid aperture 01 provided in Embodiment 1 lies in that, as shown in FIG. 11, a sidewall 6 is annular and has a circular outer edge, and a first hollow structure A1 with a circular cross section is formed in a central region. A structure of the liquid aperture 01 is similar to the structure shown in FIG. 3j in Embodiment 1, and is not shown in the figure herein again.

Embodiment 10

Figure 12:
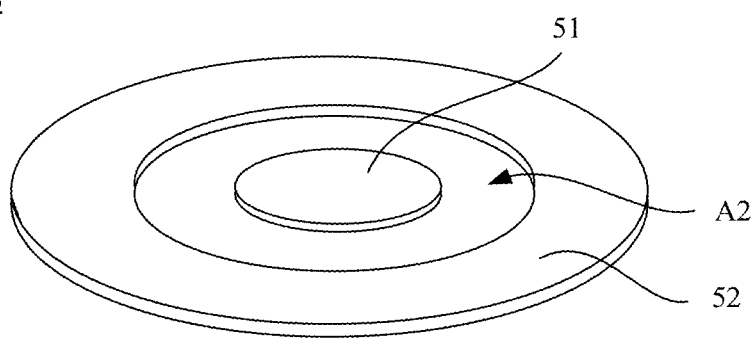
FIG. 12 is a schematic diagram of a structure of a hydrophilic layer of a liquid aperture according to Embodiment 10 of this application.

A liquid aperture 01 provided in this embodiment of this application is an improvement of the structure of the liquid aperture 01 provided in Embodiment 1. A difference from the liquid aperture 01 provided in Embodiment 1 lies in that, as shown in FIG. 12, a hydrophilic layer 5 includes a first hydrophilic part 51 and a second hydrophilic part 52. The first hydrophilic part 51 is cylindrical. The first hydrophilic part 51 is located in a central region of the entire hydrophilic layer 5. The second hydrophilic part 52 is annular. An axis of the second hydrophilic part 52 is coaxial with an axis of the first hydrophilic part 51. A second hollow structure A2 is formed between the first hydrophilic part 51 and the second hydrophilic part 52. A structure of the liquid aperture 01 is similar to the structure shown in FIG. 3j in Embodiment 1, and is not shown in the figure herein again.

Embodiment 11

Figure 13:
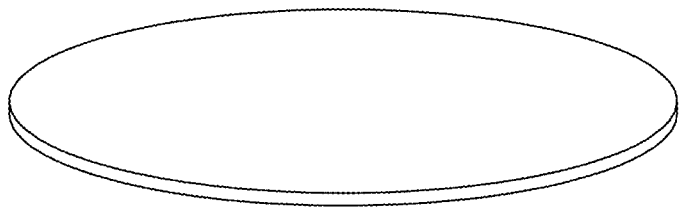
FIG. 13 is a schematic diagram of a structure of a hydrophobic layer of a liquid aperture according to Embodiment 11 of this application.

A liquid aperture 01 provided in this embodiment of this application is an improvement of the structure of the liquid aperture 01 provided in Embodiment 1. A difference from the liquid aperture 01 provided in Embodiment 2 lies in that, as shown in FIG. 13, a hydrophobic layer 4 is in a solid cylindrical shape. A structure of the liquid aperture 01 is similar to the structure shown in FIG. 3j in Embodiment 1, and is not shown in the figure herein again.

Embodiment 12

A liquid aperture 01 provided in this embodiment of this application is an improvement of the structure of the liquid aperture 01 provided in Embodiment 2. A difference from the liquid aperture 01 provided in Embodiment 2 lies in that a sidewall 6 of the liquid aperture 01 is made of glass, PMMA, or another polymer that is hard after curing. The sidewall 6 is separately bonded to a second electrode plate 7 and a hydrophilic layer 5 through an adhesive (such as a pressure-sensitive adhesive or an epoxy resin adhesive). The liquid aperture 01 is merely an improvement of a material and a connection manner of the sidewall 6, and therefore is not shown in the figure herein.

Embodiment 13

Figure 14A:
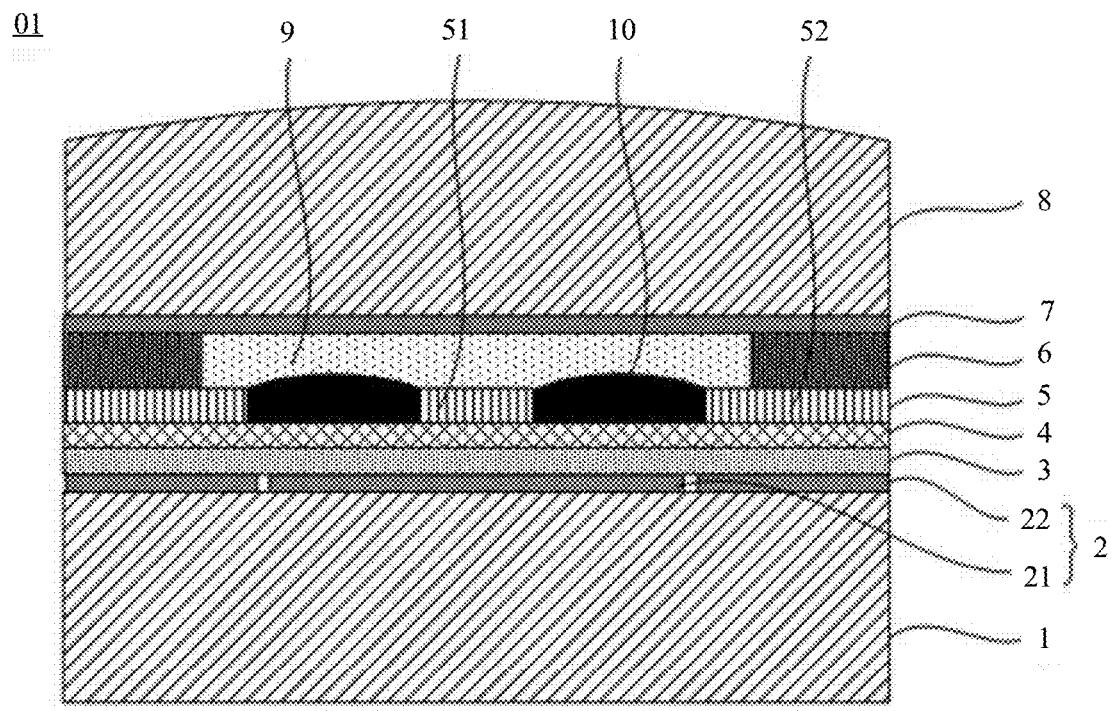
FIG. 14a to FIG. 14c each are a schematic diagram of a structure of a liquid aperture according to Embodiment 13 of this application.
Figure 14B:
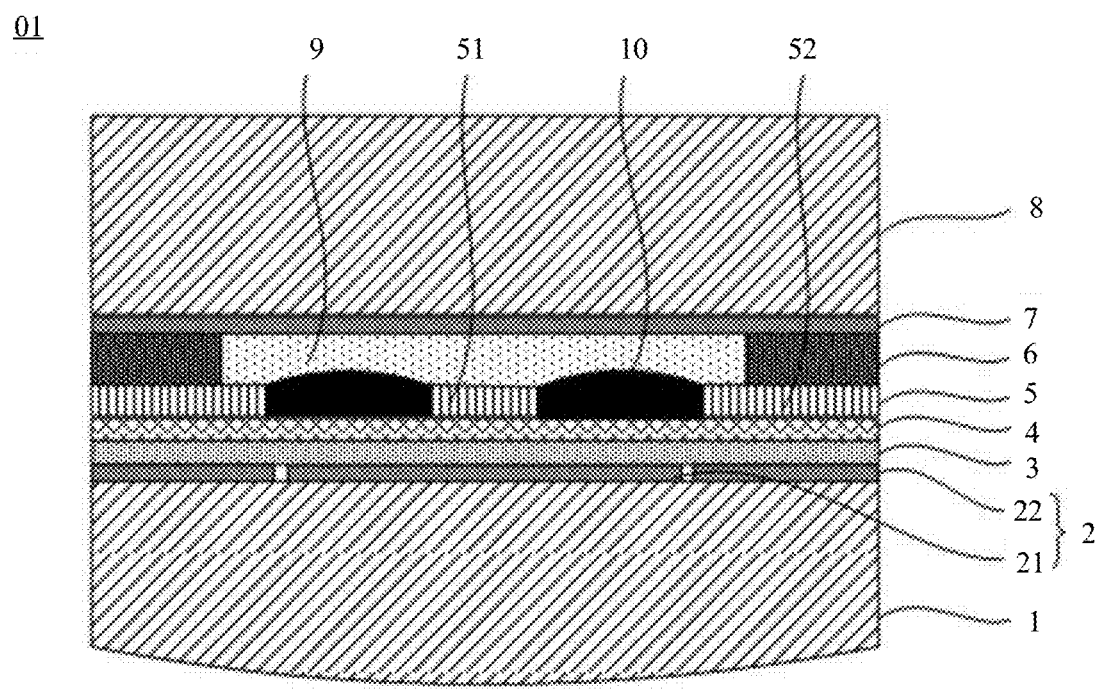
Figure 14C:
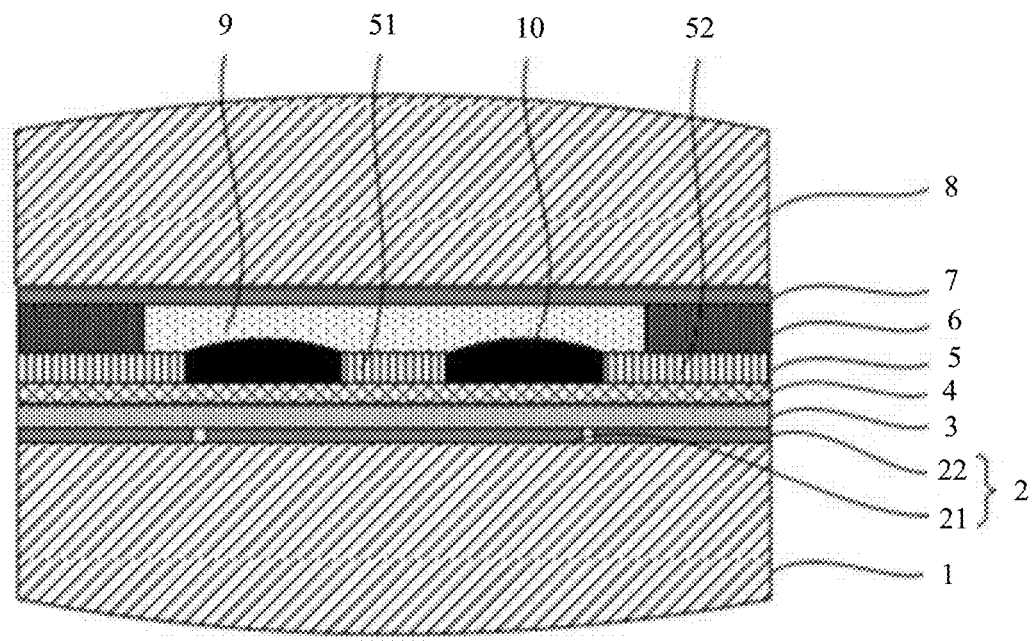

A liquid aperture 01 provided in this embodiment of this application is an improvement of the structure of the liquid aperture 01 provided in Embodiment 2. A difference from the liquid aperture 01 provided in Embodiment 2 lies in that, as shown in FIG. 14a, an outer surface of a first substrate 1 (namely, a surface of a side of the first substrate 1 away from a second substrate 8) is a curved surface; or as shown in FIG. 14b, an outer surface of a second substrate 8 (namely, a surface of a side of the second substrate 8 away from a first substrate 1) is a curved surface; or as shown in FIG. 14c, an outer surface of a first substrate 1 is a curved surface, and an outer surface of a second substrate 8 is also a curved surface.

In this case, a structure and an operation principle of the liquid aperture 01 provided in this application are described in the foregoing embodiments. It may be learned that, in the liquid aperture 01 provided in this embodiment of this application, distribution of a transparent electrolyte 9 and dyed oil 10 in a closed cavity may be changed by controlling an electric field applied between a first electrode plate 2 and a second electrode plate 7, to adjust a light inlet hole of the liquid aperture 01, so that a consumer requirement for adjusting the amount of incoming light in a photographing operation can be met. A voltage applied to the first electrode plate 2 and the second electrode plate 7 herein may be a low voltage, so that the liquid aperture 01 implements low-voltage driving. In addition, due to a special structure design of a hydrophilic layer 5, a center of the liquid aperture 01 always has an opening (a minimum state of the opening is determined by a size of a first hydrophilic part 51 of the hydrophilic layer 5). This can improve roundness, concentricity, and repeatability of the light inlet hole of the liquid aperture 01.

Figure 15:
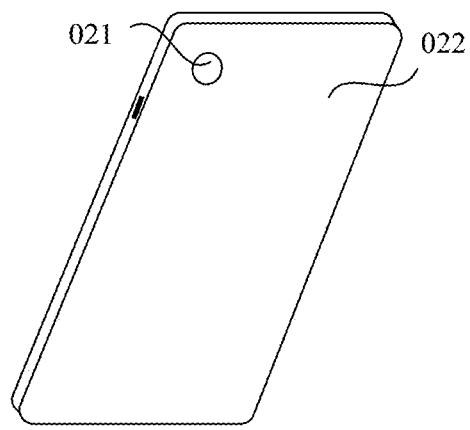
FIG. 15 is a schematic diagram of a structure of an electronic device according to an embodiment of this application.

An embodiment of this application further provides an electronic device. The electronic device may be a smartphone, a tablet computer, a vehicle-mounted lens, a security lens, or the like that has photographing and video recording functions. FIG. 15 shows a smartphone 02. The smartphone 02 includes a device body 022. A mainboard (not shown herein) is disposed in the device body 022. A camera 021 is installed on the device body 022 as a rear camera. The liquid aperture 01 is disposed in the camera 021. In addition to the video recording function, a small size and precise and convenient control of the liquid aperture 01 facilitate a small size and a small thickness of the smartphone.

Herein, a first electrode plate 2 and a second electrode plate 7 of the liquid aperture 01 are separately and electrically connected to the mainboard of the smartphone 02, and may be controlled and adjusted by using a voltage applied by the mainboard to the first electrode plate 2 and the second electrode plate 7, to finally control and adjust the liquid aperture 01.

Figure 16:
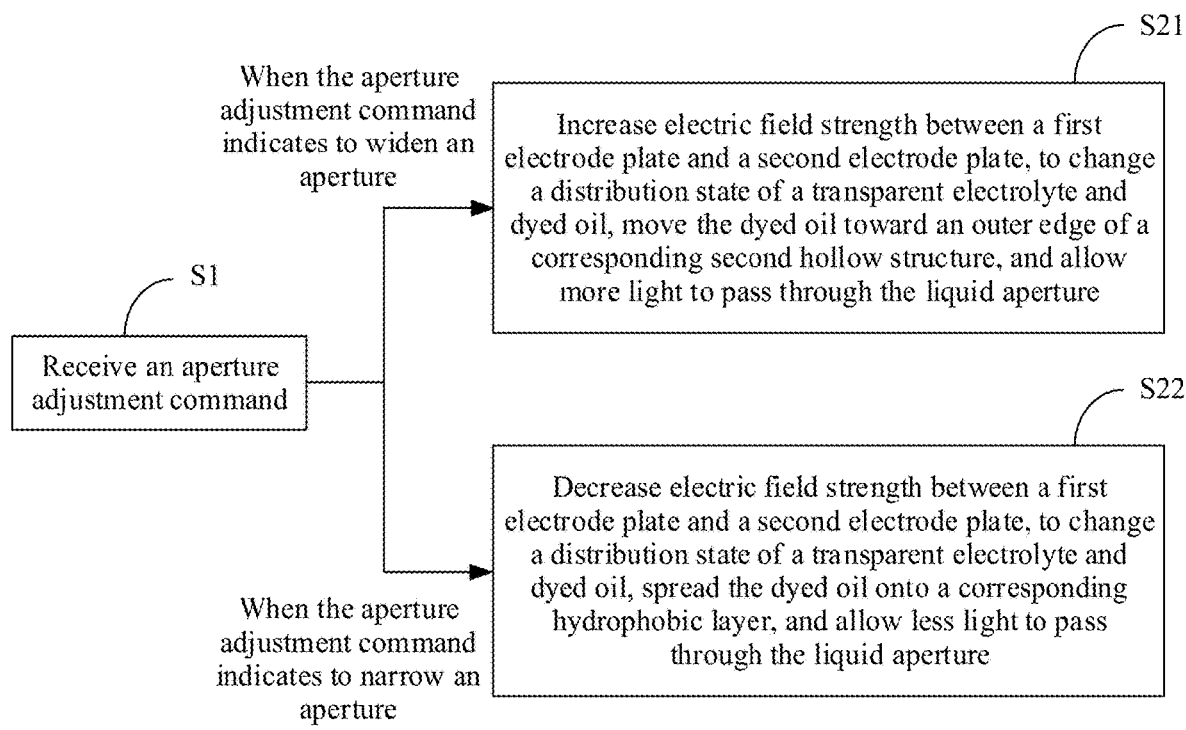
FIG. 16 is a schematic flowchart of a driving method for a liquid aperture according to an embodiment of this application.

In addition, this application further provides a driving method for a liquid aperture, used to adjust the size of the light inlet hole of the liquid aperture 01. As shown in FIG. 16, the driving method includes the following steps:

S1: Obtain an aperture adjustment command. The aperture adjustment command herein may be sent by a user. For example, the liquid aperture 01 is used independently. The user may directly adjust a voltage applied to a first electrode plate 2 and a second electrode plate 7. When the liquid aperture 01 is applied to an electronic device, for example, a smartphone, the voltage applied to the first electrode plate 2 and the second electrode plate 7 may be adjusted by using a mainboard (equivalent to a control center) of the smartphone. Certainly, software for adjusting the voltage is installed in the mainboard of the smartphone.

S21: When the aperture adjustment command indicates to widen the aperture, increase electric field strength between the first electrode plate and the second electrode plate, to change a distribution state of a transparent electrolyte and dyed oil, move the dyed oil 10 toward an outer edge of a corresponding second hollow structure A2, and allow more light to pass through the liquid aperture 01.

S22: When the aperture adjustment command indicates to narrow the aperture, decrease electric field strength between the first electrode plate and the second electrode plate, to change a distribution state of a transparent electrolyte and dyed oil, spread the dyed oil 10 onto a corresponding hydrophobic layer 4, and allow less light to pass through the liquid aperture 01.

It should be understood that, when the voltage applied to the first electrode plate 2 and the second electrode plate 7 forms an effective electric field between the first electrode plate 2 and the second electrode plate 7, the increase of the voltage may increase a wetting rate between the transparent electrolyte 9 and the hydrophobic layer 4, which is equivalent to increasing a rate of enlarging the light inlet hole of the liquid aperture 01.

Correspondingly, when the voltage applied to the first electrode plate 2 and the second electrode plate 7 forms an effective electric field between the first electrode plate 2 and the second electrode plate 7, the decrease of the voltage may decrease a wetting rate between the transparent electrolyte 9 and the hydrophobic layer 4, which is equivalent to decreasing a rate of enlarging the light inlet hole of the liquid aperture 01.

During specific implementation, the voltage for forming an effective electric field between the first electrode plate 2 and the second electrode plate 7 is related to thicknesses and materials of all layers of structures in the liquid aperture 01 and the transparent electrolyte 9. A value of the voltage may be 5-30 V.

Based on the foregoing driving method for a liquid aperture, an embodiment of this application further provides a driving apparatus for a liquid aperture. The driving apparatus includes an obtaining module and an electric field adjustment module. The obtaining module is configured to obtain the foregoing aperture adjustment command. When executing program code of the foregoing aperture adjustment command, the electric field adjustment module performs the following process:

when the aperture adjustment command indicates to widen the aperture, increasing electric field strength between the first electrode plate 2 and the second electrode plate 7, to change a distribution state of the transparent electrolyte 9 and the dyed oil 10, move the dyed oil 10 toward an outer edge of a corresponding second hollow structure A1, and allow more light to pass through the liquid aperture 01; or when the aperture adjustment command indicates to narrow the aperture, decreasing electric field strength between the first electrode plate 2 and the second electrode plate 7, to change a distribution state of the transparent electrolyte 9 and the dyed oil 10, spread the dyed oil 10 onto the corresponding hydrophobic layer 4, and allow less light to pass through the liquid aperture 01.

Figure 17:
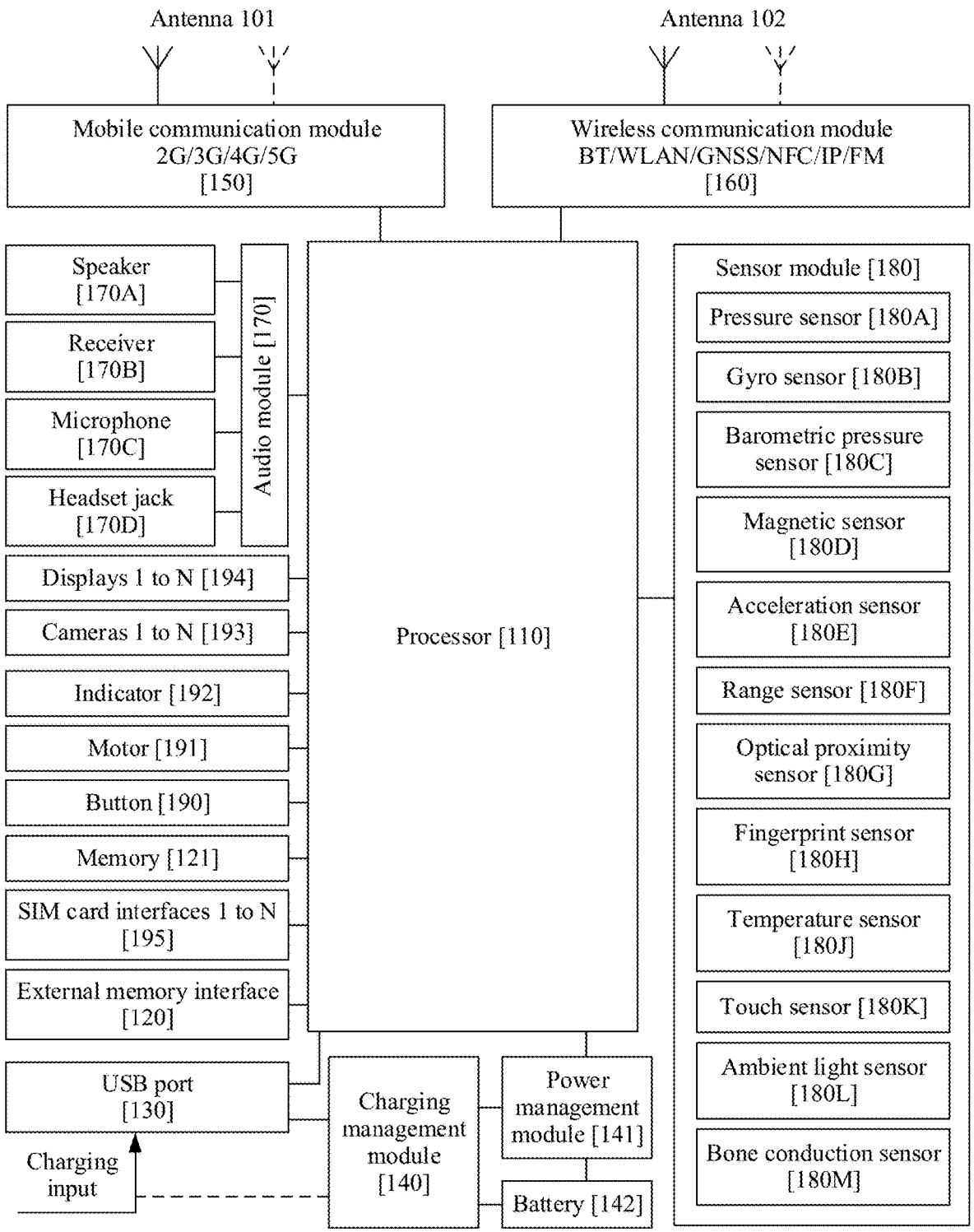
FIG. 17 is a schematic diagram of a structure of an electronic device according to an embodiment of this application.

Based on the foregoing driving method for a liquid aperture, as shown in FIG. 17, an embodiment of this application may further provide an electronic device 100. The electronic device 100 may include a processor 110, an external memory interface 120, a memory 121, a universal serial bus (USB) port 130, a charging management module 140, a power management module 141, a battery 142, an antenna 101, an antenna 102, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The camera 193 is configured to capture a static image or a video. An optical image of an object is generated through a lens, and is projected onto a photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to an ISP to convert the electrical signal into a digital image signal. The ISP outputs the digital image signal to a DSP for processing. The DSP converts the digital image signal into an image signal in a standard format such as RGB or YUV. In some embodiments, the electronic device 100 may include one or N cameras 193, where N is a positive integer greater than 1. For example, when the electronic device 100 is a smartphone, there may be two cameras 193: a front camera and a rear camera.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), the image signal processor (ISP), a controller, a video codec, the digital signal processor (DSP), a baseband processor, a neural-network processing unit (NPU), and/or the like. Different processing units may be independent components, or may be integrated into one or more processors.

The memory 121 is configured to store instructions and data. The processor 110 is coupled to the camera 193 through a bus interface. The foregoing liquid aperture 01 is disposed in the camera 193. The processor 110 may invoke program instructions stored in the memory 121, and perform the foregoing driving method for a liquid aperture by using the liquid aperture 01.

It is clear that a person skilled in the art can make various modifications and variations to embodiments of this application without departing from the scope of embodiments of this application. This application is intended to cover these modifications and variations provided that they fall within the scope of protection defined by the following claims and their equivalent technologies.

What is claimed is:

1. A liquid aperture comprising: a first substrate, a first electrode plate, an insulation layer, a hydrophobic layer, a hydrophilic layer, a sidewall, a second electrode plate, and a second substrate that are disposed adjacent to each other in sequence in a direction of an optical axis of the liquid aperture, wherein
- the first substrate, the first electrode plate, the insulation layer, the hydrophobic layer, the hydrophilic layer, the second electrode plate, and the second substrate have light transmission, the sidewall blocks light, the first substrate is configured to carry the first electrode plate, the second substrate is configured to carry the second electrode plate, and the insulation layer is configured to insulate the hydrophobic layer from the first electrode plate;
- a first hollow structure is formed in a middle of the sidewall, and the first hollow structure penetrates through the sidewall in a thickness direction of the sidewall;
- the hydrophilic layer comprises a first hydrophilic part and a second hydrophilic part, the first hydrophilic part is located in a central region of the hydrophilic layer, the second hydrophilic part is located in a peripheral region of the hydrophilic layer, the first hydrophilic part is cylindrical, the second hydrophilic part has a cylindrical hollow middle part, an axis of the first hydrophilic part and an axis of the cylindrical hollow part are coaxial with the optical axis of the liquid aperture, the first hydrophilic part is located in the cylindrical hollow part, there are N annular second hollow structures between the first hydrophilic part and the second hydrophilic part, and N is an integer greater than or equal to 1;
- the first hollow structure communicates with the N second hollow structures to form a closed cavity among the second electrode plate, the sidewall, the hydrophilic layer, and the hydrophobic layer, the closed cavity is filled with a nonopaque transparent electrolyte and opaque dyed oil, the dyed oil is incompatible with the transparent electrolyte, the transparent electrolyte is configured to isolate the dyed oil from the second electrode plate, surface adsorbability of the hydrophilic layer to the transparent electrolyte is greater than surface adsorbability of the hydrophobic layer to the transparent electrolyte, and surface adsorbability of the hydrophilic layer to the dyed oil is less than surface adsorbability of the hydrophobic layer to the dyed oil; and
- an electric field is formed between the first electrode plate and the second electrode plate to change distribution of the transparent electrolyte and the dyed oil in the closed cavity.

2. The liquid aperture according to claim 1, wherein N is equal to 1, the first electrode plate comprises a first sub-electrode, the first sub-electrode is a solid circular plate, an axis of the first sub-electrode is coaxial with the optical axis of the liquid aperture, and a radius of the first sub-electrode is greater than a radius of the first hydrophilic part and less than a radius of an inner edge of the second hydrophilic part.

3. The liquid aperture according to claim 1, wherein N is equal to 1, the first electrode plate comprises M arc electrodes and a central electrode that are disposed at a same layer, M is an integer greater than or equal to 1, the central electrode is a solid circular plate, the central electrode is located in a central region of the first electrode plate, an axis of each arc electrode is coaxial with the optical axis of the liquid aperture, radiuses of the arc electrodes are different, and the central electrode and the arc electrodes are each externally connected to at least one lead; and
- a radius of an outer edge of an arc electrode located on an outermost side of the first electrode plate is greater than a radius of the first hydrophilic part and less than a radius of an inner edge of the second hydrophilic part.

4. The liquid aperture according to claim 3, wherein a width between an arc electrode adjacent to the central electrode and the central electrode is 10-50 μm, and a width between any two adjacent arc electrodes is 10-50 μm.

5. The liquid aperture according to claim 1, wherein N=2, the hydrophilic layer further comprises an annular third hydrophilic part located between the first hydrophilic part and the second hydrophilic part, an axis of the third hydrophilic part is coaxial with the optical axis of the liquid aperture, a radius of an inner edge of the third hydrophilic part is greater than a radius of the first hydrophilic part, and a radius of an outer edge of the third hydrophilic part is less than a radius of an inner edge of the second hydrophilic part;
- the first electrode plate comprises a first sub-electrode and a third sub-electrode, the first sub-electrode is a solid circular plate, the first sub-electrode is located in a central region of the first electrode plate, the third sub-electrode is arc-shaped, the third sub-electrode surrounds the first sub-electrode, an axis of the first sub-electrode and an axis of the third sub-electrode are coaxial with the optical axis of the liquid aperture, and the first sub-electrode and the third sub-electrode are each externally connected to at least one lead; and
- a radius of an outer edge of the first sub-electrode is greater than the radius of the first hydrophilic part and less than the radius of the inner edge of the third hydrophilic part, a radius of an inner edge of the third sub-electrode is greater than the radius of the inner edge of the third hydrophilic part, and a radius of an outer edge of the third sub-electrode is greater than the radius of the outer edge of the third hydrophilic part and less than the radius of the inner edge of the second hydrophilic part.

6. The liquid aperture according to claim 1, wherein N≥3, the hydrophilic layer further comprises N−1 annular third hydrophilic parts located between the first hydrophilic part and the second hydrophilic part, an axis of each third hydrophilic part is coaxial with the optical axis of the liquid aperture, in a direction perpendicular to the optical axis of the liquid aperture, a radius of an inner edge of an $x^{th}$ third hydrophilic part of the hydrophilic layer in a sequence from inside to outside is $r_{xi}$, a radius of an outer edge is $r_{xj}$, and $r_{1i} < r_{1j} < r_{2i} < r_{2j} < \ldots r_{(N-1)i} < r_{(N-1)j}$;
- the first electrode plate comprises a first sub-electrode and N−1 third sub-electrodes, the N−1 third sub-electrodes one-to-one correspond to the N−1 third hydrophilic parts, the first sub-electrode is located in a central region of the first electrode plate, the first sub-electrode is a solid circular plate, an axis of the first sub-electrode is coaxial with the optical axis of the liquid aperture, each third sub-electrode is arc-shaped, an axis of each third sub-electrode is coaxial with the optical axis of the liquid aperture, the first sub-electrode and the third sub-electrodes are each externally connected to at least one lead, in the direction perpendicular to the optical axis of the liquid aperture, a radius of an inner edge of a $y^{th}$ third sub-electrode of the first electrode plate in a sequence from inside to outside is $R_{yi}$, a radius of an outer edge is $R_{yj}$, and $R_{1i} < R_{1j} < R_{2i} < R_{2j} < \ldots R_{(N-1)i} < R_{(N-1)j}$; and a radius of the first sub-electrode is greater than a radius of the first hydrophilic part and less than a radius of an inner edge of a third hydrophilic part adjacent to the first hydrophilic part, and in response to x=y, $r_{xi}<R_{yi}<r_{xj}<R_{yj}$.

7. The liquid aperture according to claim 6, wherein in response to x=y, $R_{yi}-r_{xi}\geq 10$ μm.

8. The liquid aperture according to claim 1, wherein a distance between an inner edge of the sidewall and the optical axis of the liquid aperture is greater than the radius of the inner edge of the second hydrophilic part.

9. The liquid aperture according to claim 1, wherein a height of the sidewall is 0.05-2 mm.

10. The liquid aperture according to claim 1, wherein a thickness of the hydrophilic layer is 0.5-3 μm.

11. The liquid aperture according to claim 1, wherein a density difference between the transparent electrolyte and the dyed oil is less than or equal to 0.09 g/cm$^3$.

12. The liquid aperture according to claim 1, wherein the sidewall is formed on a side that is of the second electrode plate and that faces the hydrophilic layer, the sidewall is bonded to the hydrophilic layer through an adhesive, and the sidewall is made of photoresist.

13. The liquid aperture according to claim 12, wherein the adhesive is a pressure-sensitive adhesive or an epoxy resin adhesive.

14. The liquid aperture according to claim 1, wherein the sidewall is bonded to the hydrophilic layer through an adhesive, the sidewall is bonded to the second electrode plate through an adhesive, and the sidewall is made of glass or a polymer.

15. The liquid aperture according to claim 1, wherein a thickness of the insulation layer is 0.5-1 μm, and/or a thickness of the hydrophobic layer is 0.02-1 μm.

16. The liquid aperture according to claim 1, wherein the hydrophobic layer is made of a fluorine-containing polymer, and/or the hydrophilic layer is made of photoresist.

17. The liquid aperture according to claim 1, wherein an outer surface of the first substrate is a curved surface, and/or an outer surface of the second substrate is a curved surface.

18. The liquid aperture according to claim 1, wherein an aperture value of the liquid aperture is 1.2-8.

19. An electronic device comprising: a device body, a mainboard, and a camera, wherein the mainboard is disposed in the device body, and the camera is installed on the device body; and a liquid aperture is disposed in the camera, and the mainboard is electrically connected to a first electrode plate and a second electrode plate of the liquid aperture;

wherein the liquid aperture comprises: a first substrate, the first electrode plate, an insulation layer, a hydrophobic layer, a hydrophilic layer, a sidewall, the second electrode plate, and a second substrate that are disposed adjacent to each other in sequence in a direction of an optical axis of the liquid aperture, wherein the first substrate, the first electrode plate, the insulation layer, the hydrophobic layer, the hydrophilic layer, the second electrode plate, and the second substrate have light transmission, the sidewall blocks light, the first substrate is configured to carry the first electrode plate, the second substrate is configured to carry the second electrode plate, and the insulation layer is configured to insulate the hydrophobic layer from the first electrode plate;

a first hollow structure is formed in a middle of the sidewall, and the first hollow structure penetrates through the sidewall in a thickness direction of the sidewall;

the hydrophilic layer comprises a first hydrophilic part and a second hydrophilic part, the first hydrophilic part is located in a central region of the hydrophilic layer, the second hydrophilic part is located in a peripheral region of the hydrophilic layer, the first hydrophilic part is cylindrical, the second hydrophilic part has a cylindrical hollow middle part, an axis of the first hydrophilic part and an axis of the cylindrical hollow part are coaxial with the optical axis of the liquid aperture, the first hydrophilic part is located in the cylindrical hollow part, there are N annular second hollow structures between the first hydrophilic part and the second hydrophilic part, and N is an integer greater than or equal to 1;

the first hollow structure communicates with the N second hollow structures to form a closed cavity among the second electrode plate, the sidewall, the hydrophilic layer, and the hydrophobic layer, the closed cavity is filled with a nonopaque transparent electrolyte and opaque dyed oil, the dyed oil is incompatible with the transparent electrolyte, the transparent electrolyte is configured to isolate the dyed oil from the second electrode plate, surface adsorbability of the hydrophilic layer to the transparent electrolyte is greater than surface adsorbability of the hydrophobic layer to the transparent electrolyte, and surface adsorbability of the hydrophilic layer to the dyed oil is less than surface adsorbability of the hydrophobic layer to the dyed oil; and an electric field is formed between the first electrode plate and the second electrode plate to change distribution of the transparent electrolyte and the dyed oil in the closed cavity.

20. A driving method for a liquid aperture, used to adjust a liquid aperture, the method comprising the following:

obtaining an aperture adjustment command; and in response to the aperture adjustment command indicating to widen the aperture, increasing electric field strength between the first electrode plate and the second electrode plate, to change a distribution state of the transparent electrolyte and the dyed oil, move the dyed oil toward an outer edge of a corresponding second hollow structure, and allow more light to pass through the liquid aperture; or in response to the aperture adjustment command indicating to narrow the aperture, decreasing the electric field strength between the first electrode plate and the second electrode plate, to change the distribution state of the transparent electrolyte and the dyed oil, spread the dyed oil onto the corresponding hydrophobic layer, and allow less light to pass through the liquid aperture;

wherein the liquid aperture comprises: a first substrate, a first electrode plate, an insulation layer, a hydrophobic layer, a hydrophilic layer, a sidewall, a second electrode plate, and a second substrate that are disposed adjacent to each other in sequence in a direction of an optical axis of the liquid aperture, wherein the first substrate, the first electrode plate, the insulation layer, the hydrophobic layer, the hydrophilic layer, the second electrode plate, and the second substrate have light transmission, the sidewall blocks light, the first substrate is configured to carry the first electrode plate, the second substrate is configured to carry the second electrode plate, and the insulation layer is configured to insulate the hydrophobic layer from the first electrode plate;

a first hollow structure is formed in a middle of the sidewall, and the first hollow structure penetrates through the sidewall in a thickness direction of the sidewall;

the hydrophilic layer comprises a first hydrophilic part and a second hydrophilic part, the first hydrophilic part is located in a central region of the hydrophilic layer, the second hydrophilic part is located in a peripheral region of the hydrophilic layer, the first hydrophilic part is cylindrical, the second hydrophilic part has a cylindrical hollow middle part, an axis of the first hydrophilic part and an axis of the cylindrical hollow part are coaxial with the optical axis of the liquid aperture, the first hydrophilic part is located in the cylindrical hollow part, there are N annular second hollow structures between the first hydrophilic part and the second hydrophilic part, and N is an integer greater than or equal to 1;

the first hollow structure communicates with the N second hollow structures to form a closed cavity among the second electrode plate, the sidewall, the hydrophilic layer, and the hydrophobic layer, the closed cavity is filled with a nonopaque transparent electrolyte and opaque dyed oil, the dyed oil is incompatible with the transparent electrolyte, the transparent electrolyte is configured to isolate the dyed oil from the second electrode plate, surface adsorbability of the hydrophilic layer to the transparent electrolyte is greater than surface adsorbability of the hydrophobic layer to the transparent electrolyte, and surface adsorbability of the hydrophilic layer to the dyed oil is less than surface adsorbability of the hydrophobic layer to the dyed oil; and an electric field is formed between the first electrode plate and the second electrode plate to change distribution of the transparent electrolyte and the dyed oil in the closed cavity.

* * * * *